United States Patent [19]
Yasue et al.

[11] Patent Number: 5,204,949
[45] Date of Patent: Apr. 20, 1993

[54] MULTI-CHANNEL/MULTI-CIRCUIT COMMUNICATION CONTROLLER

[75] Inventors: Toshikazu Yasue, Chigasaki; Tetsuo Oura, Yokohama; Shiro Oishi; Yuuji Saeki, both of Hadano; Yoshinori Watanabe, Yokohama, all of Japan

[73] Assignee: Hitachi, Ltd., Tokyo, Japan

[21] Appl. No.: 479,069

[22] Filed: Feb. 12, 1990

[30] Foreign Application Priority Data

Feb. 15, 1989 [JP] Japan .................................. 1-033563
May 12, 1989 [JP] Japan .................................. 1-117301
May 12, 1989 [JP] Japan .................................. 1-117305

[51] Int. Cl.$^5$ ............................................. G06F 13/00
[52] U.S. Cl. ..................................... 395/200; 370/112
[58] Field of Search ............... 395/200, 325, 425; 364/514, DIG. 1, DIG. 2; 370/112, 110.1, 60, 58.1, 94.1

[56] References Cited

U.S. PATENT DOCUMENTS 4,727,495 2/1988 Cheetham et al. ................. 364/514
5,047,923 9/1991 Elstner et al. ..................... 395/325 X

FOREIGN PATENT DOCUMENTS 63-293656 11/1988 Japan .

Primary Examiner—Robert L. Richardson
Attorney, Agent, or Firm—Fay, Sharpe, Beall, Fagan, Minnich & McKee

[57] ABSTRACT

An ISDN communication controller or a multi-circuit communication controller is implemented in a sheet of communication adapter board. For each channel or circuit, a dedicated subprocessor section conducts communication processing. In each subprocessor section, a local bus is disposed to connect a CPU, a serial controller, and an RAM. In a main processor section controlling the subprocessors, a local bus is employed to connect a CPU, an RAM, and an ROM. In a system processor section exclusively achieving information processing, a system bus is used to connect a CPU and a main memory. The local buses are connected via respective controllers to an upper-level local bus. A shared RAM is connected via a controller to the upper-level local bus and the system bus. The controllers of the subprocessor sections translate addresses to be outputted from the main processor section to the upper-level local bus to supply translated addresses to the respective local bus.

40 Claims, 36 Drawing Sheets

| SLOT NO. | ADDRESS |
|---|---|
| 0 | F30000-F31FFF |
| 1 | F32000-F33FFF |
| 2 | F34000-F35FFF |
| 3 | F36000-F37FFF |
| 4 | F38000-F39FFF |
| 5 | F3A000-F3BFFF |
| 6 | F3C000-F3DFFF |
| 7 | F3E000-F3FFFF |

SLOT NO.

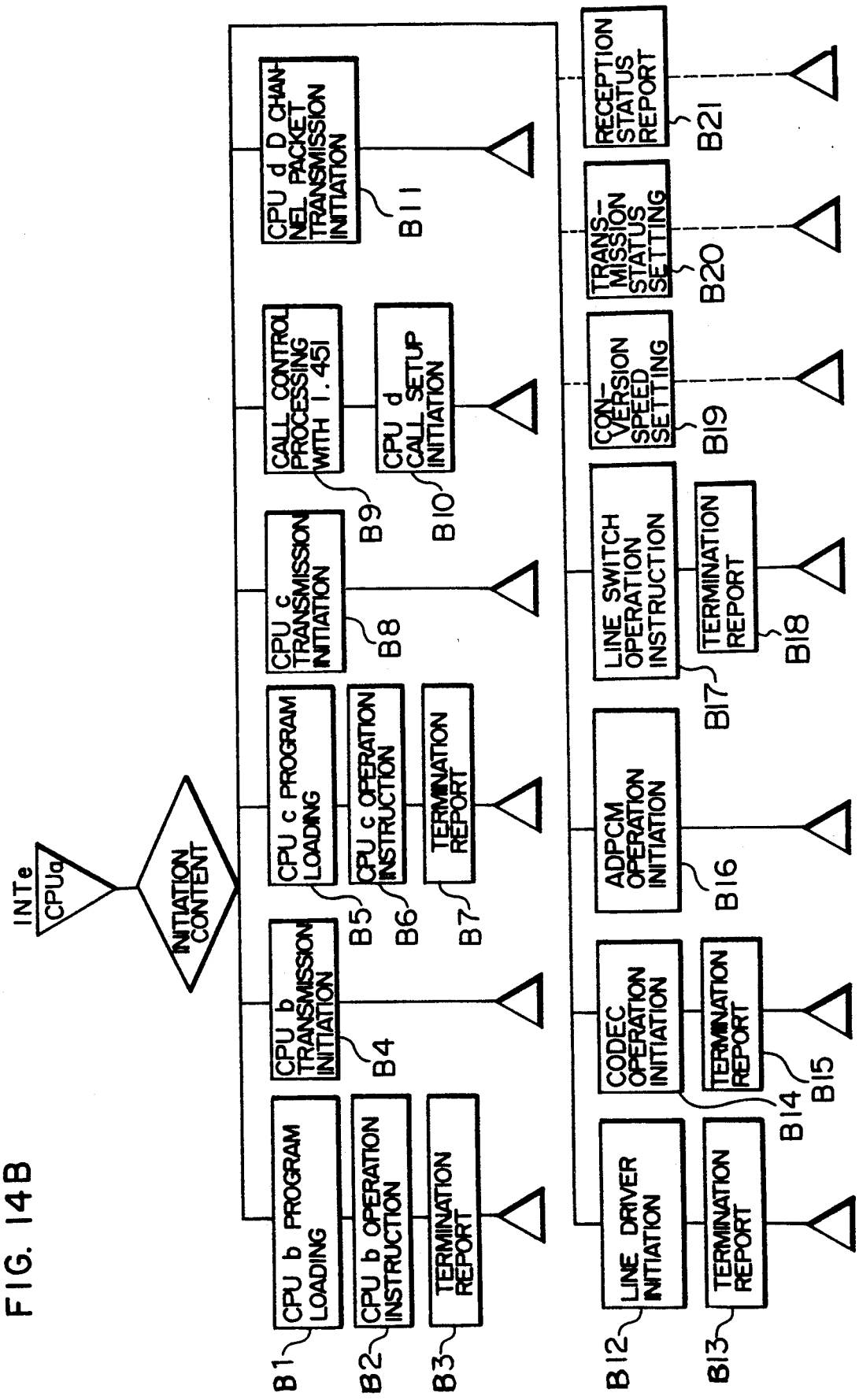

INTERRUPTION FROM LINE DRIVER

INTERRUPTION FROM DMA INTEGRATED WITH CPU a

FIG. 23

FRAME STRUCTURE FOR 4800 bps

| | \multicolumn{8}{c}{BIT NUMBER} |
|---|---|---|---|---|---|---|---|---|
| OCTET NUMBER | 1 | 2 | 3 | 4 | 5 | 6 | 7 | 8 |
| 0 | 0 | 0 | 0 | 0 | 0 | 0 | 0 | 0 |
| 1 | 1 | $D_1$ | $D_2$ | $D_3$ | $D_4$ | $D_5$ | $D_6$ | $S_1$ |
| 2 | 1 | $D_7$ | $D_8$ | $D_9$ | $D_{10}$ | $D_{11}$ | $D_{12}$ | X |
| 3 | 1 | $D_{13}$ | $D_{14}$ | $D_{15}$ | $D_{16}$ | $D_{17}$ | $D_{18}$ | $S_3$ |
| 4 | 1 | $D_{19}$ | $D_{20}$ | $D_{21}$ | $D_{22}$ | $D_{23}$ | $D_{24}$ | $S_4$ |
| 5 | 1 | $E_1$ | $E_2$ | $E_3$ | $E_4$ | $E_5$ | $E_6$ | $E_7$ |
| 6 | 1 | $D_{25}$ | $D_{26}$ | $D_{27}$ | $D_{28}$ | $D_{29}$ | $D_{30}$ | $S_6$ |
| 7 | 1 | $D_{31}$ | $D_{32}$ | $D_{33}$ | $D_{34}$ | $D_{35}$ | $D_{36}$ | X |
| 8 | 1 | $D_{37}$ | $D_{38}$ | $D_{39}$ | $D_{40}$ | $D_{41}$ | $D_{42}$ | $S_8$ |
| 9 | 1 | $D_{43}$ | $D_{44}$ | $D_{45}$ | $D_{46}$ | $D_{47}$ | $D_{48}$ | $S_9$ |

FIG. 28

| IDENTIFIER | OBJECT | ABBREVIATION |
|---|---|---|
| 0 0 | ADAPTER SERVICE PART a — ADAPTER SERVICE SECTION a | a |
| 0 1 | DATA COMMUNICATION SERVICE PART b — DATA COMMUNICATION PROCESSING SECTION b | b |
| 0 2 | DATA COMMUNICATION SERVICE PART c — DATA COMMUNICATION PROCESSING SECTION c | c |
| 0 3 | DATA COMMUNICATION SERVICE PART d — DATA COMMUNICATION PROCESSING SECTION d | d |
| 0 4 | TELEPHONE SERVICE PART e — VOICE PROCESSING SECTION e | e |

| INITIATION COMMAND | REPORT COMMAND | CODE (HEXADECIMAL) | OBJECT | | | | |
|---|---|---|---|---|---|---|---|
| | | | a | b | c | d | e |
| IPL | IPL END | 00 | O | | O | O | |
| CALL | CALLED | 48 | | O | O | O | O |
| CALL CNF | CALL REQ | 49 | | O | O | O | O |
| KILL | KILLED | 4A | | O | O | O | O |
| KILL CNF | KILL REQ | 4B | | O | O | O | O |
| CONNECT | CONNECTED | 04 | | O | O | O | O |
| | CONNECT REQ | C1 | | O | O | O | |
| DISCONNECT | DISCONNECTED | 05 | | O | O | O | O |
| | DISCONNECT REQ | C2 | | O | O | O | |
| SND | SND BUF REL | 40 | | O | O | O | |
| RCV BUF REL | RCV | 80 | | O | O | O | |
| PLAY BACK | PLAY BACK END | 40 | | | | | O |
| RECORD | RECORDED | 80 | | | | | O |
| | INITIALIZED | C0 | O | | | | |

FIG. 36

| INITIATION COMMAND | REPORT COMMAND | CODE (HEXAD-ECIMAL) | OBJECT | | | | |
|---|---|---|---|---|---|---|---|
| | | | a | b | c | d | e |
| IPL | IPL END | 00 | O | | O | O | |
| CALL | CALLED | 48 | O | | | | |
| CALL CNF | CALL REQ | 49 | O | | | | |
| KILL | KILLED | 4A | O | | | | |
| KILL CNF | KILL REQ | 4B | O | | | | |
| CONNECT | CONNECTED | 04 | | O | O | O | O |
| | CONNECT REQ | C1 | | O | O | O | |
| DISCONNECT | DISCONNECTED | 05 | | O | O | O | O |
| | DISCONNECT REQ | C2 | | O | O | O | |
| SND | SND BUF REL | 40 | | O | O | O | |
| RCV BUF REL | RCV | 80 | | O | O | O | |
| PLAY BACK | PLAY BACK END | 40 | | | | | O |
| RECORD | RECORDED | 80 | | | | | O |
| | INITIALIZED | C0 | O | | | | |

FIG. 38

| INITIATION COMMAND | REPORT COMMAND | CODE (HEXADECIMAL) | OBJECT | | | | | |
|---|---|---|---|---|---|---|---|---|
| | | | a | b | c | d | e | f |
| IPL | IPL END | 00 | O | | O | O | | |
| CALL | CALLED | 48 | | | | | | O |
| CALL CNF | CALL REQ | 49 | | | | | | O |
| KILL | KILLED | 4A | | | | | | O |
| KILL CNF | KILL REQ | 4B | | | | | | O |
| CONNECT | CONNECTED | 04 | | O | O | O | O | |
| | CONNECT REQ | C1 | | O | O | O | | |
| DISCONNECT | DISCONNECTED | 05 | | O | O | O | O | |
| | DISCONNECT REQ | C2 | | O | O | O | | |
| SND | SND BUF REL | 40 | | O | O | O | | |
| RCV BUF REL | RCV | 80 | | O | O | O | | |
| PLAY BACK | PLAY BACK END | 40 | | | | | O | |
| RECORD | RECORDED | 80 | | | | | O | |
| | INITIALIZED | C0 | O | | | | | |

MULTI-CHANNEL/MULTI-CIRCUIT COMMUNICATION CONTROLLER

BACKGROUND OF THE INVENTION

The present invention relates to a multichannel/multicircuit communication control unit or controller, and in particular, to a multichannel/multicircuit communication controller suitable for communications employing an integrated services digital network (ISDN).

With an increase in communication speed and with a growth of the capacity of data to be communicated, the contents of communication control has been changed in information processing apparatuses such as a personal computer and a workstation. Namely, as a result of the increased load imposed on the communication control, it has been difficult in such an information processing apparatus for a system processor dedicately achieving information processing to conduct the data transmission control while supervising a line controller. To cope with this difficulty, there has been proposed a method in which a line controller and a processor exclusively achieving a communication control processing are disposed in a communication adapter so as to minimize the communication control load imposed on a system processor. The communication adapter is implemented in an extension board to be connected to a system bus. The method above has been described, for example, in the JP-A-63-292656.

However, when the method is adopted to control a plurality of communication lines or channels, a communication adapter is required to be installed for each line or channel. That is, a plurality of extension boards are to be connected to the system bus. This results in an increase in the size of the apparatus; furthermore, it is necessary for the system processor to respectively control the plural adapters disposed in the respective extension boards. Moreover, there arises a difficulty in the information exchange between communication processors disposed in the respective communication adapter boards. Particularly, for example, in the ISDN, since a line is multiplexed to accommodate three channels including two B channels and one D channel (2B+D) and the D channel functions to achieve a call control for the B channels, it is difficult for three adapter boards to handle the respective channels 2B+D.

Because the communication line speed is stipulated to be constant in the ISDN, there also occurs a difficulty to conduct communications via the ISDN with conventional terminals operating at various communication speeds.

SUMMARY OF THE INVENTION

It is therefore an object of the present invention to provide a multichannel communication controller capable of simply controlling at a high speed multiple channels in a network such as the ISDN.

Another object of the present invention is to provide a communication adapter suitable for a communication control in the information processing apparatuses such as a personal computer and a workstation.

Still another object of the present invention is to provide a communication controller for multiple channels in which a protocol can be easily changed for each channel.

Another object of the present invention is to provide a communication controller for multiple channels in which a transmission speed can be easily altered for each channel.

BRIEF DESCRIPTION OF THE DRAWINGS

These and other objects and advantages of the present invention will become apparent by reference to the following description and accompanying drawings wherein:

FIGS. 14A, 14B, 15A to 15E, 16A, and 16B are flowcharts showing examples of operations conducted in the communication adapter;

FIG. 23 is a diagram showing an example of a frame structure employed in a speed matching;

FIG. 28 is a diagram showing relationships between identifiers, service sections, and processing sections in the fourth embodiment;

FIG. 36 is a diagram showing relationships between identifiers, service sections, and processing sections in the fifth embodiment;

FIG. 38 is a diagram showing an initiate command and related information items of the sixth embodiment.

DESCRIPTION OF THE PREFERRED EMBODIMENTS

Figure 1:
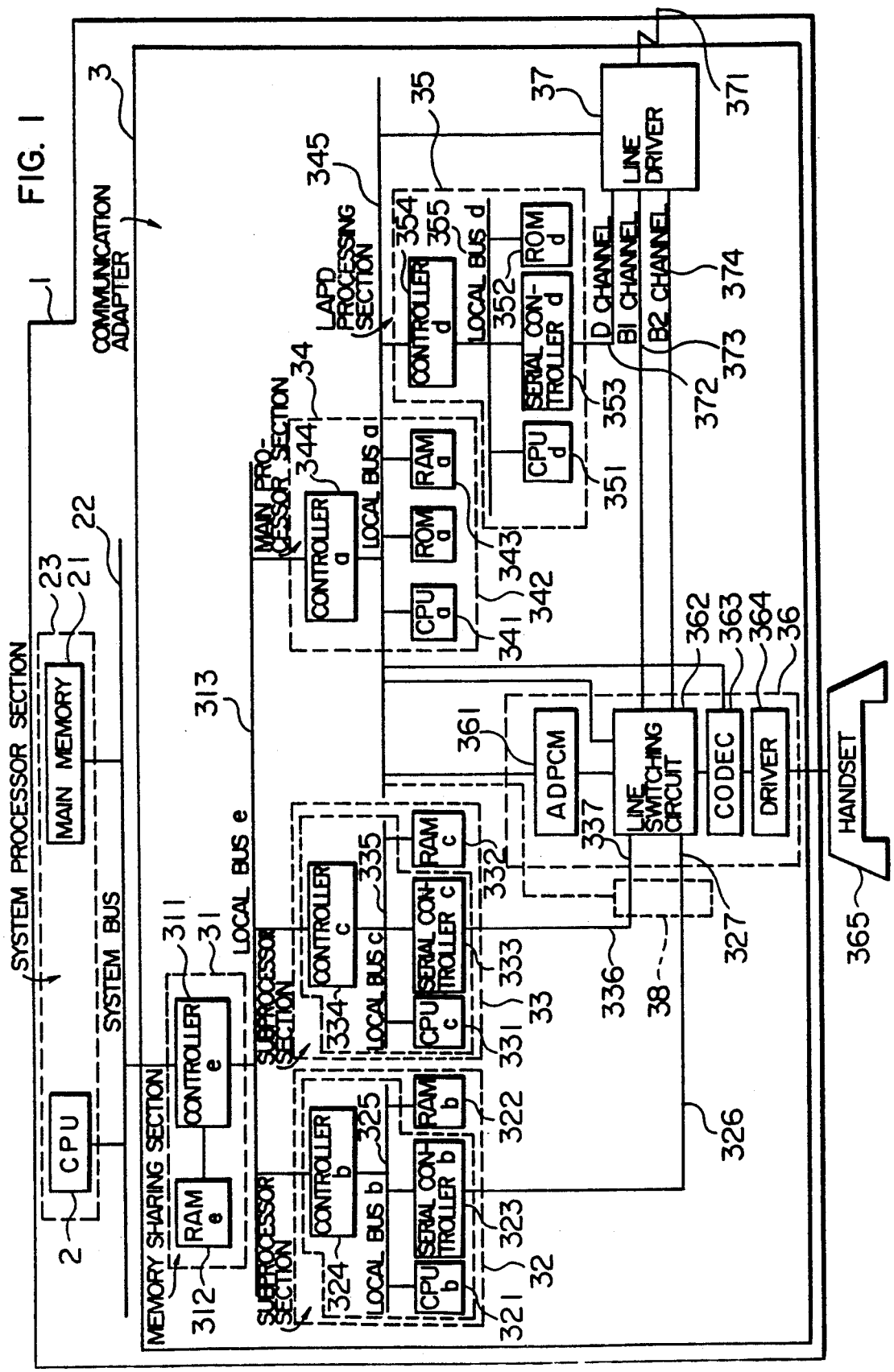
FIG. 1 is a schematic diagram showing the configuration of a workstation associated with first and third embodiments according to the present invention.

Referring now to the drawings, a description will be given of an embodiment according to the present invention.

FIG. 1 is a block diagram showing a workstation associated with the first and third embodiments in accordance with the present invention. First, a description will be given of the first embodiment. The third embodiment will be described later.

In this specification, it is to be understood that the term "multi-channel" broadly includes "multi-circuit".

FIG. 1 is a block diagram showing a configuration example of a multi-channel communication control system to which the present invention is applied. This system is briefly structured as follows. Reference numeral 1 indicates a workstation body in which a communication adapter 3 is installed. The adapter 3 is connected to an ISDN 371 supporting a basic interface, for example, 2B+D and a handset 365 for a call. Included in this system is a system processor section 23 comprising a CPU 2 for supervising control of the entire main body 1 and the communication adapter 3 and a main memory for storing therein data and programs used by the CPU 2. The system processor section 23 is connected to the communication adapter 3 by use of a system bus 22. The ISDN 371 can support two B channels and a D channel for audio or voice and data communications at the same time. In this embodiment, two types of channel usage configurations are available.

(a) Data communication (D channel)+Data communication (B channel)+Data communication (B channel)

(b) Data communication (D channel)+Data communication (B channel)+Voice or audio communication (B channel)

In the configuration (a), the handset 365 need not be necessarily installed.

Figure 2:
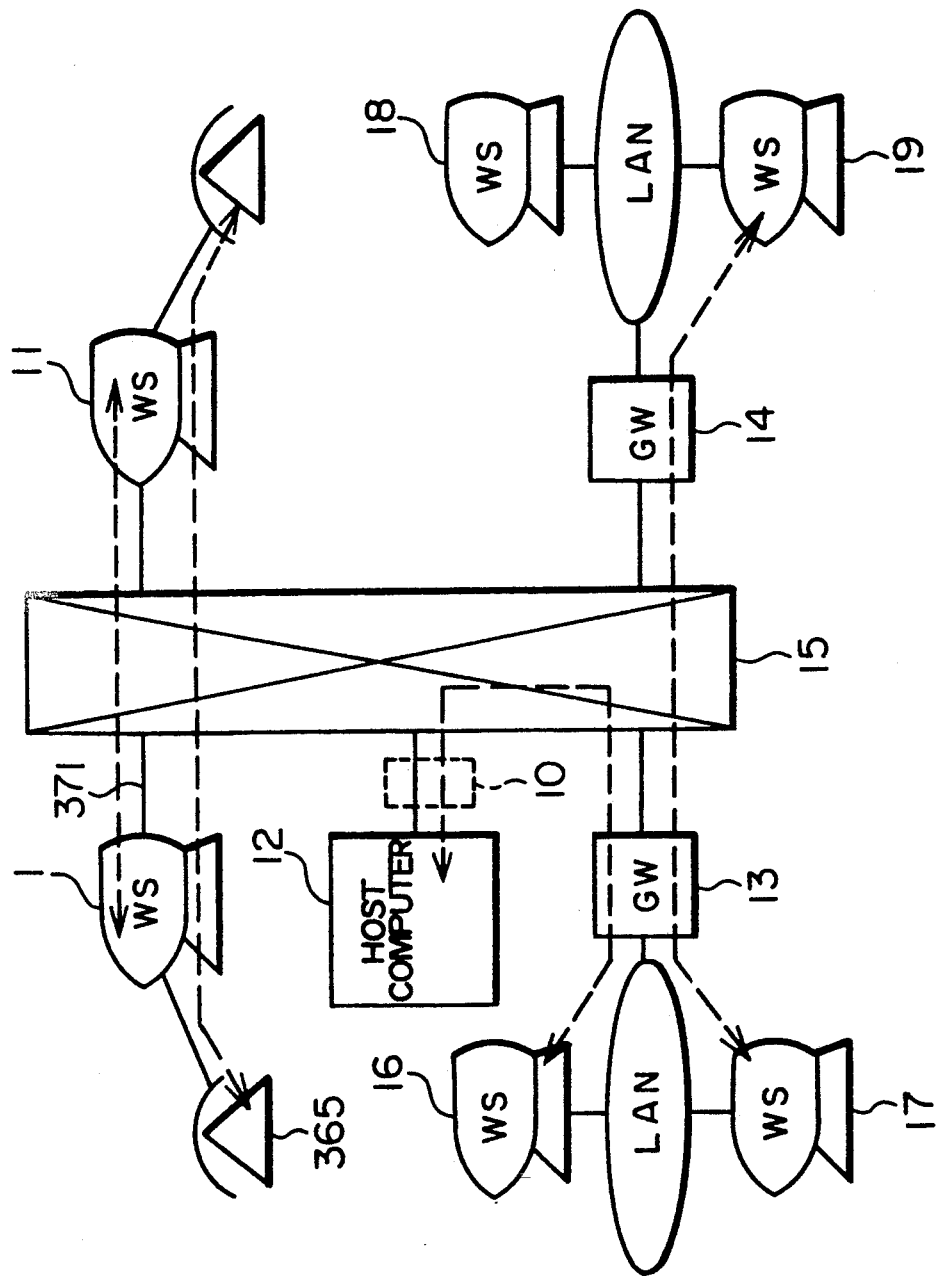
FIG. 2 is a configuration diagram schematically showing a network established by use of workstations.

FIG. 2 shows an example of the network utilization configuration to which the embodiment is applied. Workstations (WS) 1 and 11, a host computer 12, and gateways are shown in the embodiment of FIG. 1 and are connected to an ISDN 15 including an integral communication adapter 3, which will be described later. Of these components, the host computer 12 and the gateways 13 and 14 are not provided with the handset. The gateways 13 and 14 constitute, on one hand, a local area network (LAN) together with the workstations 16, 17, 18, and 19 to develop a function to transfer data from the LAN to the ISDN and vice versa. In this operation, the data is accumulated in a form of packets for transmission thereof such that the transmission speed difference between, for example, a 10 megabits per second (Mbps) LAN and a 64 kilobits per second (Kbps) ISDN is absorbed and that the difference between the LAN and ISDN communication procedures are coped with through a protocol translation or conversion.

Each apparatus connected to the ISDN possesses three channels B1, B2, and D to communicate with respective different partners by use of arbitrary combinations thereof. FIG. 2 shows three communication configurations as follows.

(a) Communication between workstations
(b) Communication between clusters
(c) Communication between LANs In the configuration (a), data and voices are simultaneously communicated via channels B1 and B2 between the workstations 1 and 11. The voices are naturally communicated in a realtime fashion. In the configuration (b), the host computer 12 communicates via the gateway 13 with a plurality of workstations, namely, a one-to-n communication is conducted. In this situation, the gateway 13 functions as a terminal controller to control workstations 16 and 17 operating as terminals.

In the LAN-LAN communication (c), the gateways 13 and 14 are linked with each other through an ISDN to logically establish an LAN including the LANs associated with the gateways 13 and 14, respectively. As a result, for example, the workstation 17 can communicate with the workstation 19 as if these workstation be installed in the same LAN.

In the structure of FIG. 2, although the handset is not installed for the host computer 12 and the gateways 13 and 14, it is possible to dispose the handset for these apparatuses. In a case where the gateways 13 and 14 are arranged in remote locations from the host computer 12, for example, when additional workstations to be connected to the LAN is to be tested or when an operation to check causes of a failure occurred therein is to be carried out, a difficulty arises in such an operation. In this case, by respectively disposing handsets in the host computers 12 and the gateways 13 and 14, the maintenance engineers at the respective sites can communicate with each other through voices by means of the handsets to simply execute the test operation and to easily determine the causes of the failure.

Next, a description will be given in detail of functions of the communication adapter 3 of FIG. 3.

The communication functions include three kinds of functions including data communication, voice communication, and call control functions. Data communications are accomplished by use of all channels including channels D, B1, and B2. Conducted through the D channel is a packet switch data communication in conformity with the CCITT recommendations I, 441 (link access procedure on the D-channel). The B1 and B2 channels are employed for the communications to be achieved in the packet switching in conformity with the high level data link control procedure (balanced asynchronous balanced mode class) HDLC-BA or in a line switching of the high level data link control procedures (unbalanced normal response mode class) HDLC-BA and HDLC-UN. The transmission speed is 16 Kbps for the channel D and 64 Kbps for channels B1 and B2. Naturally, communications can be independently conducted through the respective channels D, B1, and B2. Voice communications are achieved by use of either one of the channels B1 and B2. Voices from the handset are converted into digital voices at a transmission speed 64 Kbps. Voices may also be recorded and reproduced. In the system of FIG. 1, a random access memory e (RAM e) 312 is a common memory shared between the system processor section and the communication adapter 3. A voice storage area is disposed therein for the input and output of voices. This area is called a voice file. By linking the voice file with handsets, the message recording and playback can be locally achieved. When the voice file is connected to an ISDN, voices of a communicating partner can be recorded and the content of the voices can be reproduced for a transmission thereof. For the recording, the voices are compressed in an adaptive differential pulse code modulation from the transmission speed 64 Kbps to 32 or 24 Kbps to elongate the recording time. For the playback, the voices are expanded to restore the 64 Kbps digital data. The voices can be transmitted independently of the data communication; however, the channel sharing cannot be conducted in this case. The channel call control for the data and voice communications are implemented by use of the D channel. The control operation is carried out in conformity with the procedures of the CCITT recommendations I.441 (LAPD) and I.451.

Three types of external interfaces are available, namely, an upper-level interface to the system processor 23 by means of the system bus 22, an ISDN connection interface via the ISDN 371, and a handset connection interface to a dedicated or leased line by means of the handset 365.

Next, a description will be given in detail of the constitution of the communication adapter 3 of FIG. 1. The adapter 3 includes sub-processor sections 32 and 33 for conducting data communications through the channel B1 or B2, a main processor section 34 for achieving voice communications on the B channel and the data communications and the call control on the D channel, an LAPD processing section 35 to conduct processing at levels of the data link in association with the data communication and the call control through the D channel, a line driver 37 for multiplexing and for demultiplexing the channels D, B1, and B2, a B channel control section 36 for linking the channels B1 and B2 with the sub-processor sections 32 and 33 and to the handset and for compressing and for expanding voices, and a memory sharing section 31 for achieving data communications through memory sharing among the system processor section 23, the main processor section 34, and the subprocessor sections 32 and 33.

The system processor section 23 is connected to the memory sharing section 31 via the system bus 22. The memory sharing section 31, the main processor section 34, and the subprocessor sections 32 and 33 are linked with each other through a local bus e 313 to communicate data therebetween. Connected to a local bus a 345 of the main processor section 34 are the line driver 37, the LAPD processing section 35, and the B channel control section 36. These components receive operation instructions from the main processor section 34 so as to communicate data therewith. The channels B1, B2, and D of the ISDN 371 are multiplexed and are demultiplexed by means of the line driver such that the D channel is linked to the LAPD processing section 35 and the channels B1 and B2 are connected to the B channel control section 36. The B channel control section 36 is responsive to an instruction from the main processor section 34 to switch between the channels so as to link the channels B1 and B2 of the ISDN 371 with the handset 365, the subprocessor sections 32 and 33, and the main processor section 34.

The main processor section 34, the subprocessor sections 32 and 33, the LAPD processing section 35, and the system processor section 23 respectively include central processing units (CPUs), memories, and buses to independently achieve operations. Subsequently, a description will be given of the respective sections.

The main processor section 34 includes a read-only memory (ROM) a 342, an RAM a 343, a CPU a 341, and a controller a 344. These components are connected to a local bus a 345. The ROM a 342 is dedicated to a read operation and stores therein a program which reads out from the RAM e 312 a self-diagnosis program of the communication adapter 3 and a program to be stored in the RAM a 343. The capacity of the ROM a 342 is 32 kilobytes. When the communication adapter 3 is powered, the CPU a 341 executes the program in the ROM a 342 beginning from the first address thereof. The RAM a 343 is a read/write memory for storing therein programs to process voice communications and call control procedures. The capacity of the RAM a 343 is 128 kilobytes. The controller conducts, as will be described later, a path control between the local bus e 313 and the local bus a 345 and an access control for the CPU a 341 to access the ROM a 342 and the RAM a 343. The CPU a 341 to execute programs in the ROM a 342 and the RAM a 343 is implemented, for example, by use of a Hitachi's eight-bit microcomputer HD 64180S operating with 10 MHz clocks.

The subprocessor section 32 includes an RAM b 322, a CPU b 321, a controller b 324, and a serial controller b 323 to communicate data with a line 326 connected to the B1 or B2 channel. These units are connected to a local bus b 325. The RAM b 322 is a read/write memory for storing therein programs to process the data link control procedures of the B channel, namely, HDLC-BA and HDLC-UN. The capacity of the RAM b 322 is 32 kilobytes. The controller b 324 achieves, as will be described later, a path control between the local bus e 324 and the local bus b 325, an access control for the CPU b 321 to access the RAM b 322, and a command handshake control for the main processor section 34 to instruct operations to the subprocessor section 32 and to receive reports therefrom. The CPU b 321 to execute the programs in the RAM b 322 and the serial controller b 323 are implemented, for example, by use of Hitachi's eight-bit microcomputers HD 64180S operating with 10 MHz clocks. The subprocessor section 32 is not provided with any ROM. Consequently, the main processor section 34 achieves a down-loading of the program via the controller b 324 into the RAM b 322 to thereafter initiate the CPU b 321.

The subprocessor section 33 includes, like the subprocessor section 32, an RAM c 332, a CPU c 331, a controller c 334, and a serial controller c 333 to communicate data with a line 336 connected to the B1 or B2 channel. These units are connected to a local bus c 335. The RAM c 332 is a read/write memory for storing therein programs to process the data link control procedures of the B channel, namely, HDLC-BA and HDLC-UN. The capacity of the RAM c 33 is 32 kilobytes. The controller c 334 achieves, as will be described later, a path control between the local bus e 313 and the local bus c 335, an access control for the CPU c 331 to access the RAM c 332, and a command handshake control for the main processor section 34 to instruct operations to the subprocessor section 33 and to receive reports therefrom. The CPU c 331 to execute the programs in the RAM c 332 and the serial controller c 333 are implemented, for example, by use of Hitachi's eight-bit microcomputers HD 64180S operating with 10 MHz clocks. The subprocessor section 33 is not provided with any ROM. Consequently, the main processor section 34 conducts a down-loading of the program via the controller c 334 into the RAM c 332 to thereafter initiate the CPU c 331 in the same way as for the subprocessor section 32 as described above.

The LAPD processing section 35 includes a CPU d 351 for executing programs stored in an ROM d 352, a serial controller d 353 for communicating data with the D channel line 372, and a controller d 354. These constituent elements are connected to a local bus d 355. The ROM d 352 is a memory dedicated to a read operation and is disposed to store therein programs to process the D channel data link control procedure LAPD. The controller d 354 achieves a path control between the local bus a 345 and the local bus d 355. The overall LAPD processing section 35 is implemented by use of, for example, a microcomputer μ PD72305 put to the market from the NEC.

The B channel control section 36 comprises an ADPCM 361, a coder.decoder (CODEC) 363, a driver 364 for establishing a connection to the handset (transceiver) 365, and a line switch circuit 362. The ADPCM 361 is a compressor.expander circuit which compresses 64 Kbps PCM voices from the channel B1 or B2 or from the handset 365 into 32 or 24 Kbps data so as to record the compressed data in the RAM e 312 and which expands the compressed voices in the RAM e 312 to restore the 64 Kbps PCM voice so as to transmit the restored data to the channel B1 or B2 or to the handset 365. The CODEC 363 is a digital/analog conversion circuit having a function to convert 64 Kbps PCM voices into analog data so as to send the analog voice data to the handset 365 and a function developed by conducting the operation above is a reverse order. The line switch circuit 362 connects a B1 channel 373 and a B 2 channel 374 to the lines 326 and 336, the ADPCM 361, or CODEC 362. This circuit 362 further connects the ADPCM 361 to the CODEC 363. The ADPCM 361 is implemented, for example, by use of a μ PD77C30 of the NEC. The CODEC 363 is, for example, constituted with a Hitachi's HD 44278.

The line driver 37 is controlled by the CPU a 341 through the local bus a 345 to separate from the multiplexed ISDN 371 the D channel 372, the B1 channel 373, and the B2 channel 374. For this driver 37, a microcomputer μ PD98201GF of the NEC is employed, for example.

The memory sharing section 31 includes the RAM e 312 and the controller e 311. The RAM e 312 is a shared read/write memory to be accessible from the system bus 22 and the upper-level local bus e 313. The capacity of the RAM e 312 is 512 kilobytes. The controller e 311 achieves, as will be described later, a function of a memory arbitration section when the RAM e 312 is simultaneously accessed from the system bus 22 and the upper-level local bus e 313, a function of a memory arbitration section when the upper-level local bus e 313 is used from the main processor section 34 and the subprocessor sections 32 and 33, and a command shake control for the system processor section 23 to instruct an operation to the main processor section 34 and to receive reports therefrom.

Figure 3:
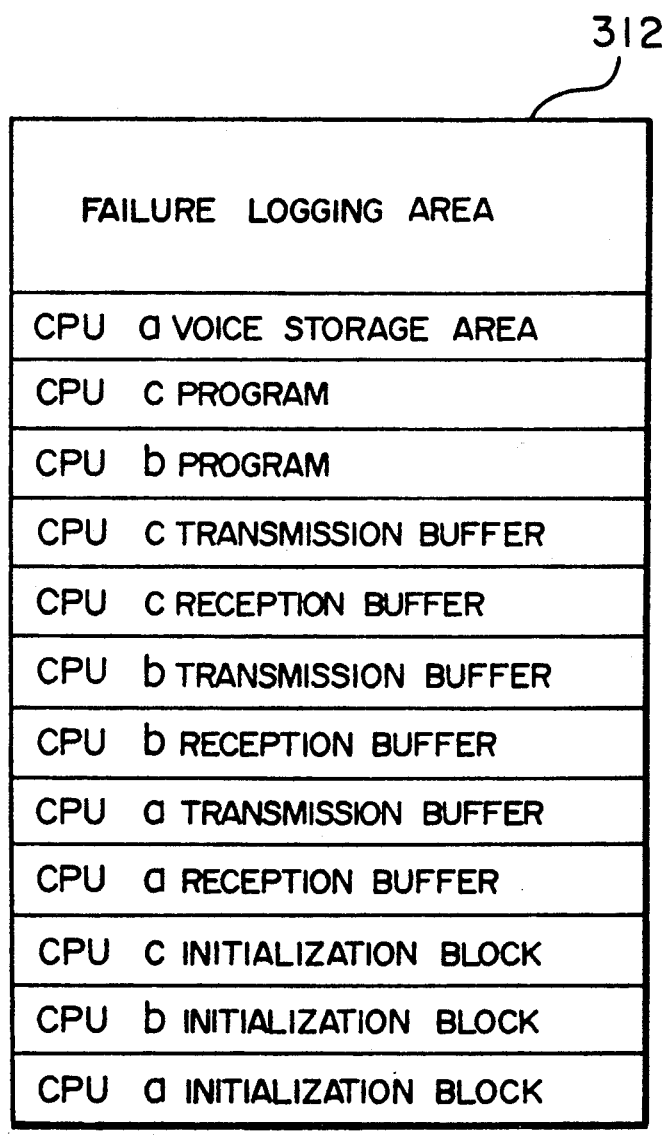
FIG. 3 is a diagram showing a layout of a shared memory area.

FIG. 3 shows a memory storage state in the RAM e 312 of the memory sharing section 31. When the communication adapter 3 is to be initiated, by use of available areas such as transmission and/or reception buffers of the CPU a 341, CPU b 321, or CPU c 331 assigned to the RAM e 312 as shown in FIG. 3, a program of the CPU a 341 is loaded therein from an external memory (not shown) of the system processor section 23, thereby instructing a program loading to the CPU a 341. The CPU a 341 loads the program in the RAM a 343 while executing the loading program in the RAM a 342. Thereafter, the RAM e 312 is set to the storage state of FIG. 3. The CPU a 341 is assigned with an initialization block, transmission and reception buffers for D-channel data communications, and a voice storage area (voice file) for voice communications. The CPU b 321 is assigned with an initialization block, transmission and reception buffers for B-channel data communications, and an area for storing therein programs of the CPU b 321. The CPU c 331 is assigned with an initialization block, transmission and reception buffers for B-channel data communications and an area for storing therein programs of the CPU c 331. The initialization block is disposed for the system processor section 23 to initially pass operation contents, and used so that positions of transmission and reception buffers allocated by means of the adapter are notified to the system processor section 23. CPU b and CPU c programs, which are resident in the RAM e are subjected to a down loading, when necessary, to be loaded in the subprocessor section 32 or 33 by means of the main processor section 34. A failure logging area is disposed to record therein communication and hardware errors occurred in the communication adapter. This area is shared among the CPU a 341, CPU b 321, and CPU c 331.

Figure 4:
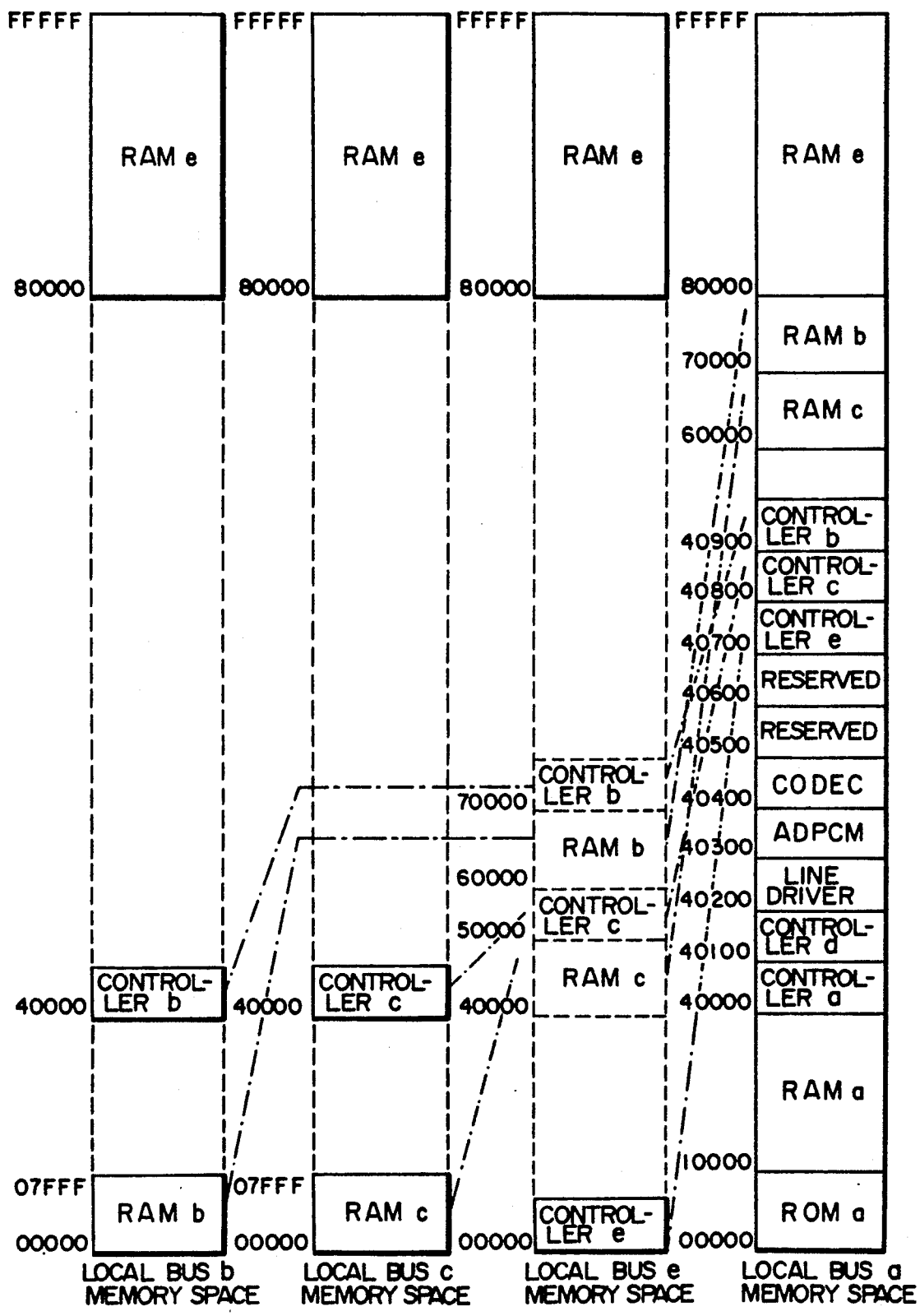
FIG. 4 is a schematic diagram showing memory spaces of local buses.

FIG. 4 shows memory spaces of four local buses in the communication adapter 3 of FIG. 1. This may also be considered to represent memory space locations of hardware resources viewed from the CPUs connected to the respective local buses. Solid lines in the figure denotes portions actually existing in the adapter 3.

The local bus b 325 possesses a memory space of one megabyte in which a 32 kilobyte RAM b 322 for storing therein programs is allocated beginning from the lower-most portion of the memory space, the controller b 324 follows the RAM b 322, and RAM e 312 is allocated in the upper-most location in the memory space. The subprocessor section 32 including the local bus b 325 is a subordinate processor operating under control of the main processor section 34. Namely, the hardware resources of the subprocessor section 33 and the main processor section 34 are invisible from the subprocessor section 32.

The local bus c 335 possesses a memory space of one megabyte in which a 32 kilobyte RAM c 332 for storing therein programs is allocated beginning from the lower-most portion of the memory space, the controller c 334 follows the RAM c 332, and RAM e 312 is allocated in the upper-most location in the memory space. The subprocessor section 33 including the local bus c 335 is a subordinate processor operating under control of the main processor section 34. Namely, the hardware resources of the subprocessor section 32 and the main processor section 34 are invisible from the subprocessor section 33.

The local bus e 313 processes a memory space of one megabyte in which the controller e 311 is allocated in the lower-most portion of the memory space and the RAM e 312 is allocated in the upper-most location in the memory space. In order for the local bus a 345 to access hardware resources of the local bus b 325 and the local bus c 335, the memory allocation is conducted in the order of the RAM c 332, the controller c 334, the RAM b 322, and the controller b 324. The memory space of the RAM c 332 and the controller c 334 is different from that of the local bus b 325. Address translation therebetween is accomplished by the controller c 334, which will be described later. For the RAM b 322 and the controller b 324, such an address translation is accomplished by the controller b 324, which will be described later.

The local bus a 345 processes a memory space of one megabyte in which memory allocation is effected beginning from the lower-most portion of the memory space in an order of the ROM a 342, the RAM a 343, the controller a 344, the controller d 354, the line driver 37, the ADPCM 361, the CODEC 363, the controller e 311, the controller c 334, the controller b 324, the RAM c 332, the RAM b 322, and the RAM e 312. The memory space of the controller e 311, the RAM c 332, the controller c 334, the RAM b 322, and the controller b 324 is different from that of the local bus e 313. Address translation therebetween is accomplished by the controller a 344, which will be described later.

Figure 5:
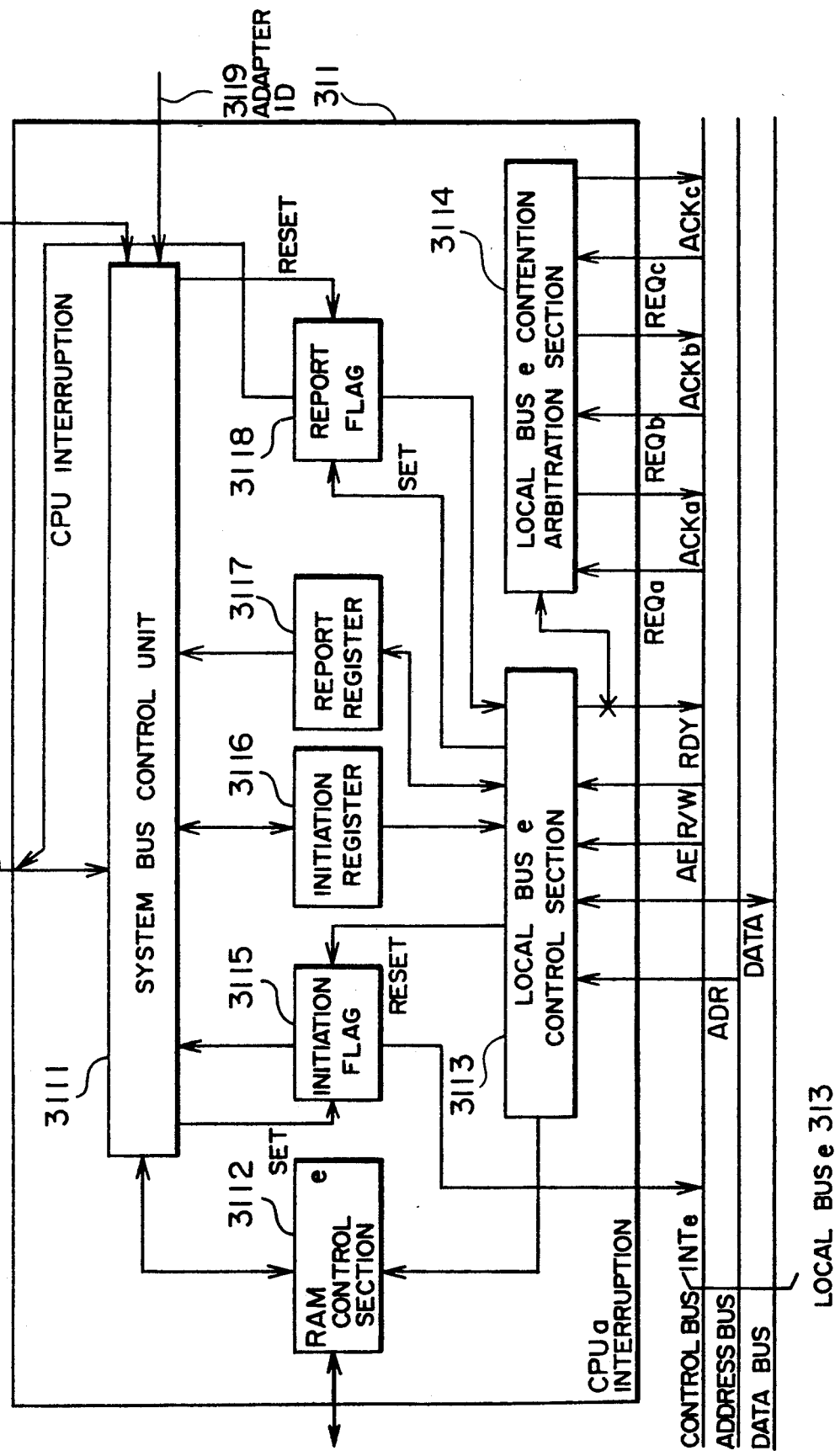
FIG. 5 is a block diagram showing a specific constitution of a controller associated with a memory sharing section.

FIG. 5 is a block diagram showing the constitution of an embodiment of the controller e 311 in the memory sharing section 31 of FIG. 1. The controller e 311 includes a system bus control section 3111 for controlling the system bus 22, a local bus e control section 3113 for controlling the local bus e 313, an RAM control section 3112 for achieving a memory contention arbitration when the RAM e 312 is simultaneously accessed from the system bus 22 and the local bus e 313, an initiation flag 3115, an initiation register 3116, a report flag 3118, a report register 3117, and a local bus e contention arbitration section 3114. The initiation flag 3115 and the initiation register 3116 are respectively used to indicate presence/absence of an operation instruction and to store information of the operation instruction issued from the CPU 2 on the system bus 22 to the CPU a 341 in the main processor section 34. The report flag 3118 and the report register 3117 are respectively disposed to indicate a report and to store information of the report supplied from the CPU a of the main processor section 34 to the CPU 2. The local bus e contention arbitration section 3114 conducts arbitration of bus access contentions when the main processor section 34 and the subprocessor sections 32 and 33 use the local bus e 313 at the same time.

The system bus 22 and the local bus e 313 are asynchronous buses independent of each other. In order for these buses to arbitrarily access the RAM e irrespective of conditions of each other, the RAM control section 3112 recognizes the bus which first issues an access request to the RAM e 312. This section 3112 function such that when the RAM e is being accessed, another access request thereto is set to a wait state.

Referring next to FIG. 5, a description will be given of a transmission as an example of an operation instructed from the system processor section 23 to the main processor section 34. The CPU 2 sets transmission data and operation information of the transmission instruction to the RAM e 312 and the initiation register 3116 so as to thereafter set the initiation flag 3115. As a result, an interruption INTe occurs in the CPU a 341 via the local bus e 313 and hence the CPU a 341 recognizes an initiation of operation issued from the CPU 2. The CPU a 341 then saves the content of the initiation register 3116 into the RAM a 343 and resets the initiation flag 3115 so as to subsequently start the data transmission according to the content of the operation instruction. The initiation flag 3115 is accessible from the CPU 2. Since the initiation flag 3115 has been reset, the CPU 2 recognizes that the main processor section 34 can accept the next operation instruction. This interface enables the main processor section 34 to successivley receive the operation instruction from the CPU 2, thereby guaranteeing that the instruction is not lost. The processing above is immediately executed as an interruption processing in an asynchronous manner with respect to the data communications.

A description will next be given of a receiving operation. The CPU a 341 instructs the LAPD processing section 35 to transfer received data to the RAM e 312. The LAPD processing section 35 receives the data into the RAM e 312. When the receive operation is completely finished, the processing section 35 notifies the condition to the CPU a 341 by use of an interruption. The CPU a 341 checks the termination state of the LAPD processing section 35 to confirm the normal reception of the data, loads the report register 3117 with receive report information, and sets the report flag 3118. As a result, an interruption takes place in the CPU 2. After reading the report information of the report register 3117, the CPU 2 resets the report flag 3118. The CPU a 341 recognizes in response to the reset operation of the report flag 3118 that the CPU 2 is capable of processing the next report from the main processor section 34. This implements an interface to enable the CPU 2 to consecutively receive reports from the CPU a 341, thereby guaranteeing that the report is not lost.

The initiation register 3116 can be subjected to read and write operations from the CPU 2, whereas the report register 3117 is accessible for the read and write operations from the CPU a 341. Namely, data can be read out from both registers. This is because a failure check of the registers is to be conducted by either one of the CPUs on the write operation side.

Next, a description will be given of an outline of operations of the contention arbitrating section 3114 of the local bus e 313 in the controller e 311. In the constitution of FIG. 5, a bus usage request signal (REQ) and a usage acknowledge signal (ACK) are respectively a signal used by the main processor section 34 and the subprocessor section 32 and 33 to request usage of the local bus e 313 and a signal to acknowledge the usage. Signals (ADR), (DATA), (A), (R/W), and (RDY) are respectively a 20-line address signal representing a one-megabyte space, an eight-bit data signal, an address enable signal notifying validity of (ADR), a read/write signal indicating a read/write direction, and a ready signal denoting validity of (DATA). These signals are common to the main processor section 34 and the subprocessor sections 32 and 33.

Figure 6A:
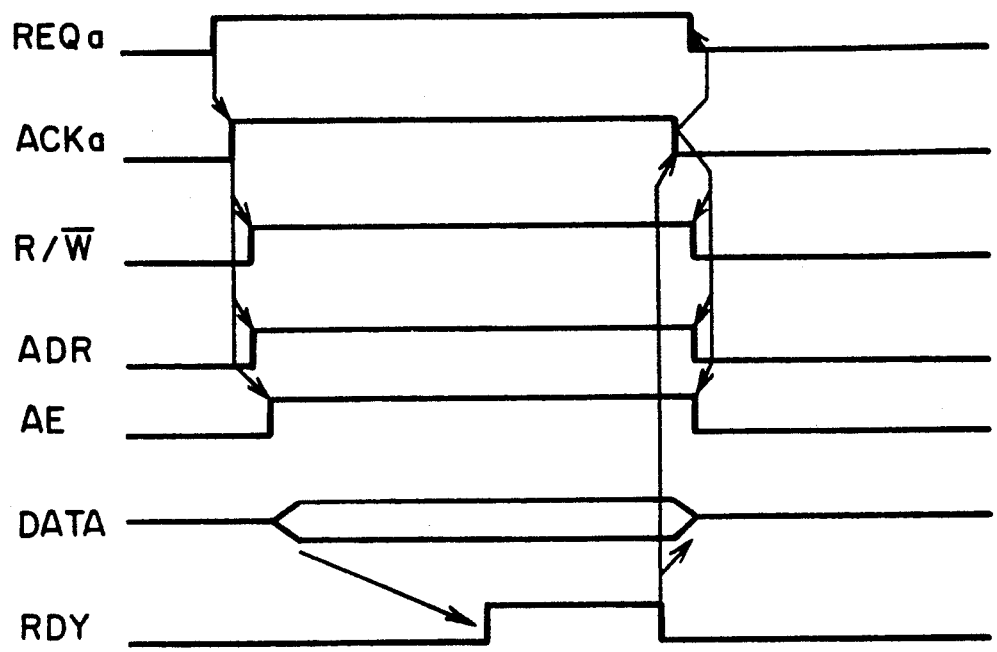
FIGS. 6A and 6B are timing charts of signals on local buses.
Figure 6B:
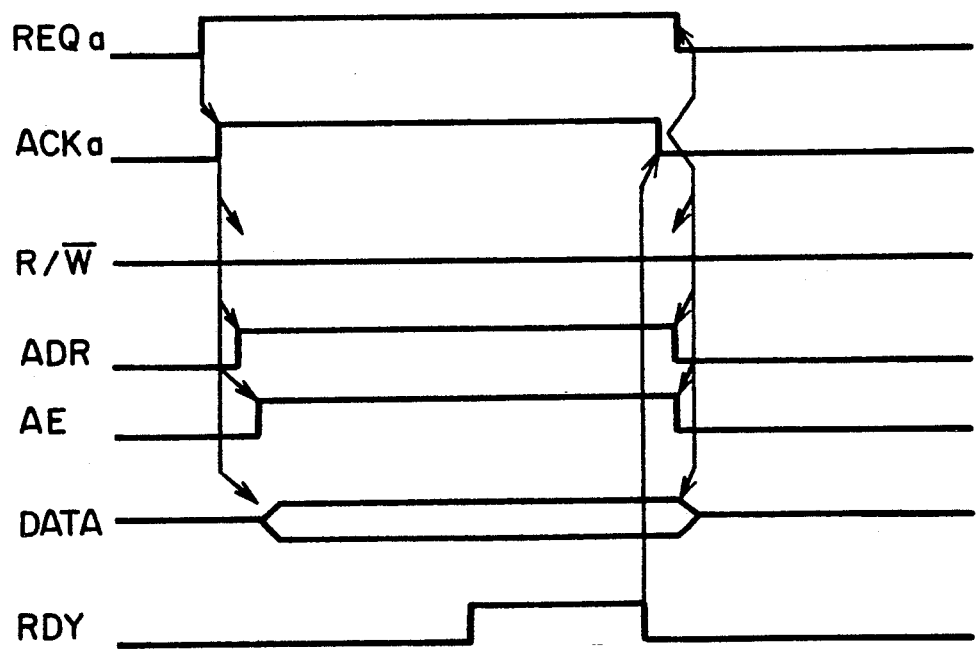

FIGS. 6A and 6B are timing charts respectively of read and write operations as an operation example conducted by the main processor section 34 on the RAM e 312. In FIG. 6A, when the main processor section 34 turns the usage request signal (REQa) of the local bus e 313 on, the local bus e contention arbitrating section 3114 checks the bus usage state. When the local bus e 313 is being used, the request is set to and is retained in a wait state until the usage is finished. When the utilization is completed, the usage acknowledge signal (ACKa) is turned on to pass the bus usage right to the main processor section 34. When (ACKa) is turned on, the main processor section 34 sets the (R/W) signal to the read direction and then outputs a read address of the RAM e 312 to (ADR) and turns (AE) on. The local bus e control section 3113 continuously monitors a state whether or not the controller e 311 or the RAM e 312 has been accessed.

Assuming that a read request onto the RAM e 312 is recognized depending on (AE), (ADR), and (R/W), the local bus e control section 3113 instructs the RAM e control section 3112 to read data from the RAM e 312. When the data is read out therefrom, the local bus e control section 3113 outputs the data as (DATA) signal and then turns the (RDY) signal on to keep the on state for a predetermined period of time. When the (RDY) signal is turned on, the main processor section 34 gets data from the (DATA) at a timing when the (RDY) signal is turned on. Termination of the operation is conducted as follows. When the (RDY) is changed from on to off, the local bus e contention arbitrating section 3114 turns (ACKa) off. As a result, the main processor section 34 immediately turns (REOa), (R/W), (ADR), and (AE) off. The (DATA) signal is turned off at a timing when (RDY) is set to off. When a preset period of time is elapsed after (RDY) is turned off, the local bus e 313 is released so as to accept the next usage request.

The similar procedure is employed by the main processor section 34 to write data in the RAM e 312. In the configuration of FIG. 6B, when the main processor section 34 turns the usage request signal (REQa) of the local bus e 313 on, the local bus e contention arbitrating section 3114 checks the bus usage state. When the local bus e 313 is being used, the request is set to and is retained in a wait state until the usage is finished. When the utilization is completed, the usage acknowledge signal (ACKa) is turned on to pass the bus usage right to the main processor section 34. When (ACKa) is turned on, the main processor section 34 sets the (R/W) signal to the write direction and then outputs a write address of the RAM e 312 to (ADR) and (DATA) and turns (AE) on. The local bus e control section 3113 continuously monitors a state whether or not the controller e 311 or the RAM e 312 has been accessed. Assuming that a write request onto the RAM e 312 is recognized depending on (AE), (ADR), and (R/W), the local bus e control section 3113 instructs the RAM e control section 3112 to write data in the RAM e 312. When the data is being written therein, the (RDY) signal is turned on and is kept in the on state. Termination of the write operation is conducted as follows. When the (RDY) is changed from on to off, the local bus e contention arbitrating section 3114 turns (ACKa) off. As a result, the main processor section 34 immediately turns (REQa), (R/W), (ADR), and (AE) off. The (DATA) signal turns off at a timing when (RDY) is set to off. When a preset period of time is elapsed after (RDY) is turned off, the local bus e 313 is released so as to accept the next usage request. The local bus e contention arbitrating section 3114 can be simply constituted with a gate array and the like based on the operational description above. In consequence, details thereabout will be omitted here.

The controller e 311 of FIG. 5 further possesses an adapter identifying function, an RAM e 312 position specifying function, and a slot identifying function.

The adapter identifying function enables a plurality of identical adapters to be installed in a workstation and different kinds of adapters to be used at the same time. The respective adapters are assigned with identification codes in advance so as to be read from the system processor section 23. In the configuration of FIG. 5, when the controller e 311 is installed in the communication adapter 3, an adapter identifier (ID) 3119 is fed from the adapter board (FIG. 13) to the controller e 311. The system bus control section 3111 provided with an adapter identifier register (not shown) is responsive to an adapter identifier read request received from the CPU 2 via the system bus 22 so as to output the adapter identifier 3119. In this embodiment, the adapter identifier is assumed to be designated with a binary representation "1011".

Thanks to the RAM e position specifying function, the RAM e 312 integrally installed in the communication adapter 3 to be used by the system processor section 23 can also be dynamically located from the system processor section 23. The system bus control section 3111 of FIG. 5 has an RAM e pointer (not shown). The RAM e pointer is a register designating a first position of the RAM e 312 viewed from the system bus 22. The content of the pointer is initially set by the system processor section 23. After the pointer initialization, an address stored in the system bus 22 is compared with the RAM e pointer such that when these contents match with each other, the system control section 3111 issues a read/write request to the RAM e control section 3112 to achieve the pertinent request onto the RAM e 312.

Figures 7A, 7B:
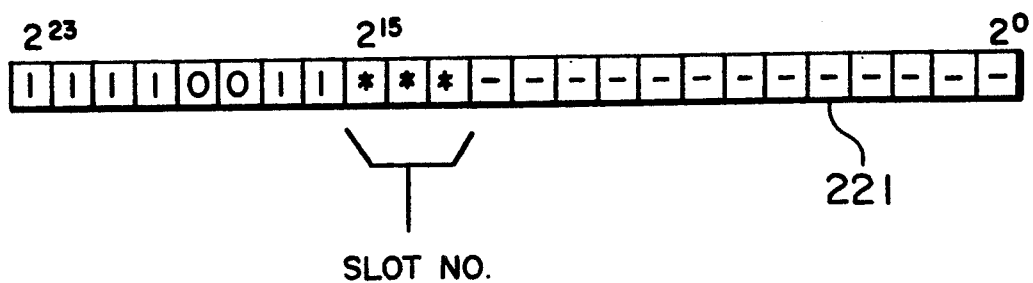
FIGS. 7A and 7B are diagrams useful to explain relationships between slot numbers and memory areas allocated thereto.

The slot identifying function enables, when there are disposed slots (FIG. 16) in a workstation, to a plurality of adapters to be inserted therein so as to arbitrarily install communication adapters 3 therein regardless of the slot positions. In FIG. 5, each slot is assigned with, in addition to the signal of the system bus 22, a unique slot number 221. When the slot number 221 is received, the system bus control section 3111 alters addresses of the various registers viewed from the system processor section 23 depending on the slot number 221. Registers viewed from the system processor section 23 include the adapter identifier register and the RAM e pointer, furthermore, the initiation flag 3115, the initiation register 3116, the report register 3117, and the report flag 3118 of FIG. 5. These registers are allocated, for example, as shown in FIGS. 7A and 7B. Namely, for the system bus 22 having a 16 megabyte memory space, a slot number 0 is assigned with a range represented in a hexadecimal representation "F30000 to F31FFF". Subsequently, the slots are similarly assigned for each eight kilobyte space. The system bus control section 3111 may possibly be implemented by such constituent elements as those adopted, for example, in the Hitachi's workstation 2050/32.

Figure 8:
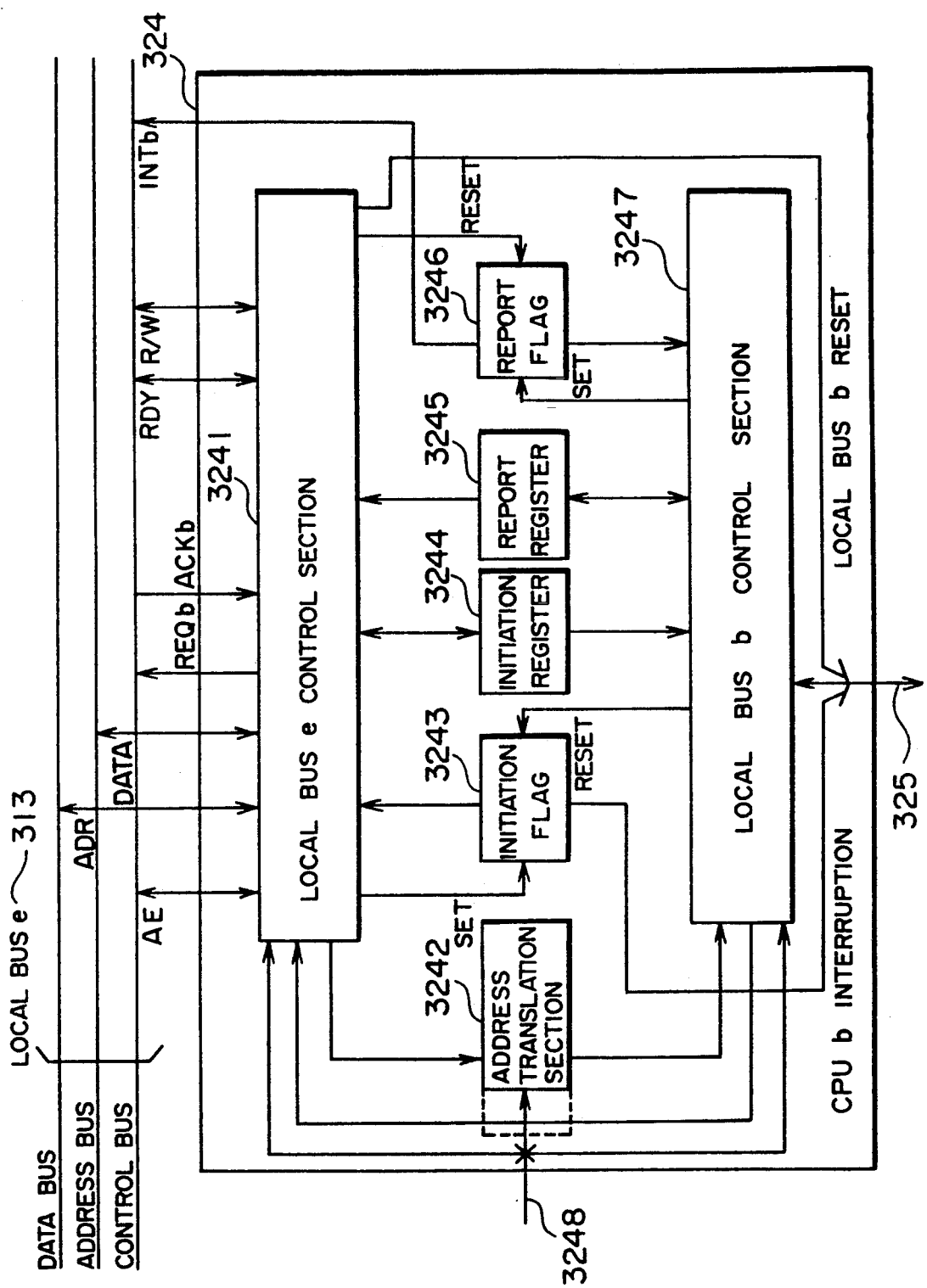
FIG. 8 is a block diagram showing the configuration of a controller of a subprocessor section 32.

FIG. 8 is a block diagram showing the configuration of an embodiment of the controller b 324 of FIG. 1. The controller b 324 includes a local bus control section 3241, a local bus b control section 3247 for controlling the local bus b 325, an initiation flag 3243, an initiation register 3244, a report flag 3246, a report register 3245, and an address translation or conversion section 3242. The initiation flag 3243 and the initiation register. 3244 are disposed respectively to indicate presence/absence of an operation instruction and to store information of the operation instruction from the CPU a 341 of the main processor section 34 to the CPU b 321 of the local bus b 325. The report flag 3246 and the report register 3245 are respectively used to designate a report and to store therein report information from the CPU b 321 to the CPU a 341.

The address translation section 3242 accomplishes an address translation, when the local bus e 313 accesses the RAM b 322, to attain an address of the local bus b 325 shown in FIG. 4. Since the access is directed from the local bus e 313 to the local bus b 325, the data flows in a direction in the address translation section 3242.

Referring next to FIG. 8, a description will be given of an operation instruction from the main processor section 34 to the subprocessor section 32 by use of an example of a transmission. The CPU a 341 respectively loads transmission data and operation information of the transmission instruction in the RAM e 312 and sets the initiation flag 3243. In response thereto, the CPU b 321 is interrupted via the local bus b 325, which informs the CPU b 321 of an operation initiation from the CPU a 341. Thereafter, the CPU b saves the content of the initiation register 3244 into the RAM b 322 and resets the initiation flag 3242, thereby starting the data transmission depending on the content of the operation instruction. The initiation flag 3243 can be accessed from the CPU a 341 for a read operation. The event that the initiation flag 3243 has been reset notifies the CPU a 341 that the subprocessor section 32 is ready to receive the next operation instruction. This enables the subprocessor section 32 to continuously receive operation instructions from the CPU a 341, thereby guaranteeing that the operation instruction is not lost. This processing is immediately executed as an interruption processing in an asynchronous fashion with respect to the data communications.

Next, a description will be given of the data receiving operation. The CPU b 321 instructs the serial controller b 323 to transfer received data to the RAM e 312. When the serial controller b 323 completely receives the data and the reception is terminated, the controller b 323 notifies the termination to the CPU b 321 by use of an interruption. By checking the termination state of the serial controller b 323, the CPU b 321 recognizes the normal termination of the data reception so as to load receive report information in the report register 3245 and to set the report flag 3246. This results in an interruption in the CPU a 341, which then reads the report information from the report register 3245 and resets the report flag 3246. The event that the report flag 3246 has been reset notifies the CPU b 321 of a condition that the CPU a 341 is read to process the next report from the subprocessor 32. This implements an interface which enables the CPU a 341 to successively receive reports from the CPU b 321, thereby guaranteeing that the report is not lost. The initiation register 3244 and the report resisters 3245 are respectively accessible from the CPU a 341 and the CPU b 321 for the read and write operations. This provision of the readable registers is disposed because a failure check of the registers is to be accomplished by either CPU on the write operation side.

A signal 3248 denotes a controller identifier (ID) to discrimate between the controller b 324 and the controller c 334. The controller 324 b is identical to the controller c 334 and hence these circuits are discriminated by use of the controller identifier 3248. In the local bus e control section 3241, when the local bus e 313 is set to an active state, whether or not a write/read request is received by the subprocessor 32 is judged by use of the controller identifier 3248. The address translation section 3242 conducts an address translation as shown in FIG. 4 based on the controller identifier 3248. The controller identifier 3248 may also be read by a program of the subprocessor 32 via the local bus b control section 3247.

Figure 9:
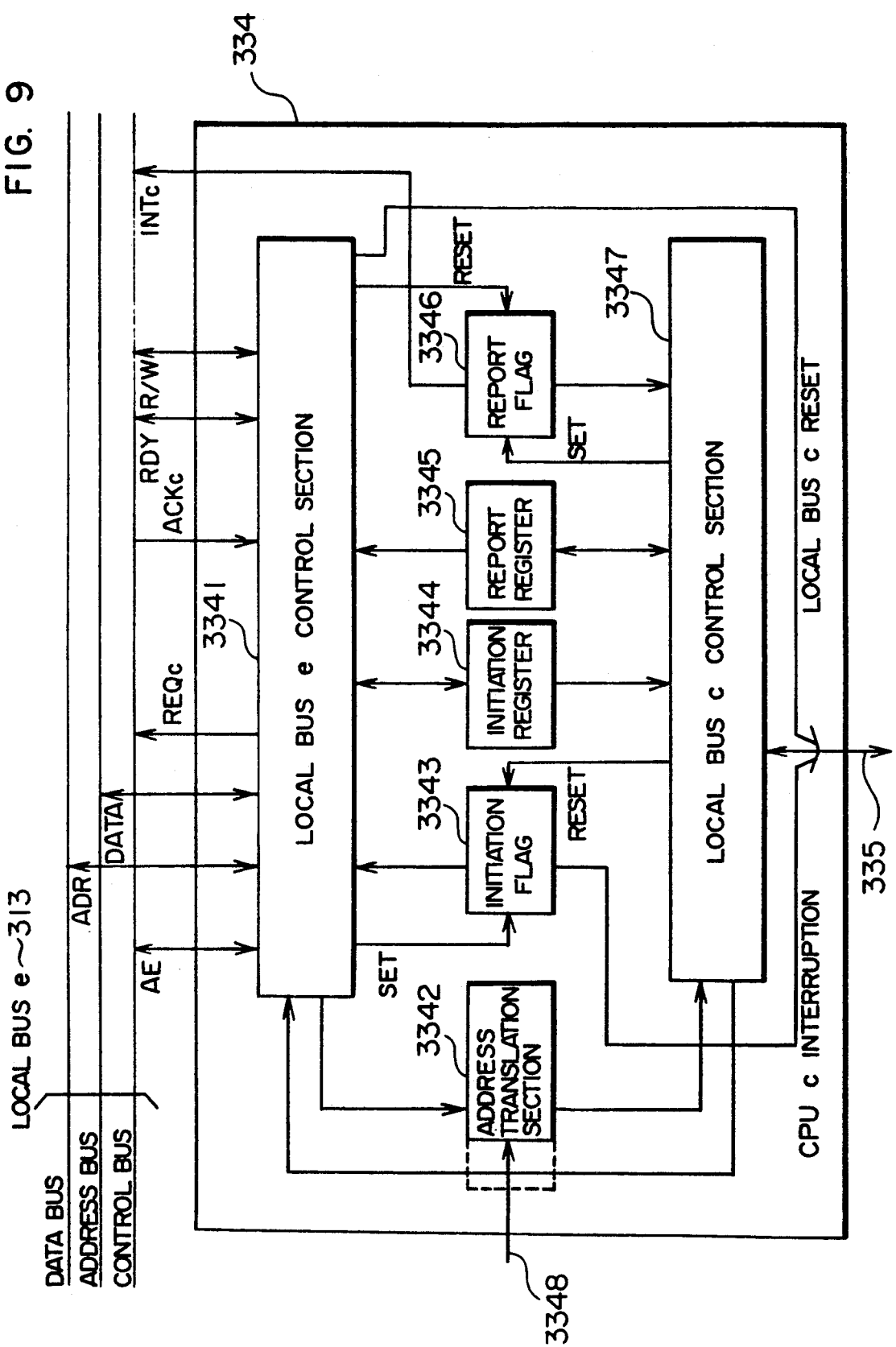
FIG. 9 is a block diagram showing the constitution of a controller of a subprocessor section 33.

FIG. 9 is a block diagram showing the constitution of the controller c 334 of FIG. 1. The controller c 334 includes a local bus e control section 3341, a local bus c control section 3347 for controlling the local bus c 335, an initiation flag 3343, an initiation register 3344, a report flag 3346, a report register 3345, and an address translation section 3342. The initiation flag 3343 and the initiation register 3344 are respectively disposed to indicate presence/absence of an operation instruction and to store information of the operation instruction from the CPU a 341 of the main processor section 34 to the CPU c 331 of the local bus c 335. The report flag 3346 and the report register 3345 are respectively used to designate a report and to store information of the report from the CPU c 331 to the CPU a 341. The address translation section 3342 achieves, when the local bus e 313 accesses the RAM c 332, an address translation to attain an address of the local bus c 335 as shown in FIG. 4. The signal flows in a direction from the local bus e 313 to the local bus c 335 for this access.

Next, referring to FIG. 9, a description will be given of an operation instruction from the main processor section 34 to the subprocessor section 33 by use of an example of transmission. The CPU a 341 sets transmission data in the RAM e 312, loads operation information of the transmission instruction in the initiation register 3344, and then sets the initiation flag 3343. This causes an interruption to take place via the local bus c 335 onto the CPU c 331, which in turn recognizes an event that an operation initiation is received from the CPU a 341. Subsequently, the CPU c 331 saves the content of the initiation register 3344 into the RAM c 332, resets the initiation flag 334, and then starts data transmission depending on the content of the operation instruction. The content of the initiation flag 3342 can be read out by the CPU a 341. The condition that the initiation flag 3343 has been reset notifies the CPU a 341 that the subprocessor section 33 is ready to receive the next operation instruction. This implement an interface that the subprocessor section 33 can successively receive operation instructions from the CPU a 341, thereby guaranteeing the instructions not to be lost. This processing is immediately carried out as interruption processing in an asynchronous fashion with respect to the data communications.

A description will next be given of a receive operation. The CPU c 331 instructs the serial controller c 333 to transfer received data to the RAM e 312. When the serial controller c 333 completely receives data, the controller c 333 causes an interruption onto the CPU c 331 to notify the completion. Checking the completion state of the serial controller c 333, the CPU c 331 recognizes the normal termination of the reception, stores reception report information in the report register 3345, and sets the report flag 3346. This results in an interruption occurring in the CPU a 341. The CPU a 341 then obtains the report information from the report register 3345 and thereafter resets the report flag 3346. Since the report flag 3346 has been reset, the CPU c 331 recognizes that the CPU a 341 is ready for the processing of the next report from the subprocessor section 33.

The operation above is an interface for the CPU a 341 to consecutively receiving reports from the CPU c 331, thereby guaranteeing that the reports are not lost.

The initiation register 3344 and the report register 3345 are accessible for read and write operations from the CPU a 341 and the CPU c 331, respectively. The read operation is here allowed such that failures of these registers are to be checked by the CPUs on the write side.

A signal 3348 indicates a controller identifier for discriminating between the controller b 324 and the controller c 334. These controllers are of the same constitution and are to be discriminated by the controller identifier. When the local bus e 313 is set to an active state, the local bus e control section 3341 judges to determine by use of the controller identifier 3348 whether or not a write/read request is issued to the subprocessor section 33. The address translation section 3342 translates an address by use of the controller identifier 3348 as shown in FIG. 4. The controller identifier 3348 may be read out by a program in the subprocessor section 33 via the local bus c control section 33.

Figure 10:
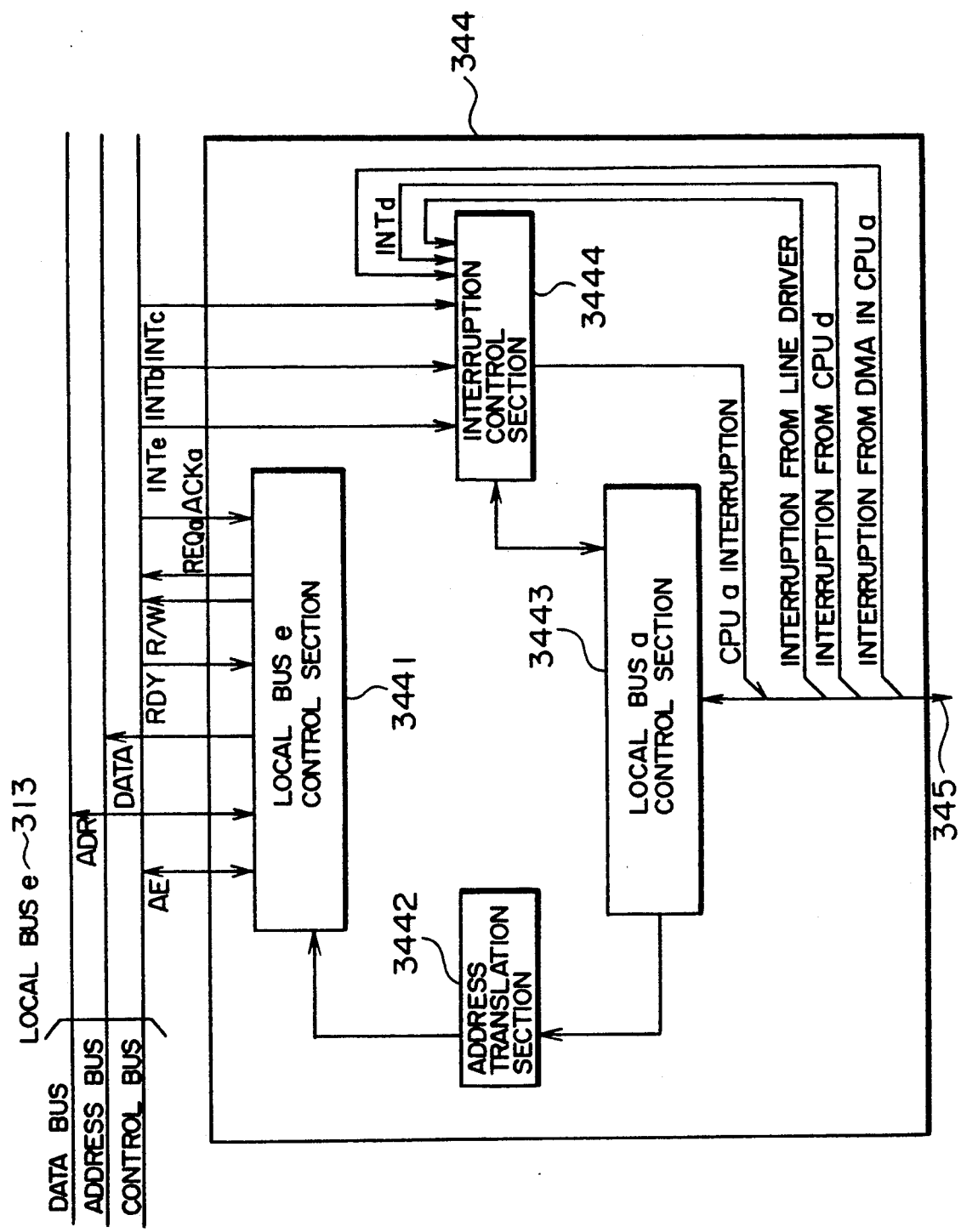
FIG. 10 is a block diagram showing the configuration of a controller of a main processor section 34.

FIG. 10 is a block diagram showing the constitution of the controller a 344 of FIG. 1. The controller a 344 includes a local bus e control section 3441 controlling the local bus e 313, a local bus a control section 3443 controlling the local bus a 345, an address translation section 3442, and an interruption control section 3444. The address translation section 3442 is operative when the CPU a 341 accesses a controller e 311, an RAM c 332, a controller c 334, an RAM b 322, and a controller b 324 to achieve an address translation for an address on the local bus e 313 shown in FIG. 4. This access is achieved from the CPU a 341 in one direction, and hence the data flows in one direction in the address translation section 3442.

The interruption control section 3444 computes a logical sum of six interruption signals including the INTe signal from the initiation flag 3115 of the controller e 311, the INTb signal from the initiation flag 3243 of the controller b 324, the INTc signal from the initiation flag 3343 of the controller c 334, the send/receive termination interruption signal from the CPU d 351, the abnormality notification interruption signal from the line driver 37, and the ADPCM termination interruption signal from the DMA control section integrally disposed in the CPU a 341. When either one of these signals is turned on, the interruption control section 3444 causes an interruption to occur in the CPU a 341 via the local bus a 345. When recording voices in the RAM e 312 and reproducing the voices therefrom, by combining the direct memory access (DMA) in the CPU a 341 with the ADPCM 361, the input and output operations of the voices can be achieved without necessitating an intervention of a program. The ADPCM termination interruption takes place at a termination of transfer of data including a preset number of DMA bytes. The CPU a 341 gets an interruption cause through the local bus a control section 3443 to accomplish processing associated with the interruption cause. When a plurality of interruptions occur at the same time, the CPU a 341 assigns priority levels thereto. Namely, the interruptions having the lower priority levels are masked by use of a mask register (not shown) disposed in the interruption control section 3444 so as to be set to a wait state.

Figure 11A:
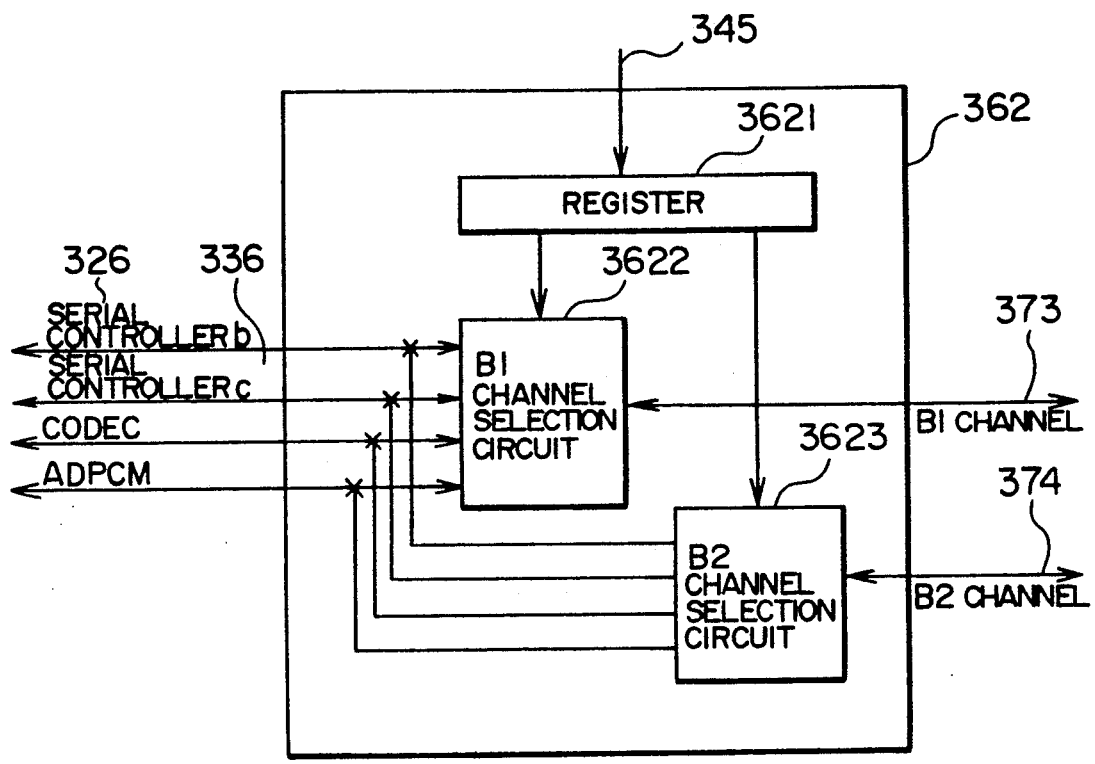
FIG. 11A is a block diagram showing the configuration of a line switching circuit 362.
Figure 11B:
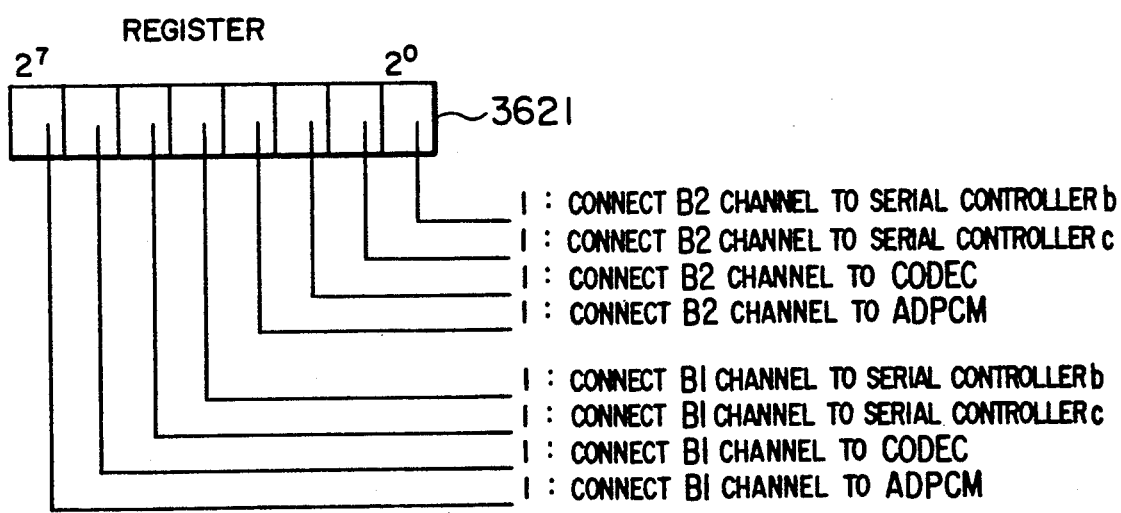
FIG. 11B is a diagram schematically showing functions of respective bits of a register 3621.

FIG. 11A is a block diagram showing the configuration of the line or channel switching circuit 362 of FIG. 1. This circuit 362 includes a register 3621, a B1 channel selection circuit 3622, and a B2 channel selection circuit 3623. The register 3621 is used to store therein information of a change-over operation between the B1 and B2 channels. This register 3621 is set by the CPU a 341 via the local bus a 345. As shown in FIG. 11B, the register 3621 comprises eight bits, which are classified into two 4-bit groups to be respectively connected to the B1 and B2 channel selection circuits 3622 and 3623. The B1 channel selection circuit 3622 connects a B1 channel 372 separated by the line driver 37, depending on the content of the register 3621, to one or a plurality of the lines including a line 326 of the serial controller b 323, a line 336 of the serial controller c 333, the CODED 363, and the ADPCM 361. Similarly, the B2 channel selection circuit 3623 links a B2 channel 374 separated by the line driver 37, according to the content of the register 3621, to one or a plurality of the lines including a line 326 of the serial controller b 323, a line 336 of the serial controller c 333, the CODED 363, and the ADPCM 361. The selection lines of the B1 channel selection circuit 3622 are ORed with those of the B2 channel selection circuit 3623. The B1 or B2 channels may be linked with the handset 365 so as to simultaneously record data in the RAM e 312. In this situation, the register 3621 need only be loaded with a binary representation "11000000" or "00001100". When locally achieving recording and playback operations by use of the handset 365 and the RAM e 312, it is only necessary, like in the case above, to set the register 3621 to a binary representation "11000000" or "00001100" and to open the B1 channel 373 or the B2 channel 374 with respect to the line driver 37 so as to separate the pertinent channel from the ISDN 371.

Figure 13:
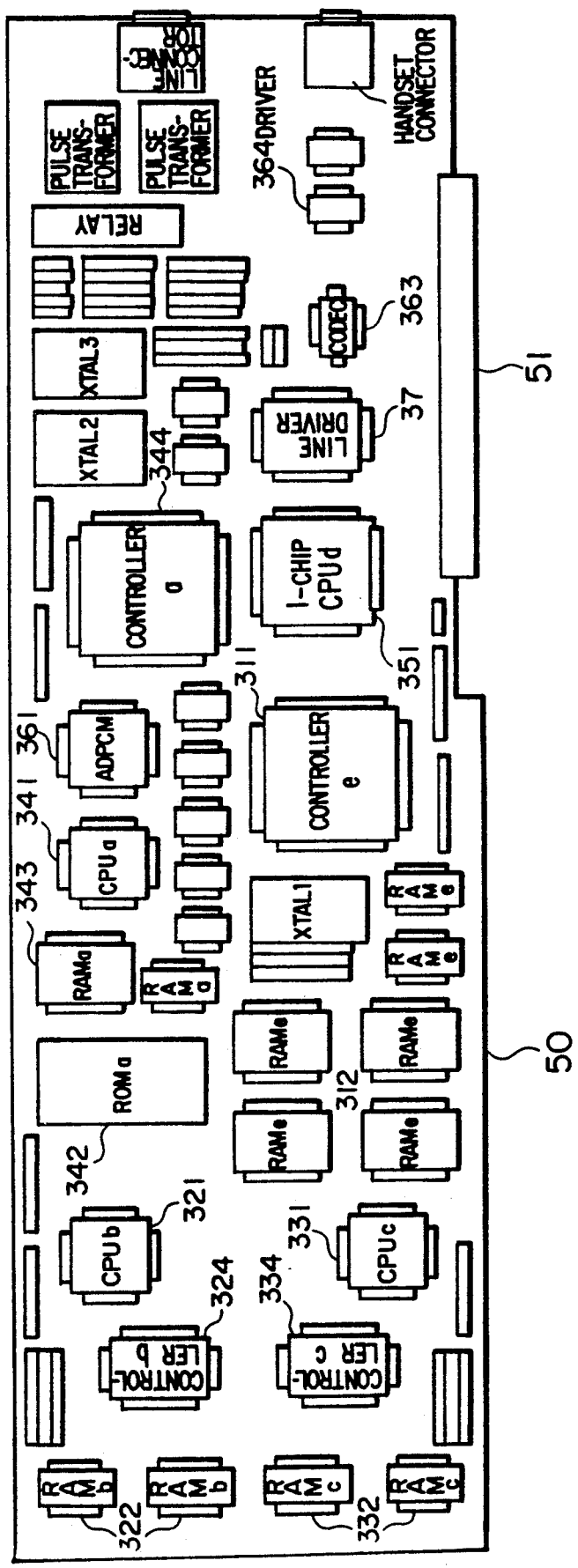
FIG. 13 is a plan view of a communication adapter on which the communication controller according to the present invention is installed.
Figure 14A:
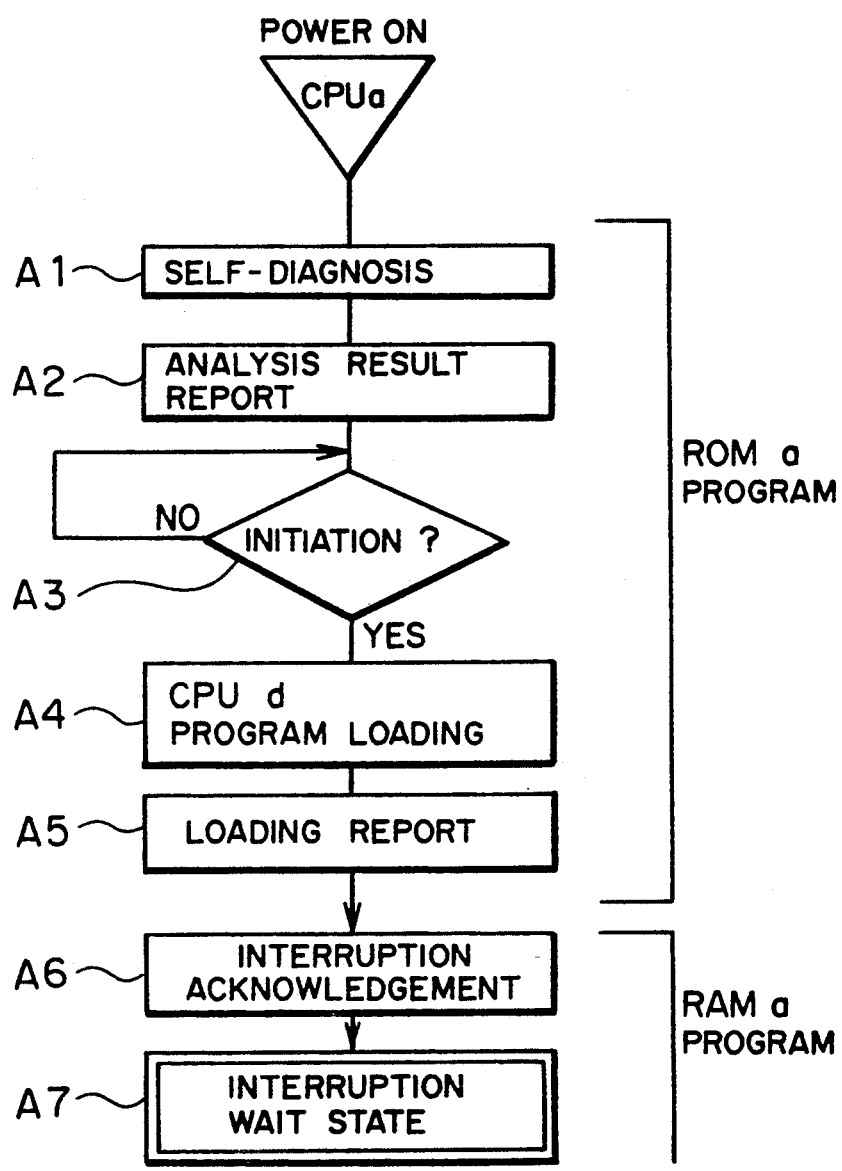
Figure 17:
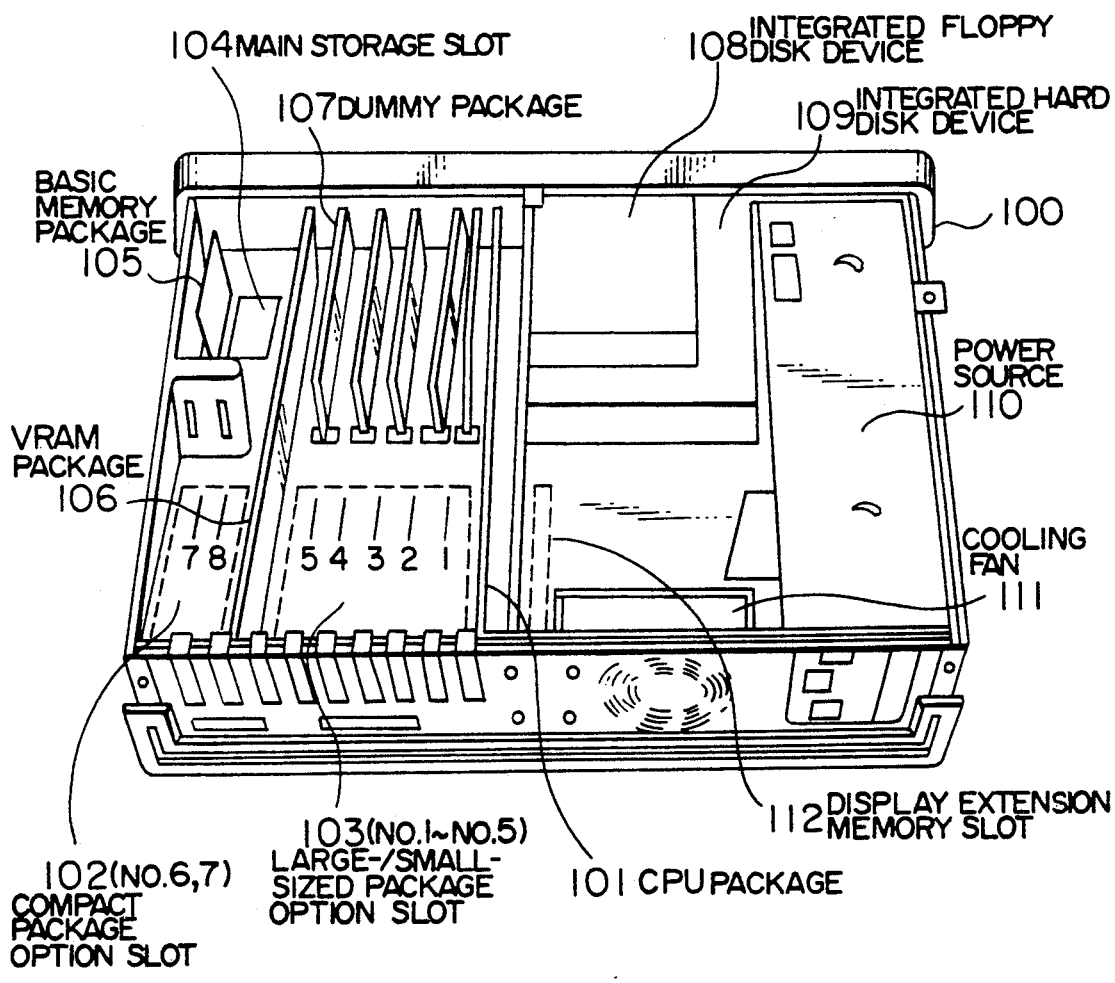
FIG. 17 is a diagram showing allocations of constituent components in a casing of a workstation.

FIG. 13 shows an example of the communication adapter 3 on which constituent components are actually mounted. The communication adapter 3 is implemented as a board 50 having a size of 335 mm by 100 mm. In this structure, Xtal1 designates a crystal oscillator oscillating at 19.6608 MHz. The oscillation output waveform is shaped through the controller e 311 so as to be fed via a multiplexer to three CPUs including the CPU a 341, CPU b 321, and CPU c 331. Xtal2 is a crystal oscillator oscillating at 16.384 MHz. The oscillation output waveform is shaped through the controller a 344 so as to be divided by two. The resultant 8.192 MH clock is fed the ADPCM 361 and the LAPD processing section 35. Xtal3 is a crystal oscillator oscillating at 12.288 MHz and is directly connected to the line driver 37. Rectangles arranged in the longitudinal and horizontal directions respectively designate pull-up registers each implemented in a module to drive the associated circuits. Disposed in this constitution is a relay, which is used to separate the communication adapter 3 from the IDSN 371 when the adapter 3 is not powered. Two pulse transformers are employed to establish alternate-current (ac) coupling by removing direct-current (dc) components from the transmission and reception signals. ICs not named represent a multiplexer for supplying a portion of address signals from the system bus 22 and the local bus e 313 to the RAM e 312 and a circuit for directly connecting a portion of address signals from the local bus e 313 and the local bus a 345. The communication adapter 3 is inserted for a connection into a connector 51 of the body of the workstation 1. For example, the workstation 1 is housed as shown in FIG. 17. The workstation 1 has option slot numbers 1 to 5, namely, any free slots are available for the installation of the communication adapter 3. The housing arrangement is implemented in the Hitachi's workstation 2050/32. When the slot section 103 associated with slot numbers 1 to 5 is used, it is necessary to remove a dummy package 107 associated therewith. The CPU package 101 and the basic memory package 105 respectively correspond to the CPU 2 and the main memory 21 of FIG. 1.

FIGS. 14A, 14B, 15A-15E, 16A and 16B are flowcharts showing an operation example of the communication adapter 3. When the adapter 3 is powered, the program in the ROM a 342 of the main processor section 34 is executed by the CPU a 341 beginning from address 0. The CPU d 351 executes a program in the ROM d 352 beginning from address 0. On the other hand, the CPU b 321 and the CPU c 331 are in a halt state because the controller b 324 and the controller c 334 have issued a reset instruction to the local bus b 325 and the local bus c 335. The CPU a 341 conducts, in a step A1 of FIG. 14A, a write and read check on all memories and registers accessible therefrom. In a step A2, the check result is reported via the controller e 311 to the CPU 2 and then a wait state is established to await an initiation from the CPU 2. On receiving an operation instruction of a program loading from the CPU 2, the CPU a 341 loads the program, in a step A4, from the RAM e 312 to the RAM a 343. At a completion of the loading, a step A5 is achieved to report the loading end to the CPU 2, thereby passing control to the program in the RAM a 343. The program then sets the CPU a 341 to an interruption acceptable state and enters a wait state awaiting an initiation from the CPU 2. Any initiations from the CPU 2 are accepted by use of the INTe signal.

Referring now to FIG. 14B, when the CPU a 341 is initiated from the CPU 2 for the CPU b program loading, a step B1 is conducted to transfer a program from a predetermined CPU b program area of the RAM e 312 to the RAM b 322. In a step B2, the controller b 324 is instructed to release the reset state of the local bus b 325. As a result, the CPU b 321 executes the program in the RAM b 322 beginning from address 0. When the program loading is completed and the CPU b 321 is initiated, the CPU a 341 reports in a step B3 to the CPU 2 that the CPU b program loading is completed. Control is then returned from the interruption processing to the original step A7 so as to wait for the next interruption.

On receiving an initiation of "CPU b transmission" from the CPU 2, the CPU a 341 initiates the CPU b 321 in a step B4 via the controller b 324 for the transmission. Control is then passed from the interruption processing to the original step A7 so as to wait for the next interruption. The transmission data has been stored in this state in a CPU b transmission buffer allocated in the RAM e 312. The transmission end is achieved in the INTb interruption processing.

When the CPU a 341 receives from the CPU 2 an initiation for "CPU c program loading", a step B5 is conducted to transfer a program from a predetermined CPU c program area of the RAM e 312 to the RAM c 332. In a step B6, the controller c 334 is instructed to release the reset state of the local bus c 3335. As a result, the CPU c 331 executes the program in the RAM c 332 beginning from address 0. When the program loading is completed and the CPU c 331 is initiated, the CPU a 341 reports in a step B7 to the CPU 2 that the CPU c program loading is completed. Control is then returned from the interruption processing to the original step A7 so as to wait for the next interruption.

On receiving an initiation of "CPU c transmission" from the CPU 2, the CPU a 341 initiates the CPU c 331 in a step B8 via the controller c 334 for the transmission. Control is then passed from the interruption processing to the original step A7 so as to wait for the next interruption. The transmission data has been stored in this state in a CPU c transmission buffer allocated in the RAM e 312. The transmission termination is achieved in the INTc interruption processing.

When the CPU a 341 receives an initiation for "call setup" from the CPU 2, a step B9 is executed to achieve a call control processing in conformity with the CCITT Recommendations I.451. In a step B10, the LAPD processing section 35 is initiated for "call setup". Control is then returned from the interruption processing to the original step A7 so as to wait for the next interruption. Detailed information for the call setup is stored in the CPU a transmission buffer of the RAM e 312. A report of the call setup termination is accomplished in the INTd interruption processing.

On receiving from the CPU 2 an initiation for "D channel packet transmission", the CPU a 341 initiates the LAPD processing section 35 in a step B11 for the packet transmission. Control is then returned from the interruption processing to the original step A7 so as to wait for the next interruption. The transmission data is stored in the CPU a transmission buffer of the RAM e 312. A termination report of the D channel packet transmission is accomplished in the INTd interruption processing.

When the CPU a 341 receives an initiation for "line driver" from the CPU 2, a step B12 is executed to instruct the line driver 37 to set the ISDN lines to the activated state. In a step B13, a termination report of the line driver initiation is sent to the CPU 2. Control is then passed to the original step A7 to wait for the next interruption. The line driver 37 sets the ISDN lines to the available or ready state in conformity with the ISDN Layer 1 protocol.

On receiving a CODEC initiation from the CPU 2, the CPU a 341 sets an operation mode in a step B14 to the CODEC 363. In a step B15, a report of the initiation termination is delivered to the CPU 2. Control is then passed to the original step A7 to wait for the next interruption. Operation mode information to the CODEC 363 is stored in the CPU a initial setup block of the RAM e 312.

When the CPU a 341 receives an ADPCM initiation from the CPU 2, a step B16 is conducted to set an operation mode to the ADPCM 361 and the DMA controller in the CPU a 341. Control is then passed to the original step A7 to wait for the next interruption. Operation mode information is stored in the initiation register 3116 of the controller e 311 when the CPU 2 is initiated. The termination report of the ADPCM initiation is carried out in the DMA interruption processing associated with the DMA controller in the CPU a 341.

On receiving a "line switching" initiation from the CPU 2, the CPU a 341 sets, in a step B17, switching information to the line switching circuit 362. In a step B18, the termination report of this initiation is sent to the CPU 2. Control is then passed to the original step A7 to wait for the next interruption. Line switching information is passed via the initiation register 3116 of the RAM e 312.

Figure 15A:
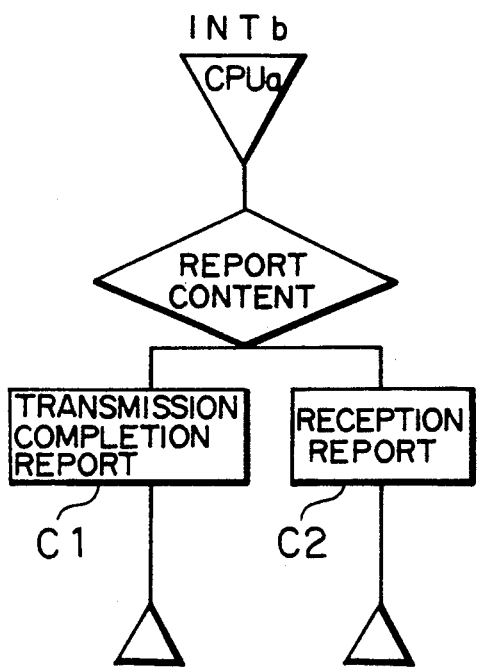

On receiving an initiation for a transmission completion from the CPU b 321, the CPU a 341 executes a step C1 of the flowchart of FIG. 15A to report the transmission completion to the CPU 2. Control is then passed from the interruption processing to the initial step A7 to await the next interruption.

When a reception report is received from the CPU b 321, the CPU a 341 achieves a step C2 to inform the CPU 2 of an event of the reception. Control is then passed from the interruption processing to the initial step A7 to await the next interruption. The receive data is stored in the CPU b reception buffer of the RAM e 312, whereas the detailed information items of the reception such as a data position and a data length are loaded in the report register 3245 of the controller b 324. These data items are copied onto the report register 3117 of the controller e 311 so as to notify the information items to the CPU 2.

Figure 15B:
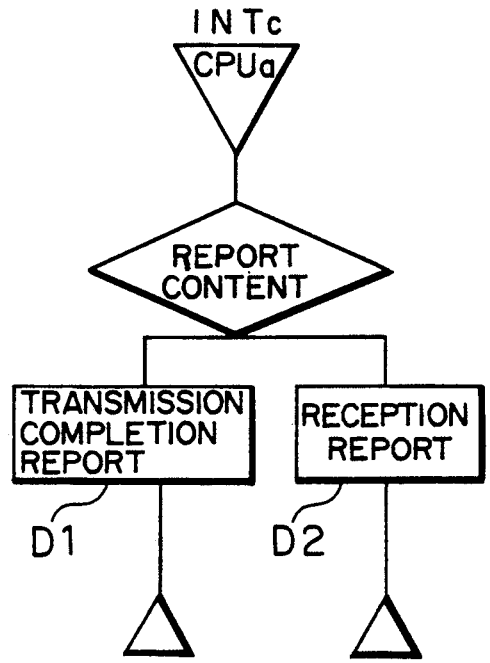

On receiving an initiation for a transmission completion from the CPU c 331, the CPU a 341 executes a step D1 of the flowchart of FIG. 15B to report the transmission completion to the CPU 2. Control is then passed from the interruption processing to the initial step A7 to wait for the next interruption.

When a reception report is received from the CPU c 331, the CPU a 341 achieves a step D2 to inform the CPU 2 of an event of the reception. Control is then passed from the interruption processing to the initial step A7 to wait for the next interruption. The receive data is stored in the CPU c reception buffer of the RAM e 312, whereas the detailed information items of the reception such as a data position and a data length are loaded in the report register 3245 of the controller c 324. These data items are transcribed onto the report register 3117 of the controller e 311, thereby notifying the information items to the CPU 2.

Figure 15C:
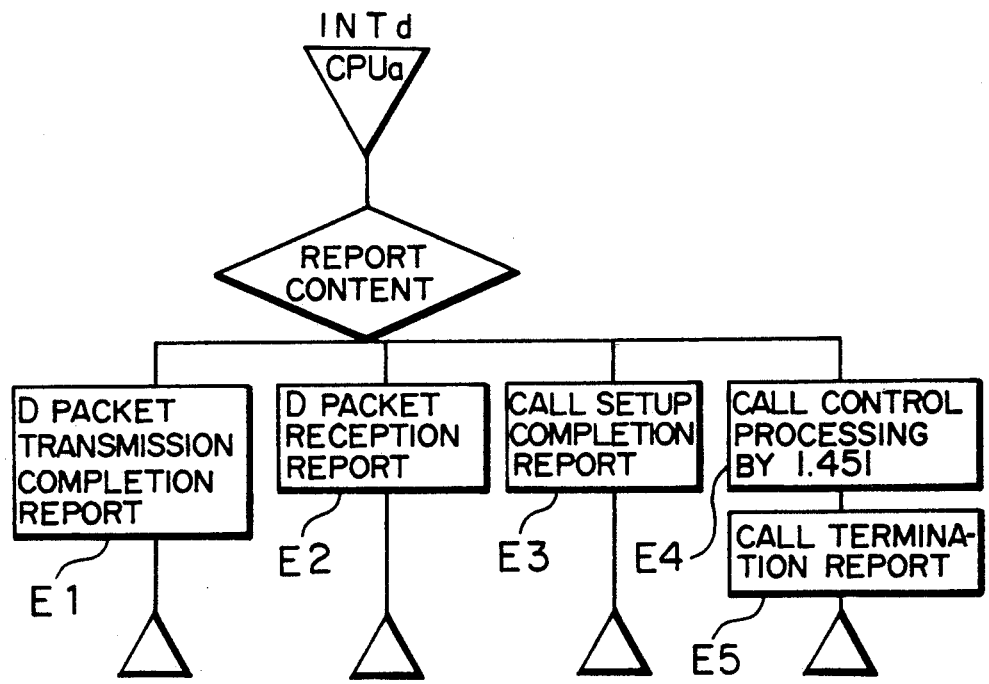

When a report of "packet transmission completion" is received from the LAPD processing section 35, the CPU a 341 conducts a step E1 of FIG. 15C to inform the CPU 2 the completion of the D channel packet transmission. Control is then passed from the interruption processing to the initial step A7 to wait for the next interruption.

On receiving a reception report from the LAPD processing section 35, the CPU a 341 executes a step E2 to notify the reception to the CPU 2. Control is then passed from the interruption processing to the initial step A7 to wait for the next interruption. The receive data is stored in the CPU a reception buffer of the RAM e 312, whereas the detailed information items of the reception such as a data position and a data length are passed to the CPU 2 by use of the report register 3117 of the controller e 311.

When the CPU a 341 receives a report of a call steps completion from the LAPD processing section 35, the CPU a 341 achieves a step E3 to notify the call setup completion to the CPU 2. Control is then passed from the interruption processing to the initial step A7 to wait for the next interruption.

On receiving a call termination report from the LAPD processing section 35, the CPU a 341 executes a step E4 to achieve a call control operation in conformity with the CCITT Recommendations I.451. In a step E5, the call termination is reported to the CPU 2. Control is then passed from the interruption processing to the initial step A7 to wait for the next interruption. Detailed information associated with the call termination is stored in the CPU a reception buffer of the RAM e 312.

Figure 15D:
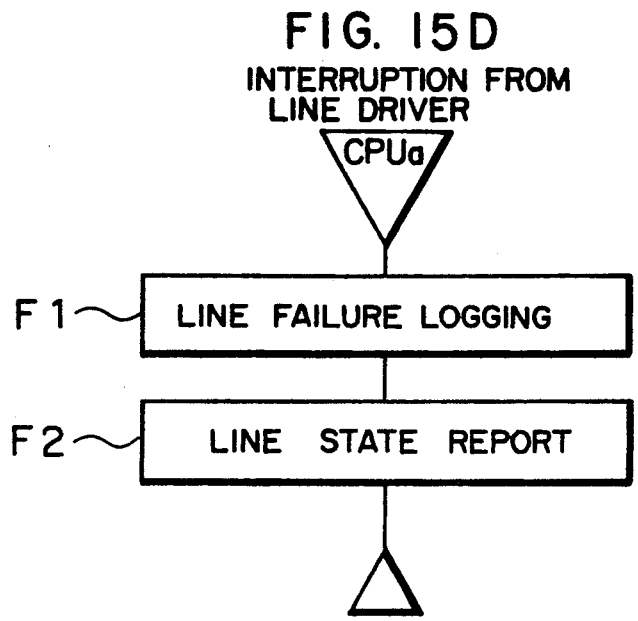

The line driver 37 causes an interruption when the ISDN line is set to a deactivated state or when the synchronization is lost. When the CPU a 341 is interrupted from the line driver 37, a step F1 of the flowchart of FIG. 15D is executed to write a content of a line failure in the failure logging area of the RAM e 312. In a step F2, the line failure is reported to the CPU 2. Control is then passed from the interruption processing to the initial step A7 to wait for the next interruption.

Figure 15E:
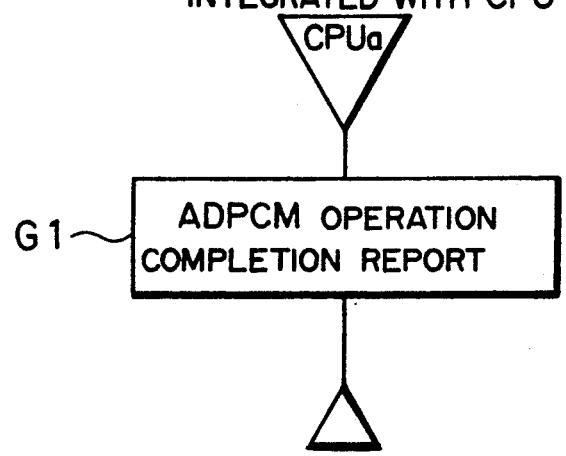

When the CPU a 341 is interrupted from the DMA control section in the CPU a 341, a step G1 of FIG. 15E is executed to report the ADPM operation completion to the CPU 2. Control is then passed from the interruption processing to the initial step A7 to wait for the next interruption.

Figure 16A:
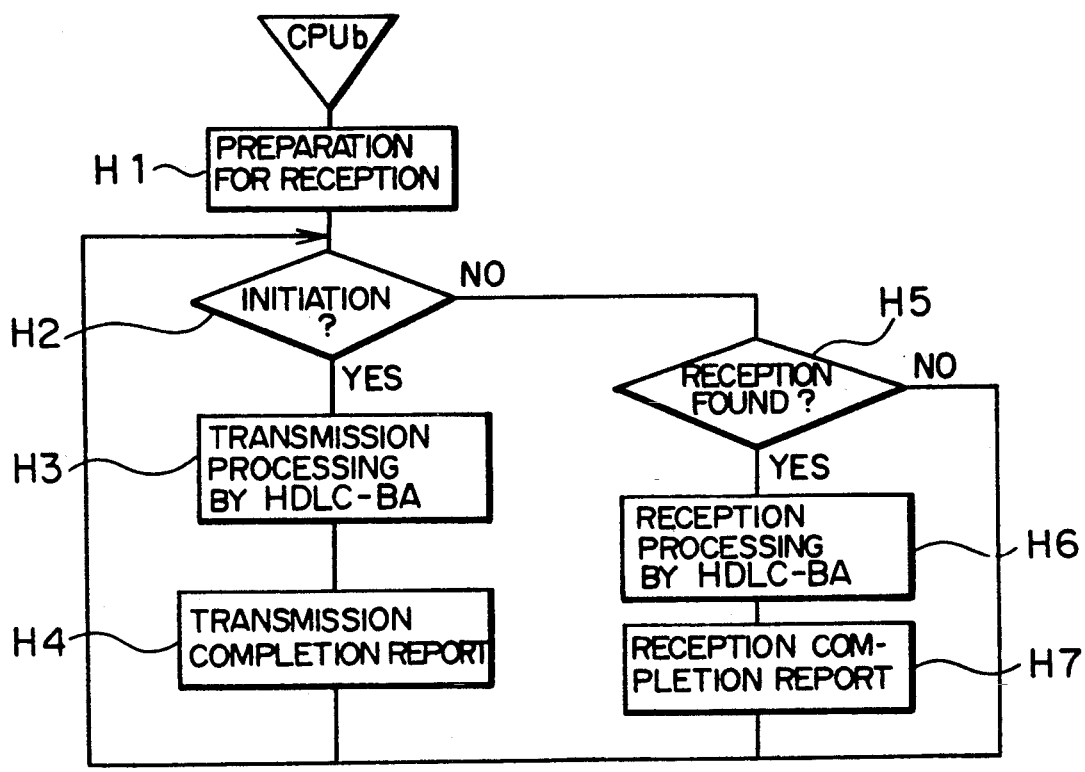
Figure 16B:
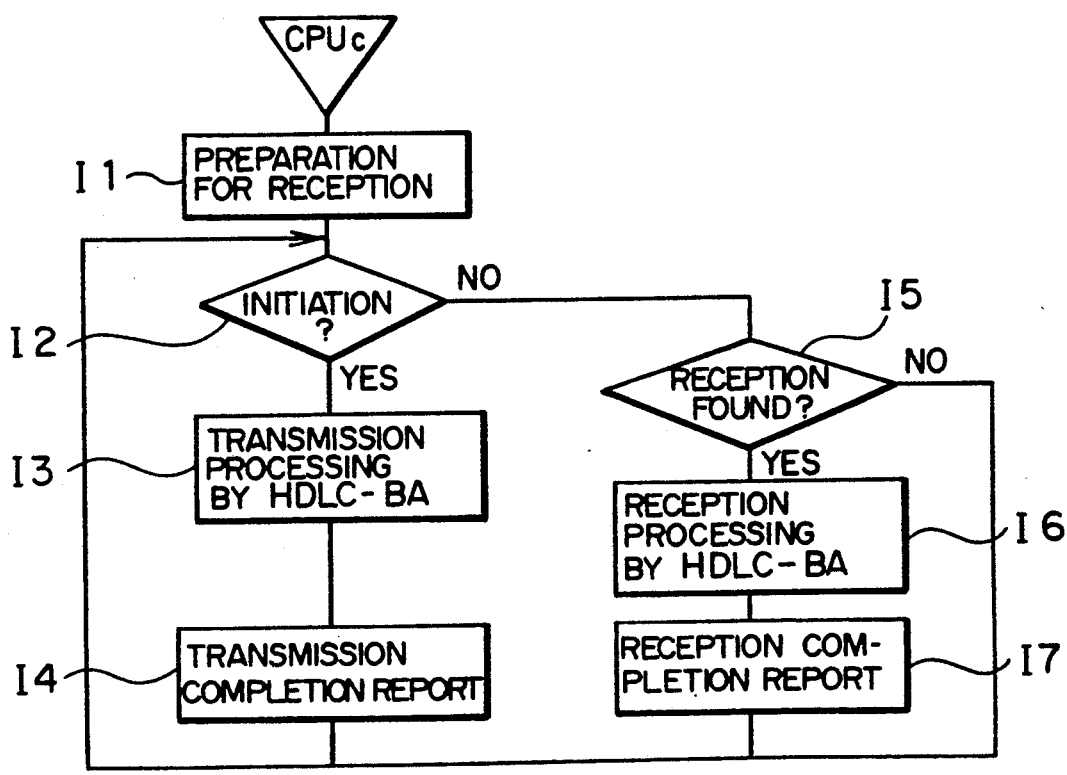

Referring next to FIGS. 16A and 17B, a description will be given of operations of the CPU b 321. It is assumed here that an initiation from the CPU a 341 is accomplished by use of a flag sense operation, namely, an interruption is not used for this initiation. First, in a step H1 of FIG. 16A, the serial controller b 323 is initialized for a receive operation. A step H2 then checks to determine whether or not an initiation is issued from the CPU a 341. If this is the case, a step H3 is achieved to conduct a transmission in conformity with the HDLC-BA. A step H4 then sends a report of the transmission completion to the CPU a 341. Control is returned to the step H2. As a result of this step H2, if the initiation from the CPU a 341 is not found, a step H5 is conducted to check the reception state. If a reception has been conducted, a step H6 carries out a receive operation according to the HDLC-BA. A step H7 notifies the reception to the CPU a 341. Control is then passed to the step H2 again. If the reception is not found in the step H5, control is directly returned to the step H2.

Operations of the CPU c 331 will next be described. It is assumed here that an initiation from the CPU a 341 is accomplished by use of a flag sense operation. That is, an interruption is not used for this initiation. First, in a step I1 of FIG. 16B, the serial controller c 333 is initialized for a reception. A step I2 then checks to determine whether or not an initiation is issued from the CPU a 341. If this is the case, a step I3 is achieved to conduct a transmission in conformity with the HDLC-BA. A step I4 then sends a report of the transmission completion to the CPU a 341. Control is returned to the step I2. As a result of this step I2, if the initiation from the CPU a 341 is missing, a step I5 is conducted to check the reception state. If a reception has been conducted, a step I6 carries out a receive operation according to the HDLC-BA. A step I7 notifies the reception to the CPU a 341. Control is then passed to the step I2 again. If the reception is not found in the step I5, control is directly transferred to the step I2.

Since the CPU d 351 is implemented by means of the NEC's $\mu$ PD72305, descriptions thereof will be here omitted.

In the embodiment of FIG. 1, the subprocessor sections 32 and 33 respectively include the RAM b 322 and the RAM c 332 so as to achieve a down loading of programs from the main processor section 34 to these RAMs. However, if there are employed, in place of the RAM b 322 and the RAM c 332, an ROM loaded with programs for the transmission control procedures, it is possible to dispense with the program down-loading operations.

By using a one-chip microcomputer including the overall configuration of the subprocessors 32 and 33, the size of the package of FIG. 13 can further be minimized. In such a situation, programs may be stored in the RAM b 322 and the RAM c 333 through the down loading. Alternatively, in place of these RAMs, the ROM beforehand loaded with the programs may be employed.

In the embodiment of FIG. 1, moreover, since the subprocessor sections 32 and 33 do not include any ROM, these subprocessor sections are retained in a reset state when powered. Namely, the subprocessor sections 32 and 33 cannot start their operations before the programs are down-loaded thereinto from the main processor section 34. To overcome this disadvantageous feature, the ROM a 342 disposed in the main processor section 34 may be designed to be accessible from the subprocessor sections 32 and 33. First, the memory space of the ROM a 342 is subdivided into three partitions. Specifically, the ROM a in the memory space of the local bus a of FIG. 4 is divided into three portions. Two divided portions are mapped onto the lower-most portion of the local bus b memory space and to that of the local bus c memory space so as to locate the RAM b and RAM c in the upper portions. Namely, the address mapping contents are respectively changed in the address translation section 3242 of the controller b 324 of FIG. 8, the address translation section 3342 of the controller c 334 of FIG. 9, and the address translation section 3442 of the controller a 344 of FIG. 10. The controller b 324, the controller c 334, and the controller a 344 are modified such that the system allows the access from the subprocessor sections 32 and 33 to the hardware resources of the main processor section 34, which has been inhibited in this embodiment. With the provisions above, the subprocessor sections 32 and 33 can immediately execute the programs in the ROM a 342 when powered so as to achieve by itself a self-diagnosis and to load the programs in the RAMs. Even when a failure occurs in the hardware system including the RAMs, the failure can be analyzed by use of the ROM.

Moreover, in the embodiment of FIG. 1, by removing the LAPD processing section 35, the system can achieve a multi-circuit control on the lines other than the ISDN lines. Namely, a plurality of lines can be controlled by increasing the number of the subprocessor sections.

In the embodiment of FIG. 1, when the LAPD processing section 35 and the line driver 37 are removed, the system can control the operations by directly connecting two lines to each other. Namely, with an increase in the number of subprocessor sections, a plurality of lines can be controlled by use of a communication adapter board. For example, in the gateways 13 and 14 of FIG. 2, when the subprocessor sections of FIG. 1 conduct the communication control on the LAN side, the communication data from the LAN can be directly transmitted via the shared memory RAM e 312 to the ISDN. This lowers the load imposed on the system processor and the data movement is dispensed with; consequently, the system throughput is increased.

In the constitution of FIG. 1, a combination of the local bus b 324 and a local bus c 335 and a set of the controller b 324 and the controller c 334 can be replaced with a local bus and a controller, respectively. In this situation, since two CPUs operate on a bus, the system performance is reduced as compared with the embodiment of FIG. 1. However, by loading in advance the RAM b 322 and the RAM c 332 with the HDLC-BA processing program and the HDLC-UN processing program, the HDLC-BA and the HDLC-UN procedures cab be processed at the same time with the two CPUs. When necessary, the HDLC-BA program in the RAM b 322 may be shared between the two CPUs. With this provision, the down loading of a program to be conducted from the RAM e 312 for each change of the transmission control procedure is unnecessitated. Namely, the subprocessor programs need not be loaded as resident programs in the RAM e 312.

In accordance with the first embodiment of the present invention, as described above, a plurality of communication processors operate in an independent fashion. Consequently, for each transmission path, a specific communication procedure can be employed to implement a high-speed communication. Since the data is transferred by use of a shared memory, the circuit size is kept minimized, thereby implementing a small-sized one-board communication adapter.

Figure 18A:
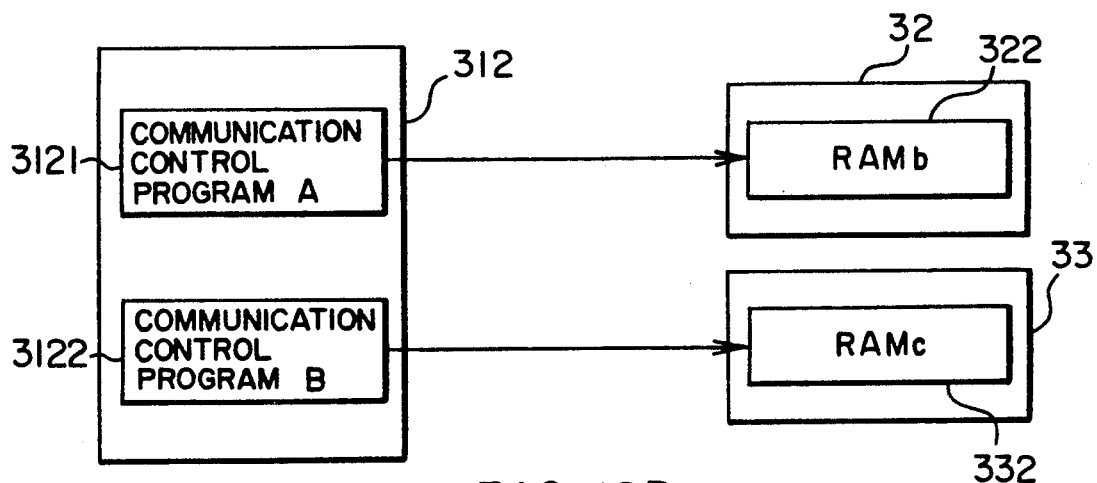
FIGS. 18A and 18B are diagrams showing examples of communication program loading.
Figure 18B:
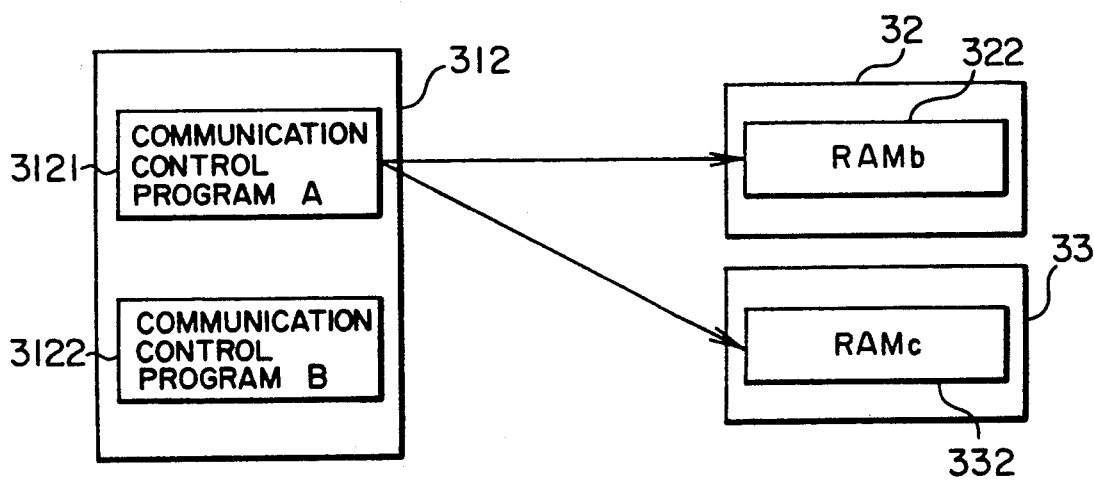

As described above, the subprocessor sections 32 and 33 can execute both of the communication control programs A and B loaded in the RAM e 312. FIGS. 18A and 18B show a program loading state. In this embodiment, the communication control programs are to be transcribed from the RAM e 312 onto the RAM b 322 or the RAM c 332. In consequence, the subprocessors 32 and 33 may respectively execute the communication control programs A and B. Alternatively, for example, the communication control program A may be executed by the subprocessors 32 and 33.

When the CPU a 341 receives an initiation for "CPU b transmission" from the CPU 2, a step B4 is executed to initiate the subprocessor section 32 for the transmission. Control is then passed from the interruption processing to the initial step A7 to wait for the next interruption. The transmission data is stored in the CPU b transmission buffer of the RAM e 312. The transmission completion is reported to the CPU 2 in the INTb interruption processing.

A description will next be given of operations to be accomplished by the CPU b 321 and the CPU c 331 in this situation.

Figure 19:
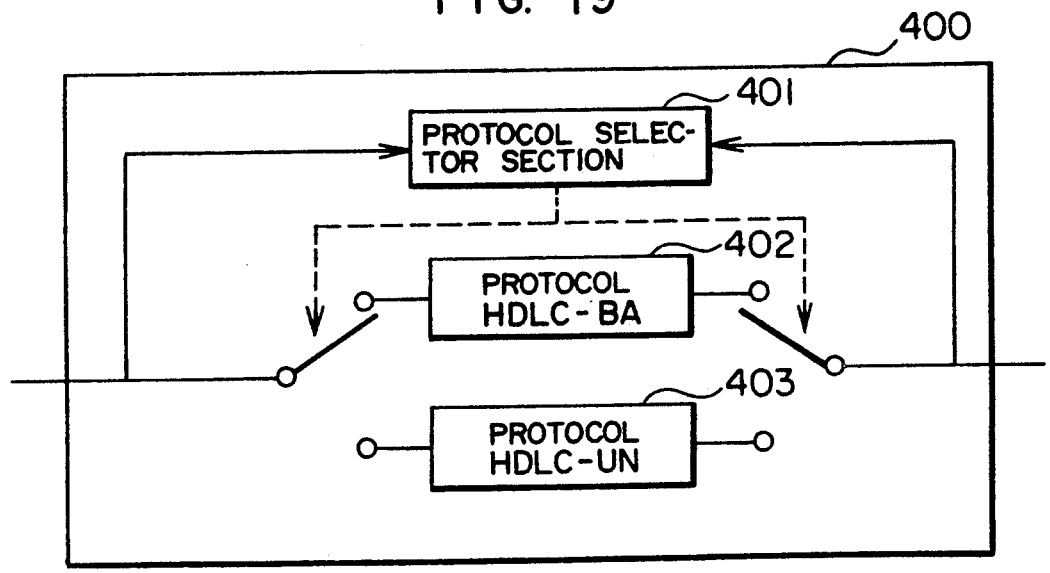
FIG. 19 is a conceptual diagram showing operations of the communication control program.

It is assumed that the CPU b 321 and the CPU c 331 execute the same program. FIG. 19 shows an example of the structure of the communication control program. Two protocols associated with the HDLC-BA and HDLC-UN are included in the program. Either one of these protocols are selected for the communication. The protocol selection is carried out depending on an instruction from the system processor section 23 or is automatically achieved depending on a receive frame from a communication line.

Figure 20:
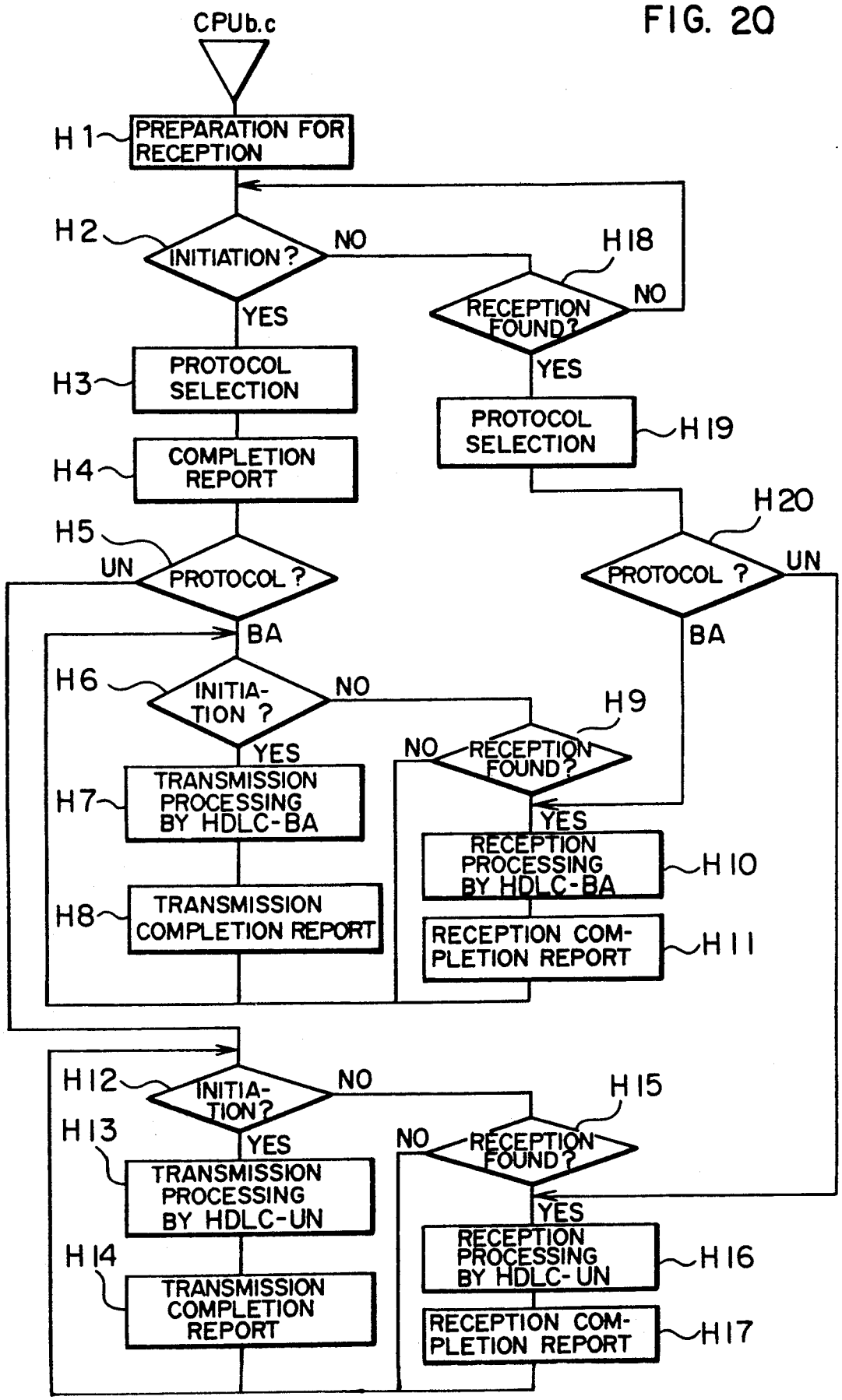
FIG. 20 is a flowchart showing operations of the communication control program.
Figure 21A:
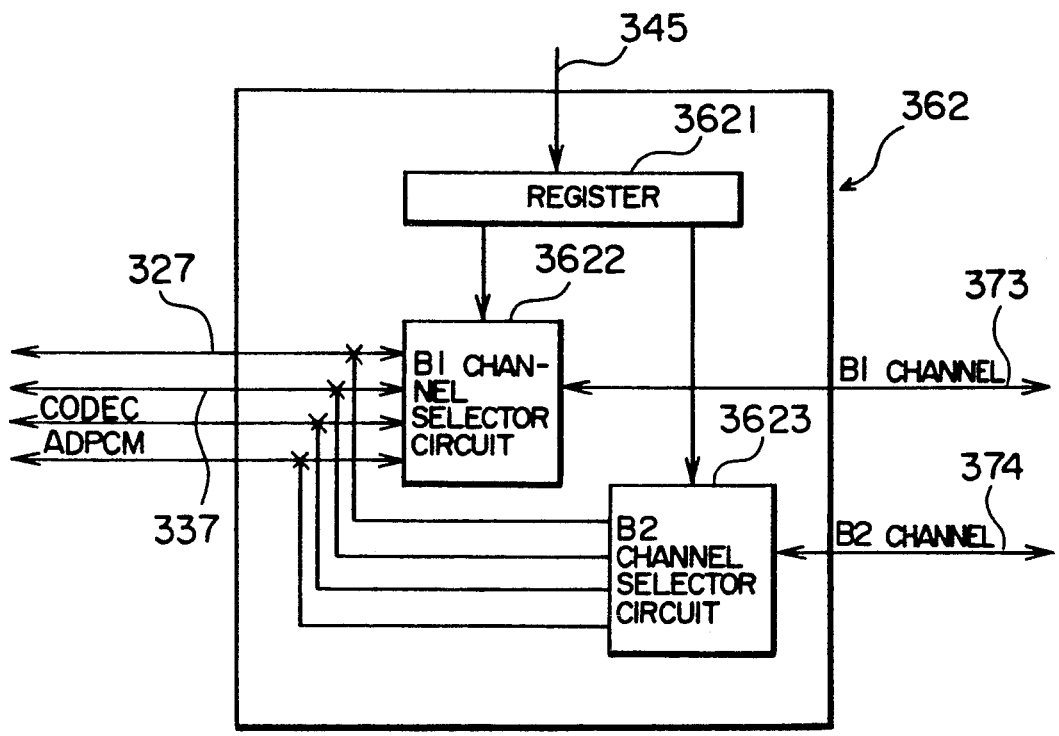
FIGS. 21A and 21B are schematic diagrams showing the constitution of the line switching circuit 362 in the third embodiment according to the present invention.
Figure 21B:
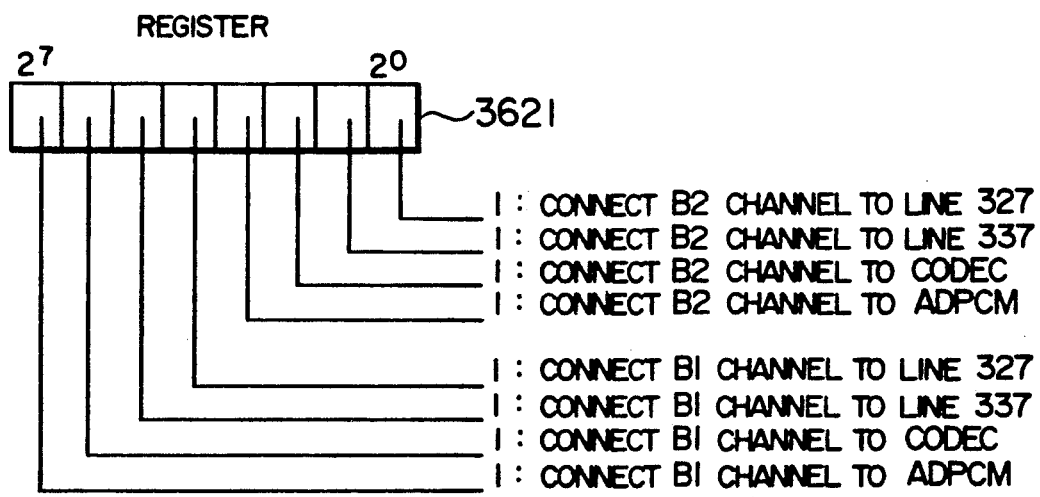

FIG. 20 shows an operation flowchart of the communication control program. In the following description, the CPU b 321 is employed as an example of the central processing unit and it is assumed that the initiation from the CPU a 341 is processed in association of a flag sense operation. Namely, an interruption is not used for the initiation. First, a step H1 initializes the serial controller b 323 for a reception. A step H2 determines whether or not an initiation for a protocol selection has been issued from the CPU a 341. If the issuance is present, a step H3 selects either one of the HDLC-BA and HDLC-UN depending on the specification. A step H4 returns a report of the selection completion to the CPU a 341. A step H5 branches control to the HDLC-BA in HDLC-UN processing. When the branch is for the HDLC-BA, a step H6 is achieved to check for a transmission initiation from the CPU a 341. If this is the case, a step H7 achieves a transmission in conformity with the HDLC-BA. A step H8 reports the transmission completion to the CPU a 341 and then passes control to the step H6 again. If the initiation from the CPU a 341 is missing in the step H6, a step H9 checks for a reception state. If it is determined that a data reception has been conducted, a step H10 carried out a reception processing in conformity with the HDLC-BA. A step H11 notifies the reception to the CPU a 341 and then transfers control to the step H6. If the data reception is not found in the step H9, control is returned directly to the step H6.

When the processing branches from the step H5 to the HDLC-UN processing in the flowchart of FIG. 20, the send/receive processing is achieved through a flow from a step H12 to a step H17. Since the operation flow here is identical to that from the step H6 to the step H11 excepting that the control procedure conforms to the HDLC-UN, descriptions thereof will be omitted.

When an initiation from the CPU a 341 is missing in the step H2 of FIG. 20, a step H18 is conducted to check a reception state. If data has been received from a line, a step H 19 selects either one of the HDLC-BA and HDLC-UN procedures. A step H20 then branches control accordingly. The selection is conducted by checking the content of the control field of the received frame. If the content indicates the asynchronous balanced mode (SABM: "11111100" or "11110100" in the binary notation), the HDLC-BA procedure is selected. In a case of a normal response mode (SNRM: "11001001" or "11000001" in the binary representation), the HDLC-UN processing is achieved.

Figure 12:
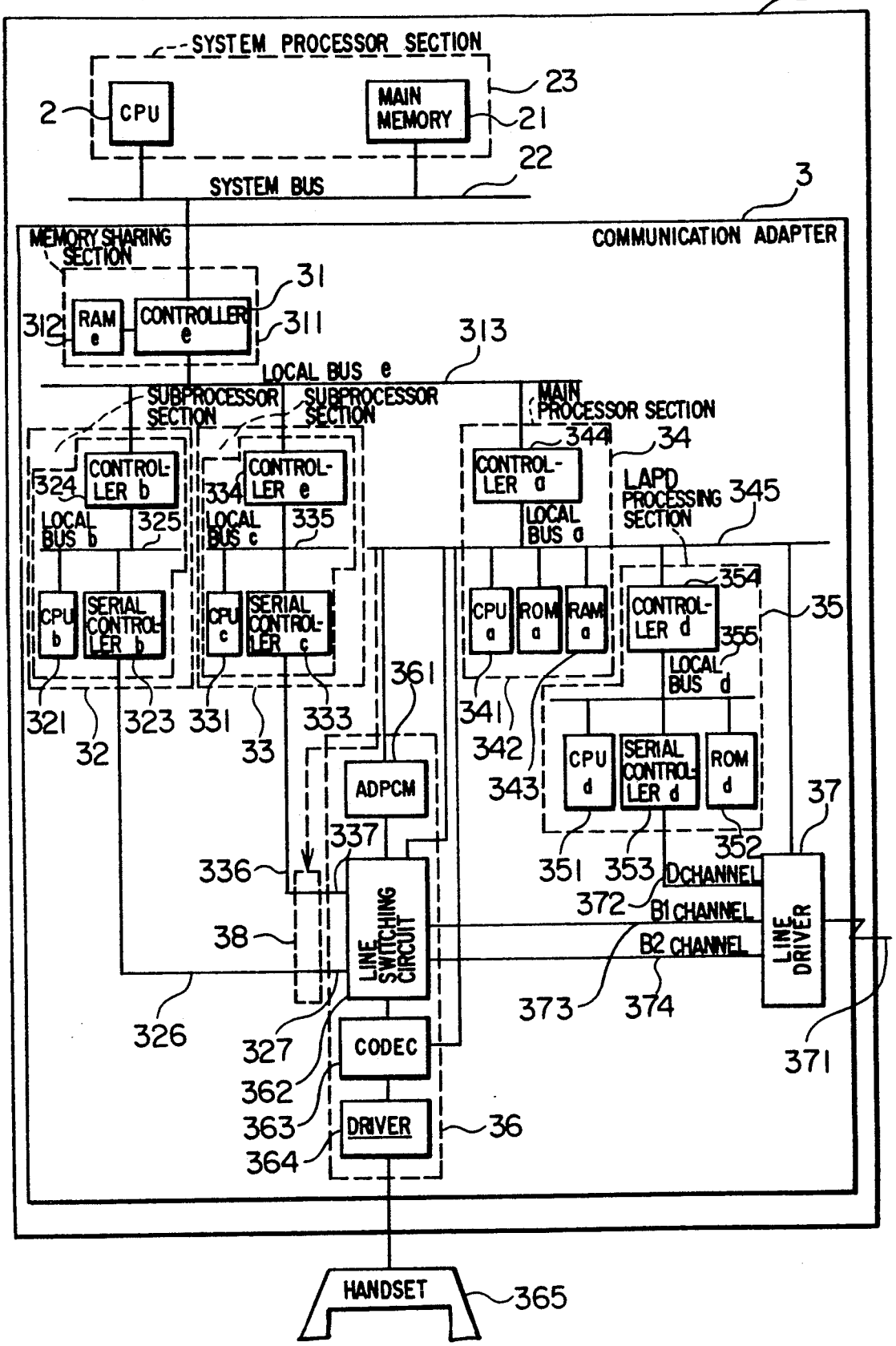
FIG. 12 is a block diagram showing the configuration of a workstation as a second embodiment in accordance with the present invention.

FIG. 12 is a block diagram showing a workstation as a second embodiment in accordance with the present invention. This configuration is different from that of the first embodiment of FIG. 1 in that the RAM b 322 and the RAM c 332 respectively of the subprocessors 32 and 33 of the first embodiment are removed.

A CPU b 321 in a subprocessor section 32 directly accesses, in an RAM e 312 in the memory sharing section 31, an area loaded with a CPU b program so as to execute the CPU b program. In consequence, the RAM b 322 is unnecessary. In order for the CPU b program of the RAM e 312 to be started beginning from address 0 viewed from the CPU b 321, an address translation section 3242 of a controller b 324 achieves a bi-directional address translation as indicated by dotted lines in FIG. 8.

For the similar reason, an address translation section 3342 of a controller c 334 achieves a bi-directional address translation as indicated by dotted lines in FIG. 9.

In the second embodiment of FIG. 12, since the RAM is unnecessitated, each of the subprocessor sections 32 and 33 can be easily implemented in an LSI. Namely, the subprocessors are manufactured by use of an identical LSI such that the difference in the address translation therebetween is coped with by supplying respective signals to control lines 3248 and 3348 of FIGS. 8 and 9, respectively. Incidentally, the subprocessor sections 32 and 33 of the first embodiment of FIG. 1 may also be configured by externally connecting an RAM to the LSI above.

The configuration of FIG. 1 also shows a workstation as a third embodiment in accordance with the present invention. This embodiment differs from the first embodiment in that a transmission speed can be easily altered for each channel. For this purpose, the constitution of the third embodiment includes a speed matching section 38 indicated by dotted lines in FIG. 1.

Figure 22:
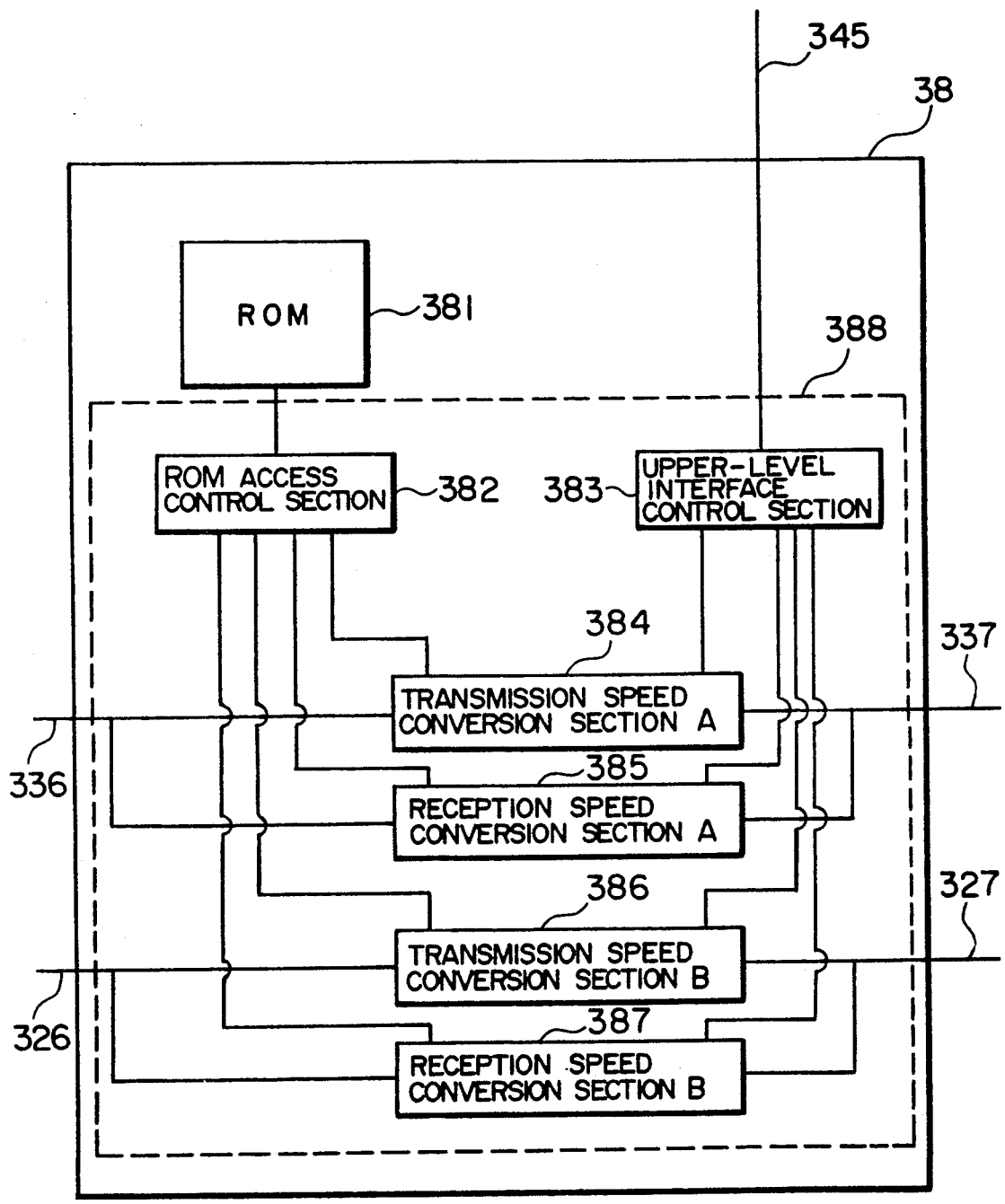
FIG. 22 is a block diagram showing the configuration of a speed matching section 38.

FIG. 22 is a block diagram showing the configuration of the speed matching section 38 of FIG. 1. This section 38 includes an ROM 381 and a match processing section 388. The match processing section 388 comprises an ROM access control section 382, an upper-level interface control section 383, a transmission speed conversion section A 384 and a reception speed conversion section A 385 for achieving a speed matching between a line 337 and a line 336, and a transmission speed conversion section B 386 and a reception speed conversion section B 387 for achieving a speed matching between a line 327 and a line 326. In this description, an operation to send data from the communication adapter to the ISDN is called a transmission, where as an operation executed in the reverse direction is called a reception.

Next, referring to FIG. 22, a description will be given of an outline of a speed matching method. The speed matching is achieved through a conversion procedure conforming to the speed matching specifications stipulated in the CCITT Recommendations I.436 and I.461. The speed matching is conducted for send/receive data items on the B1 and B2 channels. The speed conversion is independently accomplished for each of these channels. The conversion speeds include 600 bps, 1200 bps, etc. and are supplied from a main processor section 34 to the respective speed conversion sections 384 to 387 via a local bus a 345. The speed conversion is carried out through two steps including a conversion 1 and a conversion 2. However, for the conversion of the speed not less than 32 kbps, the conversion 1 is not used. In the conversion 1, a speed conversion is achieved between the 64 kbps serial data on the ISDN and data of an intermediate speed. The transfer speed of the intermediate speed data is determined depending on a matching speed of the speed matching serial data to be finally obtained for the processing in the subprocessor sections 32 and 33. For example, when the maching or conversion speed is 4800 bps, the intermediate speed is determined as 8 kbps. This is obtained through a thin-out operation, namely, by dividing the 64 kbps ISDN serial data by eight. The data speed conversion is conducted in conformity with conversion formats stored in the ROM 381. These formats are disposed for the respective matching speeds. For example, the conversion format for 4800 bps is as shown in FIG. 23. The intermediate speed data items are arranged in an order of bit number 1 of octet number 0, bit no. 2 thereof, . . . , bit no. 8 thereof, . . . , and bit no. 8 of octet no. 9. These 80 bits are treated as a frame for the speed conversion. In the frame structure of FIG. 23, 17 bits associated with the octet no. 0 (all bits are 0s) and the bit no. 1 (bit value is 1) of each of the octet nos. 1 to 9 are used for a frame synchronization. A frame is recognized when a bit pattern of FIG. 20 is found. Bits $E_1$ to $E_7$ of FIG. 23 are disposed to confirm the matching speed. For example, in a case of 4800 bps, these bits become to be "011111". In FIG. 23, D bits represent serial data undergone a speed matching and are produced in a sequence of $D_1$, $D_2$, . . . , $D_{48}$. Namely, the transmission speed 64 kbps of the ISDN is reduced to one eighth thereof, namely, 8 kbps as the intermediate speed. The resultant data is subjected to a thin-out operation to attain 48 bits ranging from $D_1$ to $D_{48}$ from the frame including 80 bits, thereby attaining the final speed 4800 bps. In the configuration of FIG. 23, eight bits including S and X bits are status bits employed to transmit line control information. For example, when a communication is to be conducted with a partner operating with a terminal having the CCITT Recommendations V.24 interface, bit $S_1$ is used in a transmission as a data set ready signal of a V.24 circuit 107 and is adopted in a reception as a data terminal ready signal of a V.24 circuit 108. Although these status bits may possibly be processed together with the speed matching serial data in the subprocessors 32 and 33, the main processor section 34 supervising the control operation of the communication adapter 3 is employed to process these bits in this embodiment. The transmission status bits of the B1 and B2 channels are sent from the main processor section 34 via the local bus a 345 to the speed matching section 38. On the other hand, the reception status bits of the B1 and B2 channels received by the speed matching section 38 are sent via the local bus a 345 to the main processor section 34.

Referring next to FIG. 22, a specific method of the speed matching will be described.

The two transmission speed conversion sections 384 and 386 are of the same constitution. This is also the case of the two reception speed conversion sections 385 and 387. In the converting operations, the same method is employed excepting that the directions of the conversions are opposite to each other in the transmission and reception conversion sections. A description will be here given, as a representative case, of the reception speed conversion section A 385. This section A 385 includes a speed register, a status register, first and second conversion sections, and an ROM address generating section. The speed register is disposed to store therein a conversion speed. The main processor section sets a speed value thereto via the upper-level interface control section 383. The status register is employed to be loaded with status bits obtained from a reception frame. The content thereof is sent, when necessary, via the upper-level interface control section 383 to the main processor section 34. The first conversion section thins out signals received from the line 337 depending on a value of the speed register to produce intermediate speed data. The generated data is then fed to the second conversion section. This section generates from the received data a frame associated with a value of the speed register. In order to process the respective bits of the frame depending on the content of the ROM 381, the octet and bit numbers are sequentially supplied to the ROM address generating section. This section determines an ROM address based on the speed information from the speed register and the octet and bit numbers from the second conversion section. The ROM address is then sent to the ROM access control section 382. The control section 382 accesses the ROM 381 to read out information from a location indicated by the ROM address. The obtained ROM information is passed via the ROM address generating section to the second conversion section. Depending on the received ROM information, the second conversion section supplies the status register and the line 336 with the status and data bits, respectively.

The upper-level interface control section 383 of FIG. 22 controls communications of data via the local bus a 343 between the main processor section 34 and the respective speed conversion sections 384 to 387. Data to be sent from the main processor section 34 includes speed information and transmission status information. In response to a request from the main processor section 34, the speed and transmission status information items are transmitted to either one of the speed registers of the four speed conversion sections 384 to 387 and to either one of the status registers of the transmission speed conversion sections A 384 and B 386, respectively. Data to be sent to the main processor section 34 is reception status information. This information is read out by the main processor section 34, when necessary, from either one of the status registers of the reception speed conversion sections A 385 and B 387.

The ROM access control section 382 achieves a read operation from the ROM in response to a request from the speed conversion sections 384 to 387. The transmission and reception signals on the communication lines 337 and 327 are entirely synchronized at a bit timing of 64 kbps. Namely, the speed conversion sections 384 to 387 also operate at this timing In consequence, the ROM access requests may be simultaneously issued from the speed conversion sections to the ROM access control section 382. On the other hand, different read positions of the ROM are respectively specified by the conversion sections 384 to 387. In this situation, the control section 382 reads data from the ROM 381 in a time-sharing fashion so as to arrange complete data before the data is sent to the pertinent speed conversion section.

Figure 24:
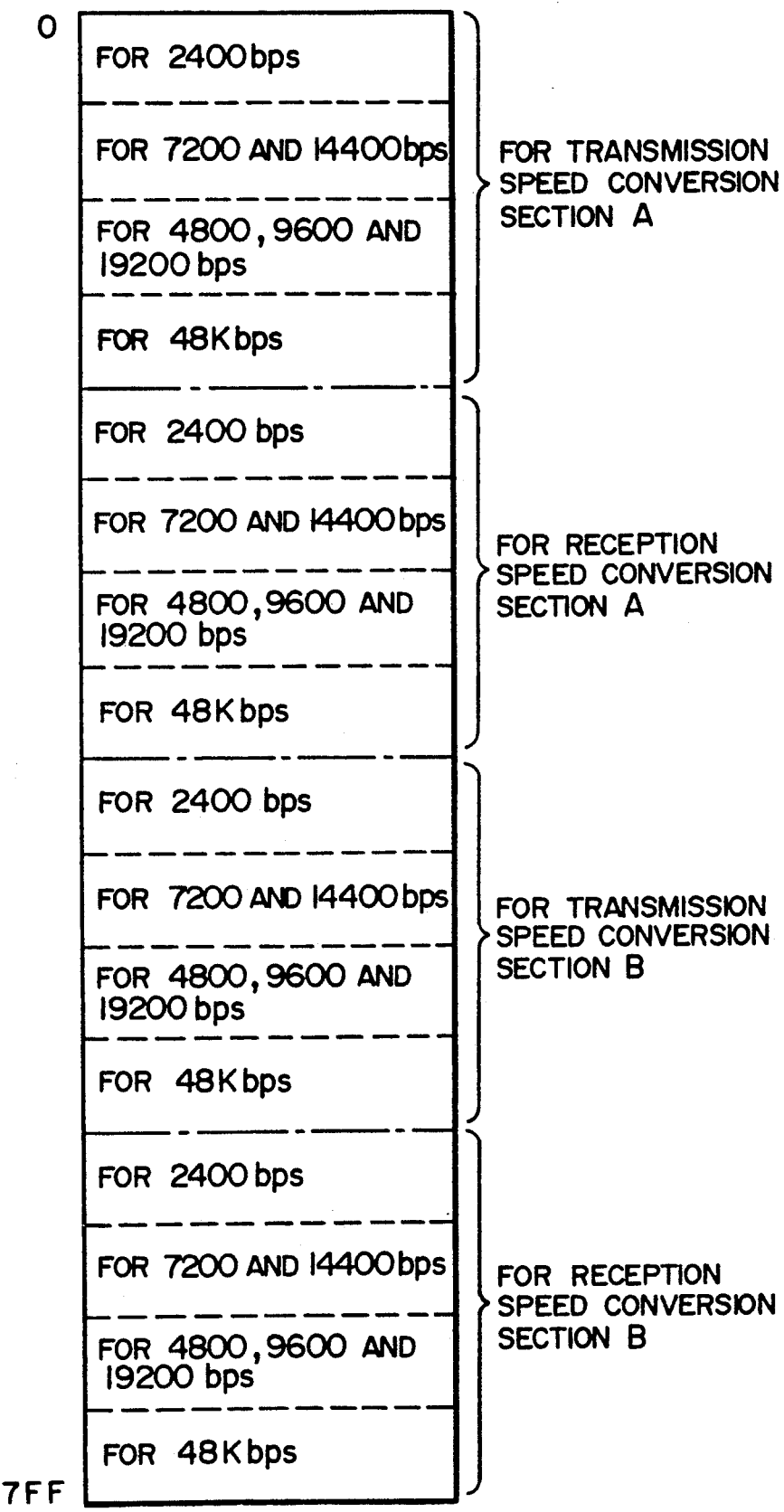
FIG. 24 is a schematic diagram showing contents of a read-only memory (ROM) 381 for a speed matching.

The ROM 381 is disposed to store therein processing contents of the respective bits in the frame configuration of FIG. 23. FIG. 24 shows an example of the contents of the ROM. The ROM here has a capacity of two kilobytes, which are subdivided into four portions associated with the respective speed conversion sections. Each portion is further divided into four partitions depending on the conversion speeds. The final unit region is used to store data of a frame structure. Two or more conversion speeds are written in a region. This is because the same frame structure is employed for the associated data, namely, only the intermediate speeds thereof are different from each other. The unit region has a capacity of 16 octets × 8 bits. Data therein is handled in byte units to describe a one-bit processing by use of one byte. For example, for transmission data, either one of the transmission matching data, the transmission status data, and fixed data of "0" or "1" is selected for the description. For reception data, one of the speed matching data and the reception status data is specified.

As described above, since the ROM is adopted for the speed conversion, the frame structure can be easily changed only by replacing the ROM. In the example of FIG. 24, although the conversion rule data is assigned to each speed conversion section, the data items may be gathered in groups associated with the respective conversion speeds. This enables the capacity of the ROM to be reduced.

In the reception speed conversion section, when the frame structure is configured as shown in FIG. 23, the transmission speed of received data can be determined by checking the E bit. If the recognized transmission speed is used to operate the speed conversion sections, the speed matching may also be automatically accomplished without necessitating an instruction from the main processor section 34.

The third embodiment according to the present invention differs from the first embodiment as follows.

In the third embodiment, the transmission speed can be changed in the communication processing section so that a transmission speed is selected from the upper-level software for each communication line.

In accordance with the ISDN specifications, the channels D, B1 and B2 may be used to independently communicate data therethrough. The communication on the D channel is conducted at a transmission speed 16 kbps. For the B1 and B2 channels, although the channel speed is fixed to 64 kbps, the data transmission speed is adjustable. In the third embodiment, the speed matching is conducted, for example, in conformity with the CCITT Recommendations I.461 and I.463.

In the configuration of FIG. 2, the host computer 12 is provided with, for example, the conventional public line interface conforming to the CCITT Recommendations X.21. The host computer 12 has a transmission speed 9600 bps, which is connected to the ISDN 15, for example, via the Hitachi's Terminal Adapter HN-5101 series 10. In the gateway 13, one of the B1 and B2 channels is used for the transmission speed 64 kbps of the ISDN. On the other channel thereof, the channel line speed 64 kbps is used to transfer the 9600 bps data so as to communicate with the computer 12.

In the constitution of FIG. 1, the speed matching section 38 is controlled by the CPU a 341 via the local bus a 345 so as to achieve the speed matching between the lines 327 and 326 and between the lines 337 and 336.

In the system of FIG. 1, all circuits of the 1-chip CPU d 351 and the LAPD processing section 35 are arranged in a chip.

In FIG. 14B, the steps B19 to B21 are disposed as processing for the speed matching section 38. In response to an instruction from the CPU 2, the CPU a 341 sets in the step B19 conversion speed information and in the step B20 transmission status information to the speed matching section 38. The information items are passed via the initiation register 3116 of the RAM e 312. In the step B21, reception status information is read out from the speed matching section 38 so as to transfer the information via the report register 3117 to the CPU 2. When the processing is completed, control returns to the original step A7 to wait for the next interruption.

In the configuration of FIG. 1, by replacing the respective subprocessors 32 and 33 with 1-chip microcomputers or by implementing these sections in a 1-chip microcomputer together with the speed matching section 38, the size of the package of FIG. 13 is further minimized.

Referring next to FIGS. 25 to 38, description will be given of the fourth, fifth, and sixth embodiments in accordance with the present invention.

Figure 25:
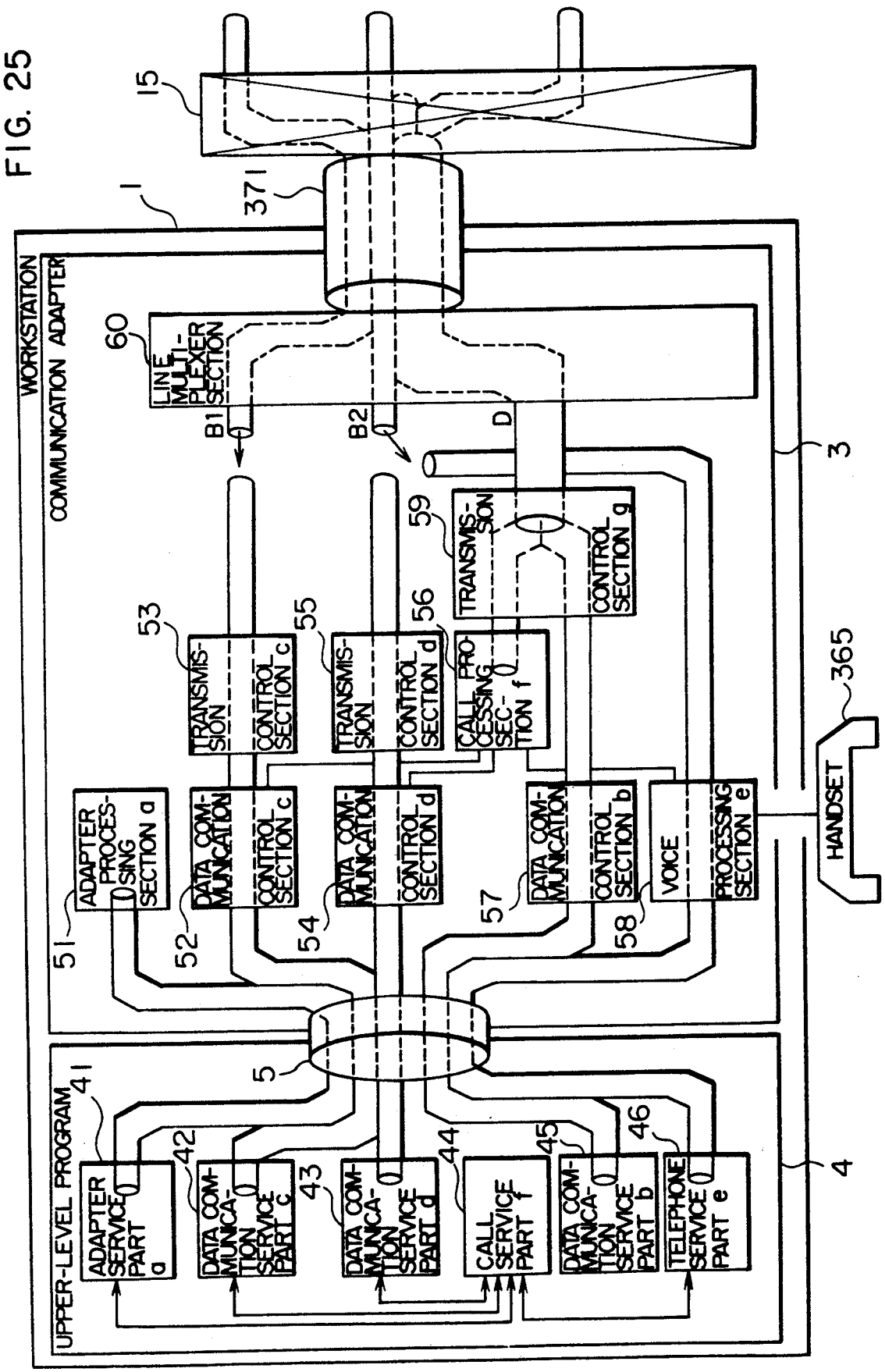
FIG. 25 is a block diagram showing the configuration of a workstation as a fourth embodiment according to the present invention.

FIG. 25 is a block diagram showing a workstation as the fourth embodiment according to the present invention.

The communication adapter 3 comprises, as shown in FIG. 25, an adapter processing section a 51, a data communication section c 52, a transmission control section c 53, a data communication processing section d 54, a transmission control section d 55, a call processing section f 56, a data communication processing section b 57, a voice processing section e 58, a transmission control section g 59, and a line multiplexer section 60. In this constitution, the data communication processing section c 52 and the transmission control section c 53, the data communication processing section d 54 and the transmission control section d 55, the data communication processing section b 58 and the transmission control section g 59, and the adapter processing section a 51 and the voice processing section e 58 respectively form communication control sections. The call processing section f 56 and the transmission control section g 59 constitute a call control section.

This system further includes an upper-level program 4. The program 4 includes an adapter service part a 41, a data communication service part c 42, a data communication service part d 43, a call service part f 44, a data communication part b 45, and a telephone service part e 46. In the upper-level program 4, the service parts a 41 to e 46 excepting call service part f 44 can communicate via a connection path 5 with the respective processing sections a 51 to e 58 exception the call processing section f 56 of the communication adapter 3. More specifically, the operation instructions and the report associated therewith can be communicated only between the parts and the sections having the identical identifiers a to e. The call service f 44 of the program 4 achieves a connection service for data and telephone communications and is linked with service parts other than the data communication service part b 45. A call setup instruction is issued via either one of the service parts to the communication adapter 3. The call service part f 44 is not linked with the data communication service part b 45. This is because the data communication on the D channel is limited to the packet switching and hence the call control is not required for the data communication service.

The adapter processing section a 51 conducts, as will be described later, the overall management and control of the communication adapter 3 such as an initialization and the self-diagnosis of the communication adapter 3. When the adapter 3 is powered, the adapter processing section a 51 first starts its operation.

The data communication processing section c 52 and the transmission control section c 53 achieve the data communication on the B1 channel. The data communication processing section c 52 supervises an interface with respect to the data communication service part c 42 so as to pass commands related to calls and the other data communication commands to the call processing section f 56 and the transmission control section c 53, respectively. The transmission control section c 53 conducts the control on the data link layers of the layer 2 in the seven-layer model of the open systems interconnection (OSI). For example, the data communication control is achieved here in conformity with the packet switching of the HDLC-BA or with the line switching of the HDLC-BA and HDLC-UN.

The call processing section f 56 is associated with a network layer portion of the OSI layer 3 to carry out the call control for the data and voice communications. In response to call setup request from the data communication processing section c 52, the data communication processing section d 54, and the voice processing section e 58, the call control is accomplished in conformity with the CCITT Recommendations I.451.

The data communication processing section d 54 and the transmission control section d 55 accomplish data communications on the B2 channel. The data communication processing section d 54 handles the interface with respect to the data communication service part d 43 so as to pass commands related to calls and the other commands of data communications to the call processing section f 56 and the transmission control section d 55, respectively. The transmission control section d 55 conducts, like the transmission control section c 53, the data communication control in conformity with the packet switching of the HDLC-BA or the line switching of the HDLC-BA and HDLC-UN.

The data communication processing section b 57 achieves data communications on the D channel. This section receives a command from the data communication service part b to pass the command to the transmission control section g 59.

The voice processing section e 58 carries out voice communications. The connection path 5 is disposed with a shared memory in which an area is provided for the input and output operations of voices. This area is called a voice file. The voice communication is effected by use of the voice file, the handset 365, and either one of the B1 and B2 channels. When the handset 365 is linked with the ISDN, an ordinary telephone communication is available. When the handset 365 is linked with the voice file, the message recording and playback can be locally accomplished. When the voice file is linked with the ISDN, it is possible to record voices of a partner in the voice file and to reproduce and to transmit the content of the voice file. For a voice recording, the voice is compressed from the 64 kbps signals into the 32 or 24 kbps signals according to the adaptive differential pulse code modulation (ADPCM) so as to elongate the recording time. For the playback, the recorded signals are expanded to restore the original 64 kbps digital voice signals. By using different channels respectively for the voices and data, the voice and data signals can be simultaneously transmitted.

The transmission control section g 59 is associated with the data link layer portion of the OSI layer 2 to conduct the transmission control on the D channel. Data items from the call processing section f 56 and the data communication processing section b 57 are processed in conformity with the CCITT Recommendations I.441 (LAPD) so as to pass the resultant data to the D channel.

The line multiplexer section 60 corresponds to the physical layer portion of the OSI layer 1 to achieve multiplex operations and other associated operations on the D, B1, and B2 channels in conformity with the CCITT Recommendations I.430.

In summary, the communication adapter 3 in accordance with the present invention includes three kinds of functions, namely, the data communication, voice communication, and call control functions.

Data communications are achieved by use of all channels including the D, B1, and B2 channels. On the D channel, the packet switch conforming to the CCITT Recommendations I.441 (LAPD) is used for the data communication. On the B1 and B2 channels, the data communications are carried out through the packet switching in conformity with the HDLC-BA or through the line switching in conformity with the HDLC-BA and HDLC-UN. The transmission speeds 16 and 64 kbps are adopted for the D channel and for the B1 and B2 channels, respectively. Data communications may naturally be achieved respectively through the D, B1 and B2 channels.

The voice communication is accomplished by selecting either one of the B1 and B2 channels. In this communication, voice recording and playback operations may also be achieved on a voice file.

The call control is conducted through the D channel. Channel connections are achieved for the data and voice communications. The control method conforms to the CCITT Recommendations I.441 (LAPD) and I.451.

A description will next be given of an interface between the upper-level program 4 and the communication adapter 3. An operation instruction issued from the upper-level program 4 and to the communication adapter 3 is called an initiation command, whereas a report delivered from the communication adapter 3 to the upper-level program 4 is called a report command. The initiation and report commands are communicated therebetween via the connection path or route 5. Although these commands are simultaneously transferred, the number thereof is limited to one for each command type. That is, the configuration of FIG. 5 has five logical channels; however, only one physical channel is available.

Figure 26:
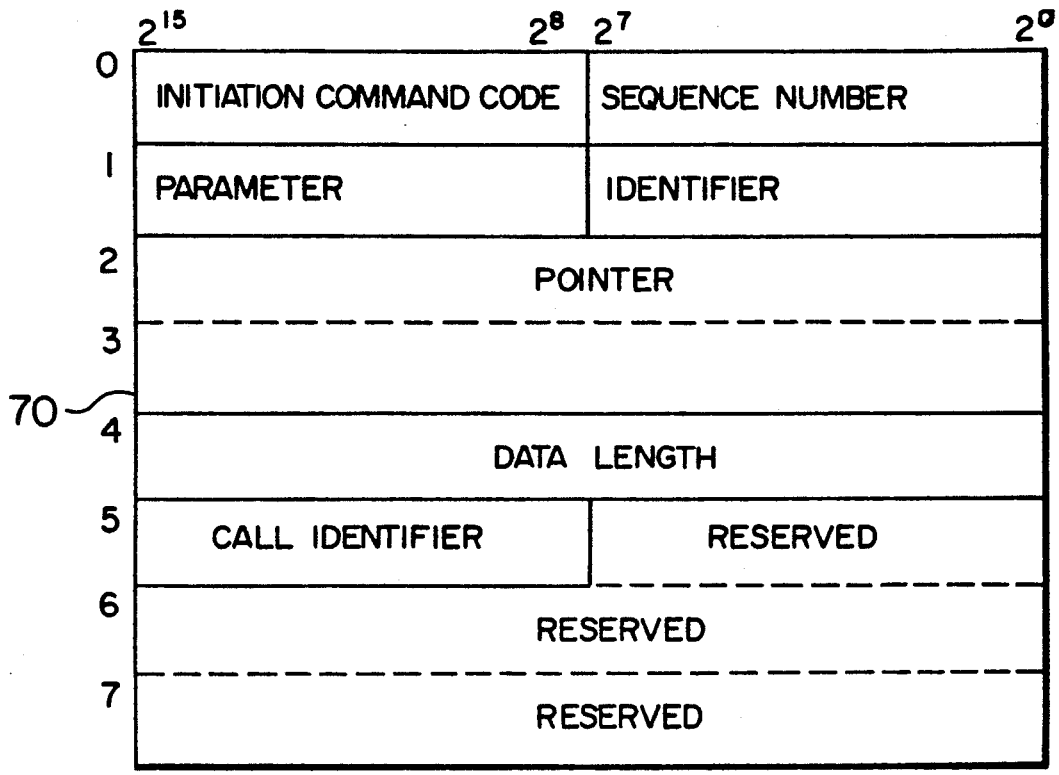
FIGS. 26 and 27 are diagrams respectively showing formats of an initiate command and a report command used in the fourth embodiment.
Figure 27:
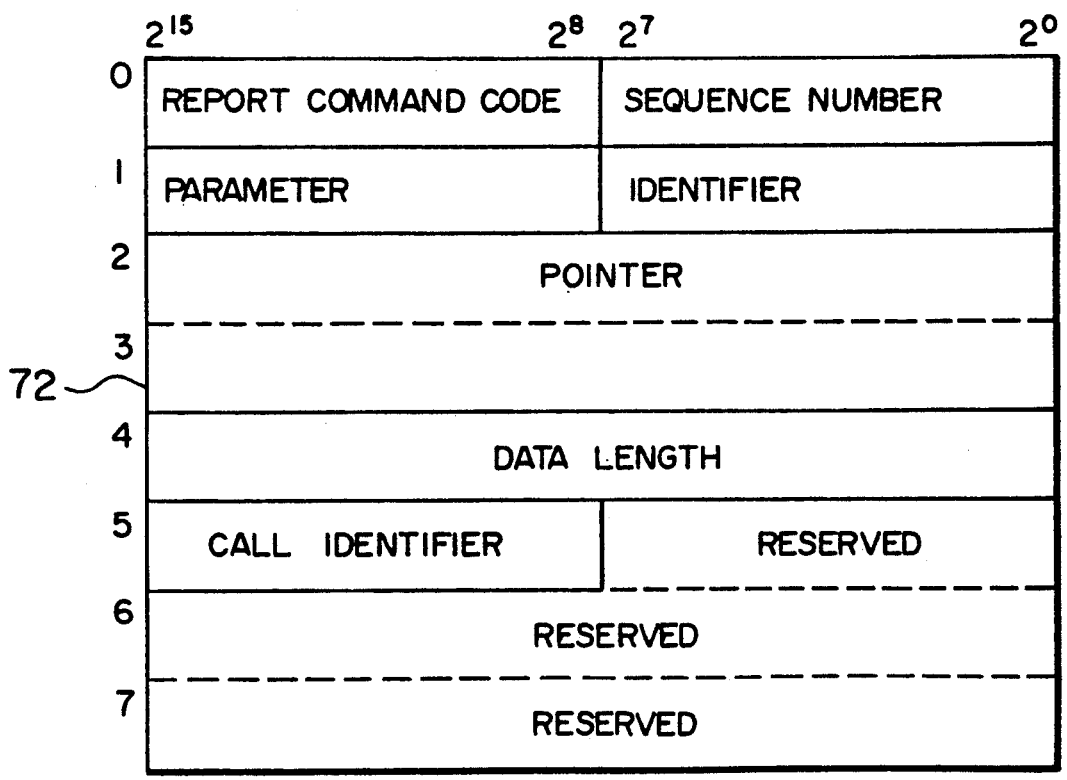

FIG. 26 shows the format of the initiation command, whereas FIG. 27 is that of the report command. Each of these commands is constituted with eight words each including 16 bits. The command type is indicated by an initiation command code or a report command code. The format includes a parameter as qualifier information of the command and a sequence number indication an issuance sequence of the command. For example, the sequence number need only be incremented by one each time an initiation command is issued. When the report command uses the sequence number directly copied from the initiation command, even if the upper-level program 4 sequentially issues initiation commands of an identical type, by checking the report command code and the sequence number, it is possible to determine the initial command sequence number associated with the report command. An identifier is used to indicate a code of a destination of the initiation or report command. The content denotes a pertinent processing section of the communication adapter or a pertinent service part of the upper-level program 4.

Figures 29, 30:
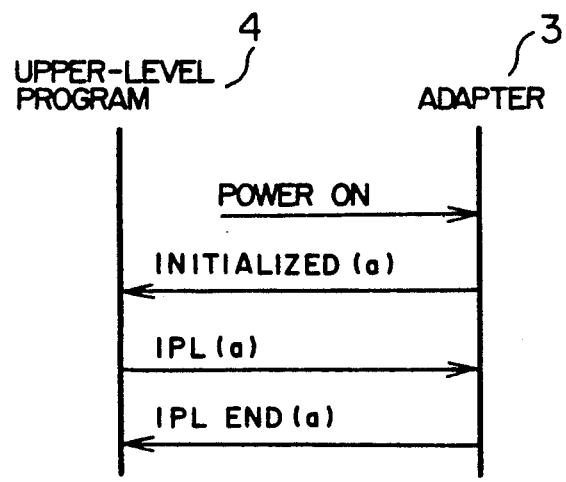
FIG. 29 is a diagram showing a command list of the fourth embodiment.
FIG. 30 is a diagram showing a setup sequence of the fourth embodiment.

FIG. 28 shows relationships between the identifiers, the service parts, and the processing sections. The system supports five identifiers 00 to 04. A large volume of data such as the send and receive data associated with the initiation and report commands is stored in the shared memory of the connection path 5 for the transfer thereof. The first address of the stored data is indicated by a pointer of the initiation or report command. The data length of the data is denoted by a size field. A call identifier is employed to identify a call when a plurality of calls exist between a service part and a processing section. For example, when a call termination is recognized during a telephone call, a call identifier different from one used in the call being achieved is used to notify the condition to the upper-level program 4, thereby implementing services such as a catch-phone service. FIG. 29 shows relationships between the initiation and report commands, command codes thereof, and the service parts and the processing sections in which the commands are available.

Referring now to the sequence chart of FIGS. 30 to 32, a description will be given of utilization examples of initiation and report commands. In this diagram, letters a to e in parentheses following the commands denote abbreviated identifiers.

FIG. 30 shows a power-on sequence of the system. When the communication adapter 3 is powered, the adapter processing section a 51 for FIG. 25 starts its operation. Namely, the communication adapter 3 is initialized and the self-diagnosis is conducted so as to supply the result of the self-diagnosis, by use of an initialization end command "Initialized (a)", to the adapter service part a 41 of the upper-level program 4. The adapter service part a 41 then sets in the shared memory of the connection path 5 the programs of the data communication processing sections c 52, d 54, and b 57, the call processing section f 56, and the voice processing section e 58. Thereafter, a program loading command "IPL(a)" is issued. When the "IPL(a)" command is received, the pertinent programs are loaded into the communication adapter 3. After the loading is completed, a loading end command "IPL end(a)" is returned to the program 4. Thereafter, control is passed to the programs thus loaded. The programs of the transmission control sections c 53 and d 55 are loaded immediately before the communications are conducted. Although the transmission control section g 59 and the line multiplexer section 60 may be implemented by use of programs, dedicated LSIs are assumed to be employed in this system. In consequence, the program loading is not achieved for these sections.

Figure 31:
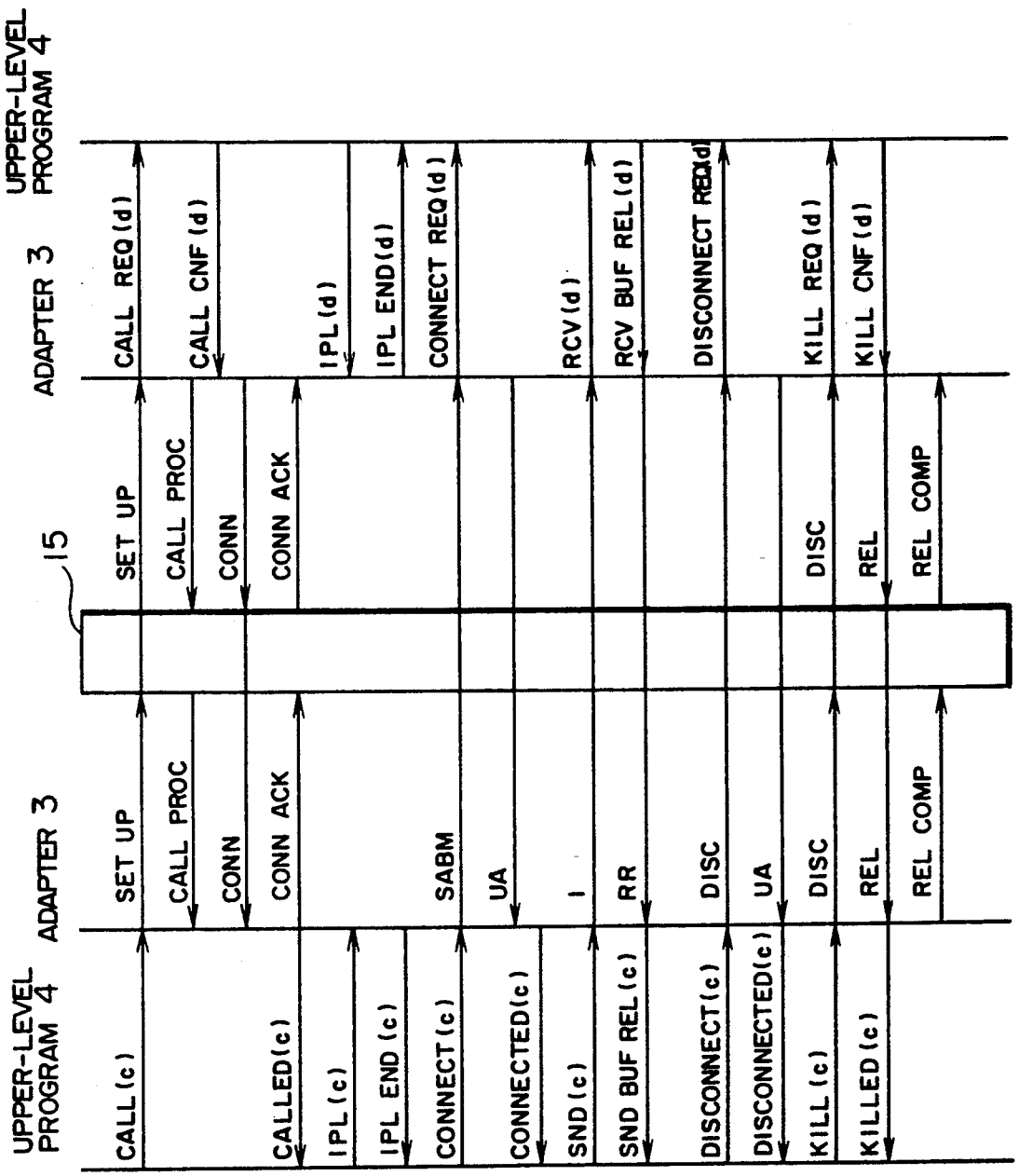
FIG. 31 is a diagram showing a data communication sequence in the fourth embodiment.

FIG. 31 shows an example of a sequence of data communication through the B1 channel. In the sequence between the communication adapter 3 and the ISDN 15, bold lines designate that the data is passed via the D channel, whereas ordinary lines indicate communications through B channels. First, when a call setup request is passed from the call service part f 44 to the data communication service part c 42, which in turn issues a call setup request command "Call(c)". On receiving the command, the data communication processing section c 52 transfers the command to the call processing section f 56. The call processing section f 56 controls the communication conforming to the CCITT Recommendations I.451. The transmission control section g 59 further achieves a data link control in conformity with the LAPD so as to send a call setup message (SET UP) to the D channel, thereby awaiting a response message (CONN). A call setup reception message (CALL PROC) is used to notify an event that the call setup message (SET UP) has been received. When a response message (CONN) is received from the ISDN 15, a response acknowledge message (CONN ACK) is returned to the ISDN 15 and a call setup end command "Called(c)" is delivered to the data communication service part c 42.

When an even that the data communication service part c 42 establishes a call to the call service part f 44 is notified, it is assumed that the B1 channel is linked with a partner. Namely, the communications thereafter is conducted through the B1 channel. The data communication service part c 42 sets the program of the transmission control section c 53 to the shared memory of the connection route 5 and then issues a program loading command "IPL(c)". On receiving "IPL(c)", the data communication processing section c 52 loads the pertinent program in the communication adapter 3 and then sends a loading end command "IPL end (c)". When the IPL is completed, the data communication service part c 42 issues a link setup command "Connect(c)". When "Connect(c)" is received, the transmission control section c 53 outputs an asynchronous balanced mode setup frame 'SABM' to the B1 channel in conformity with the HDLC-BA procedure, thereby waiting for a report frame 'UA'. On receiving the 'UA', a link setup end command "Connected(c)" is returned to the data communication service part c 42. This completely establishes the link of the B1 channel so as to enable information to be transferred therethrough. In the data transmission procedure, the data communication service part c 42 first sets transmission data in the shared memory of the connection route 5 and then issues a transmission command "SND(c)". The transmission control section c 53 sends the "SND(c)" as an information transfer frame 'I' onto the B1 channel in conformity with the HDLC-BA procedure, thereby awaiting report from 'PR' from the partner. When the 'PR' frame is received, the transmission control section c 53 returns a transmission end command "SND Buf Rel(c)" to the data communication service part c 42. This terminates the communication and notifies that the buffer of the transmission data has been released.

When the link on the B1 channel is to be disconnected, the data communication service part c 42 issues a link disconnect command "Disconnect(c)". On receiving the "Disconnect(c)", the transmission control section c 53 delivers a disconnect mode setting frame 'DISC' to the B1 channel, thereby awaiting a report frame 'UA' is received, a disconnect end report command "Disconnected(c)" is delivered to the data communication service part c 42. This disconnects the information transmitting link on the B1 channel. The call disconnecting procedure is similar to the call setup procedure. When a call disconnect request is received from the call service part f 44, the data communication service part c 42 issues a call disconnect request command "Kill(c)". On receiving the "Kill(c)", the data communication processing section c 52 passes the command to the call processing section f 56. The call processing section f 56 and the transmission control section g 59 control the communication to send a disconnect message (DISC) to the ISDN 15, thereby awaiting a release message (REL). When the release message (REL) is received, a release completion message (REL COMP) is returned to the ISDN 15 and a disconnection end command "Killed(c)" is delivered to the data communication service part c 42. At a point of time when the disconnection is notified from the data communication service part c 42 to the call service part f 44, the B1 channel is completely disconnected from the ISDN 15.

The call termination and data reception procedures are as shown in the right-hand side of FIG. 31. Since the initialization sequence is as shown in FIG. 30, a description will here be given of operations subsequent to the initialization. When receiving a call setup message (SET UP) via the D channel from the ISDN 15, the transmission control section g 59 notifies the reception to the call processing section f 56. The call processing section f 56 selects an available channel from the B1 and B2 channels. Let us assume that the B2 channel is available. The call processing section f 56 notifies, by use of a call termination report command "Call Req(c)", the call termination via the data communication processing section d 54 and the data communication service part d 43 associated with the B2 channel to the call service part f 44, thereby waiting for an instruction from the call service part f 44. In this situation, a call setup reception message (CALL PROC) is returned to the ISDN 15. When the call setup operation is ready, the call service part f 44 sends a call termination confirmation command "CALL Cnf(d)" to the call processing section f 56 via the data communication service section d 43 and the data communication processing section d 54. On receiving the command, the call processing section f 56 controls the communication according to the CCITT Recommendations I.451 procedure to cause the transmission control section g 59 to transmit a response message (CONN) to the ISDN 15, thereby completely connecting the B2 channel to the partner. The response confirmation message (CONN ACK) from the ISDN 15 is used to notify that the ISDN 15 has received the response message (CONN).

Subsequently, the upper-level program 4 loads, by use of a program loading command "IPL(d)", the program of the transmission control section d 55 into the communication adapter 3. However, the loading procedure is as already described above and hence a description thereof will be omitted. When an asynchronous balanced mode setup frame 'SABM' is received via the B2 channel by the transmission control section d 55 operating in conformity with the HDLC-BA, the operation state is changed into a link established state so as to return a report frame 'UA'. Thereafter, this section d 52 notifies, by use of a link setup report command "Connect Req(d)", via the data communication processing section d 54 to the data communication service part d 43 that a link setup request has been established. As a result, data communications are possible on the B2 channel. On receiving an information transfer frame 'I' from the B2 channel, the transmission control section d 55 reports by use of a report frame 'RR' the partner that the information transfer frame 'I' has been received The section d 55 further notifies, by use of a reception report command "RCG(d)", via the data communication processing section d 54 to the data communication service part d 43 that the data has been received. After the received data is processed, the data communication service part d 43 returns the reception buffer to the transmission control section d 55 by use of a reception confirmation command "RCV Buf Rel(d)". When the transmission control section d 55 receives a disconnection mode setup frame 'DISC' from the B2 channel, the operating state thereof is changed into a link disconnection state so as to return a report frame 'UA'. Moreover, the section d 55 notifies, by use of a link disconnection report command "Disconnect Req(d)", via the data communication service part d 43 that the link has been disconnected. On receiving the disconnection message (DISC) from the D channel, the transmission control section g 59 passes the message to the call processing section f 56. The call processing section f 56 then notifies the call disconnection request received from the ISDN 15 to the call service part f 44 via the data communication service part d 43 by use of a call disconnection report command "Kill Req(d)", thereby waiting for an instruction from the call service part f 44. When the call disconnection is ready, the call service part f 44 returns a call disconnection confirmation command "Kill Cnf(d)" via the data communication processing section d 54 to the call processing section f 56. On receiving the command, the call processing section f 56 controls the communication according to the I.451 procedure to transmit a release message (REL) from the transmission control section g 59 to the ISDN 15. When the message is received, the ISDN 15 reports the reception of the release message (REL) by use of a release completion message (REL COMP). As a result, the B2 channel is completely released from the ISDN 15.

Figure 32:
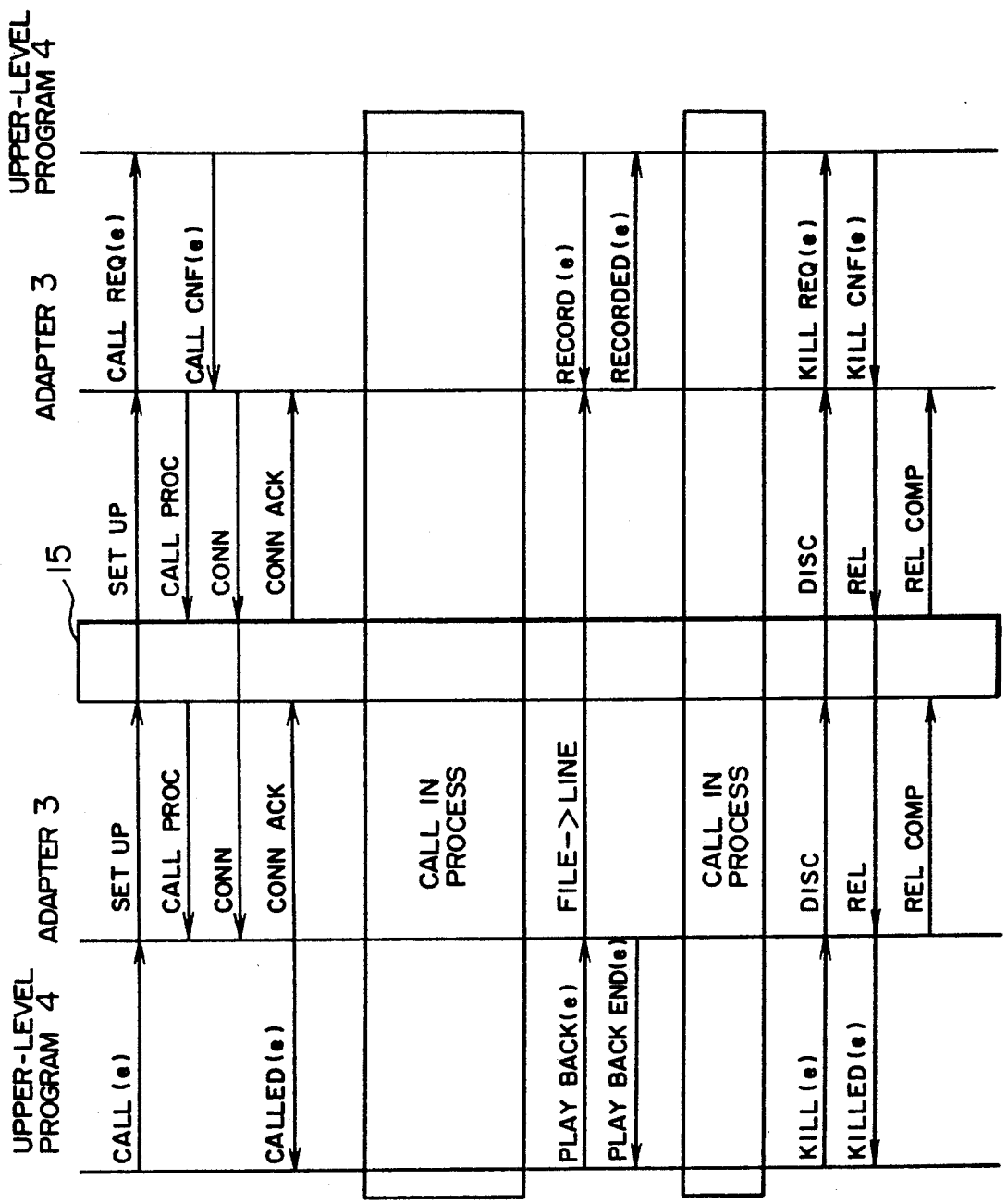
FIG. 32 is a diagram showing a voice communication sequence in the fourth embodiment.

FIG. 32 shows an example of a voice communication sequence. Call setup and termination operations are carried out by means of the telephone service part e 46 and the voice processing section e 58 of FIG. 25. The processing procedures are identical to those of the data communications of FIG. 31. For a call initiation shown in the left-hand side of FIG. 32, when the telephone service part e 46 receives a call setup end command "Called(e)" from the voice processing section e 58, the handset 365 is linked with the B1 or B2 channel to allow a telephone communication. For a call termination shown in the right-hand side of FIG. 32, when a call termination confirmation command "Call Cnf(e)" is received from the telephone service part e 46, the voice processing section e 58 sends a response message (CONN) to the ISDN 15. Thereafter, when the voice processing section e 58 receives a response acknowledge message (CONN ACK) from the ISDN, the telephone communication is enabled in a similar fashion. At an intermediate point of a telephone communication, a message voice may be transmitted. Namely, the telephone service part e 46 sets the message voice in the shared memory of the connection route 5 of FIG. 25 so as to issue thereafter a playback command "Play Back(e)" to the voice processing section e 58. In response thereto, the voice processing section e 58 disconnect the pertinent channel from the handset 365 and then transmits the message voice from the shared memory onto the channel. When the voice message is completely transmitted, the voice processing section e 58 returns a playback end command "Play Back end(e)" to the telephone service part e 46 so as to link the handset 365 with the original channel. When a voice recording is desired during a call or a telephone communication, the communication procedures are as shown in the right-hand side of FIG. 32. The telephone service part e 46 issues a record command "Record(e)" to the voice processing section e 58. The voice processing section e 58 then also records voice inputted from the handset 365 onto the shared memory specified by the telephone service part e 46. When a specified period of time is elapsed thereafter, a record end command "Recorded(e)" is delivered to the telephone service part e 46. The voice being recorded in the shared memory may also be heard, if necessary, by use of the handset 365. Since the call disconnection is accomplished through a procedure identical to the procedure of the data communications described in conjunction with FIG. 31.

Figure 33:
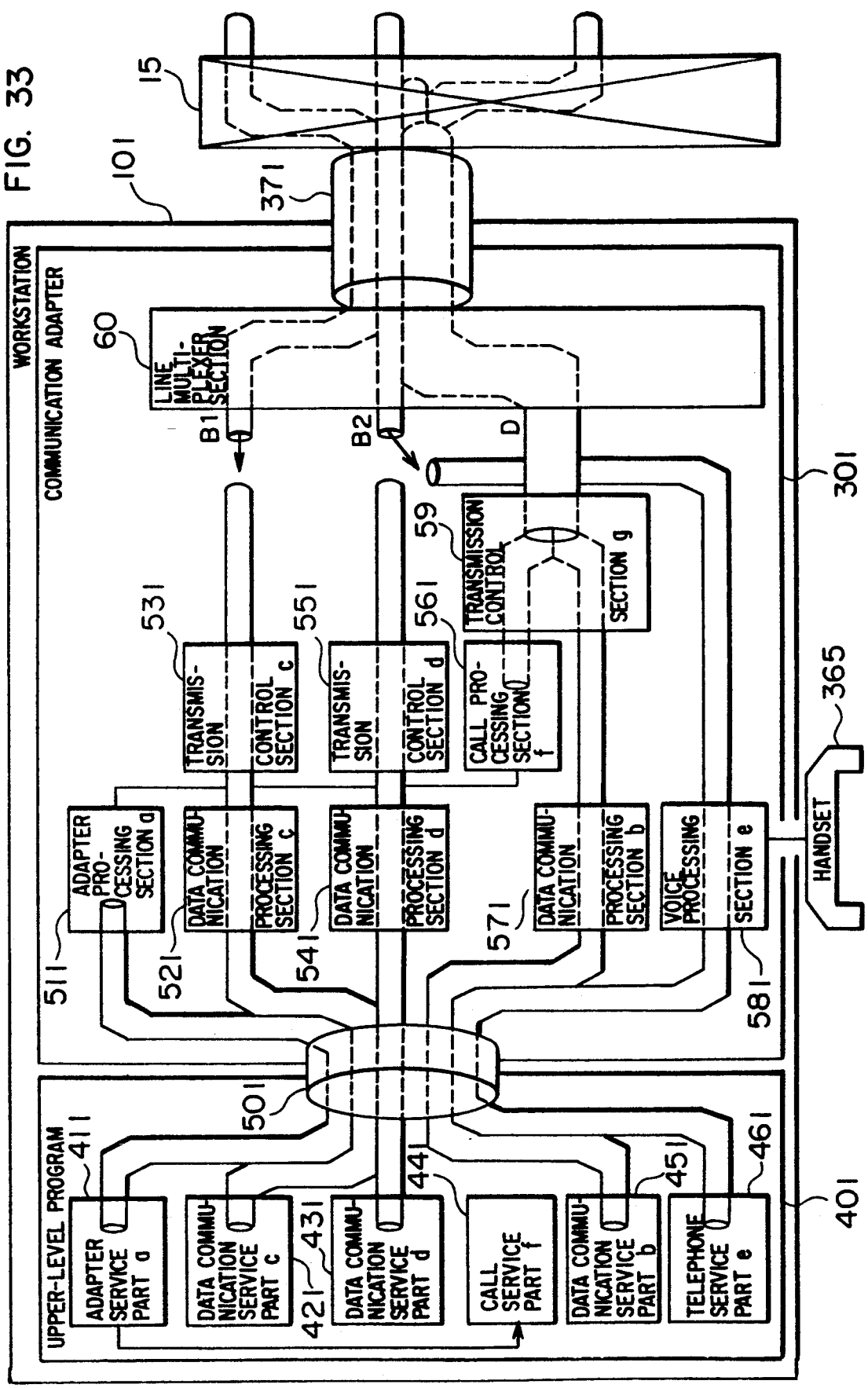
FIG. 33 is a block diagram showing the configuration of a workstation as a fifth embodiment according to the present invention.

FIG. 33 is a block diagram showing a fifth embodiment of a multi-circuit communication control system in which the present invention is adopted. This configuration includes a workstation body 101 disposed with a communication adapter 301, like in the case of FIG. 25. The adapter 301 is controlled by an upper-level program 401. The communication adapter 301 and the upper-level program 401 controlling the adapter 301 are logically connected to each other by way of a connection path or route 501. The upper-level program 401 is of the same configuration as the example of FIG. 25. Namely, the program 401 includes an adapter service part a 411, a data communication service part c 421, a data communication service part d 431, a call service part f 441, a data communication service part b 451, and a telephone service part e 461. The communication adapter 301 is also constituted in the same way as for the system of FIG. 25. That is, the adapter 301 comprises an adapter processing section a 511, a data communication processing section c 521, a transmission control section d 531, a data communication processing section d 541, a transmission control section d 551, a call processing section f 561, a data communication processing section b 571, a voice processing section e 581, a transmission control section g 591, and a line multiplexer section 601. In the configuration of this embodiment, the call service part f 441 is connected to the call processing section f 561 via a combination of the adapter service part a 441 and the adapter processing section a 551 each having an identifier a. With this provision, the call control is separated from the data communication and/or the voice communication, which advantageously simplifies commands to be handled in the service parts of the upper-level program 401 and in the processing sections of the communication adapter 301.

Figure 34:
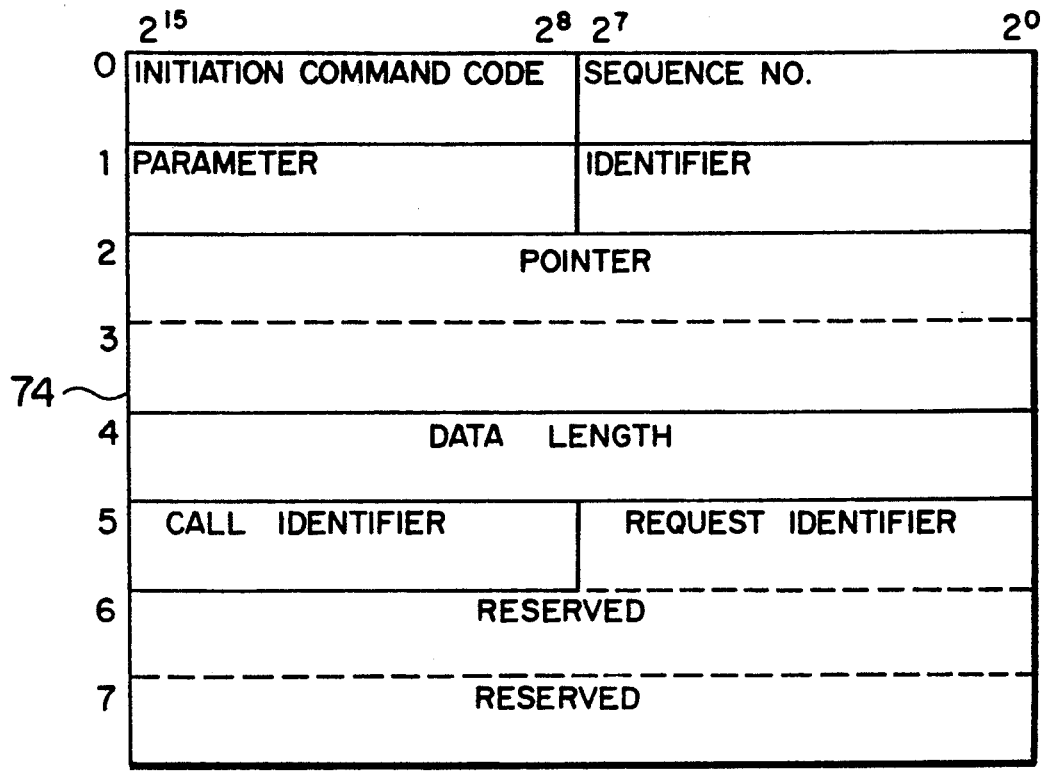
FIGS. 34 and 35 are diagrams respectively showing formats of an initiate command and a report command used in the fifth embodiment.
Figure 35:
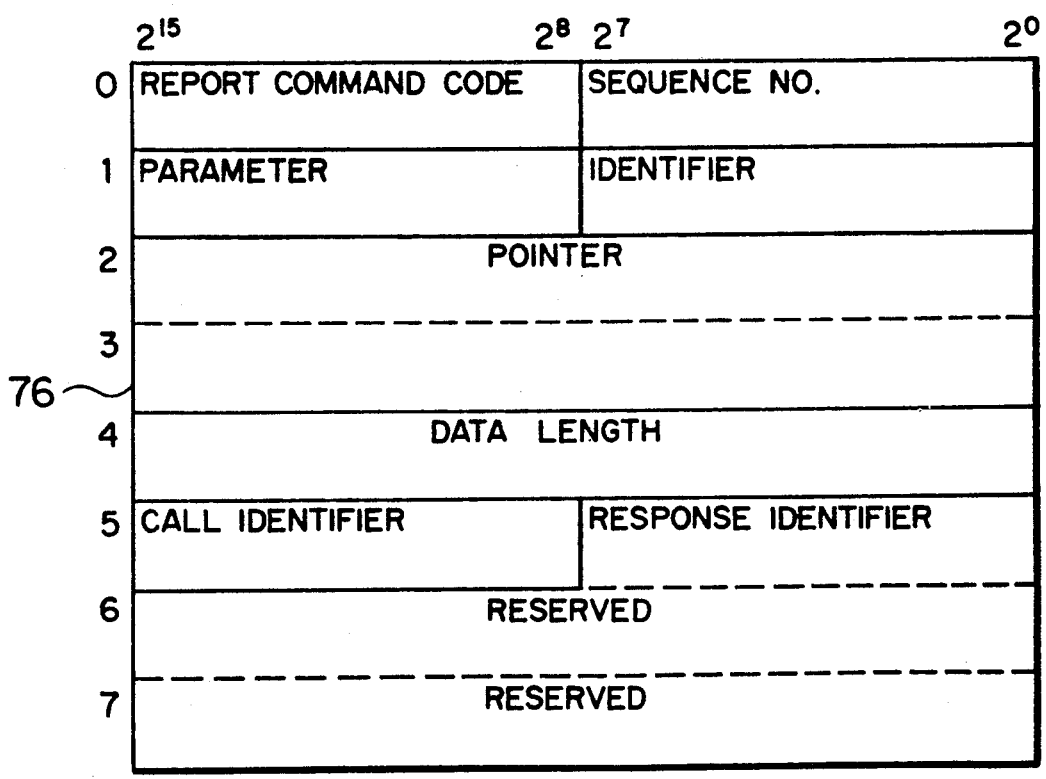

FIGS. 34 and 35 show the formats of the initiation and report commands, respectively. The structures vary from those of FIGS. 26 and 27 in that a request identifier and a response identifier are additionally disposed. The request identifier is used by the call service part f 441 to specify, when a call setup request is issued to the communication adapter 301 a data communication processing section and a voice processing section as objects of the call setup processing. The response identifier is employed by the call processing section f 561 to specify, when a call termination takes place in the call processing section f 561, a data communication service part and a voice service part as objects of the call termination so as to notify the call termination to the call service part f 441.

FIG. 36 shows an example of relationships between the initiation and report command kinds and codes and the service parts and the processing sections in which the commands are available. The contents differ from those of FIG. 29 in that the commands related to calls including "Call", "Called", "Call Req", "Call Cnf", "Kill", "Killed", "Kill Req", and "Kill Cnf" are to be processed in the call service part a 411 and the adapter processing section a 511. The other relationships are kept unchanged. Consequently, the processing procedures are not changed excepting that in the sequence charts of FIGS. 31 and 32, only the identifier is changed to a for the commands "Call", "Called", "Call Req", "Call Cnf", "Kill", "Killed", "Kill Req", and "Kill Cnf".

Figure 37:
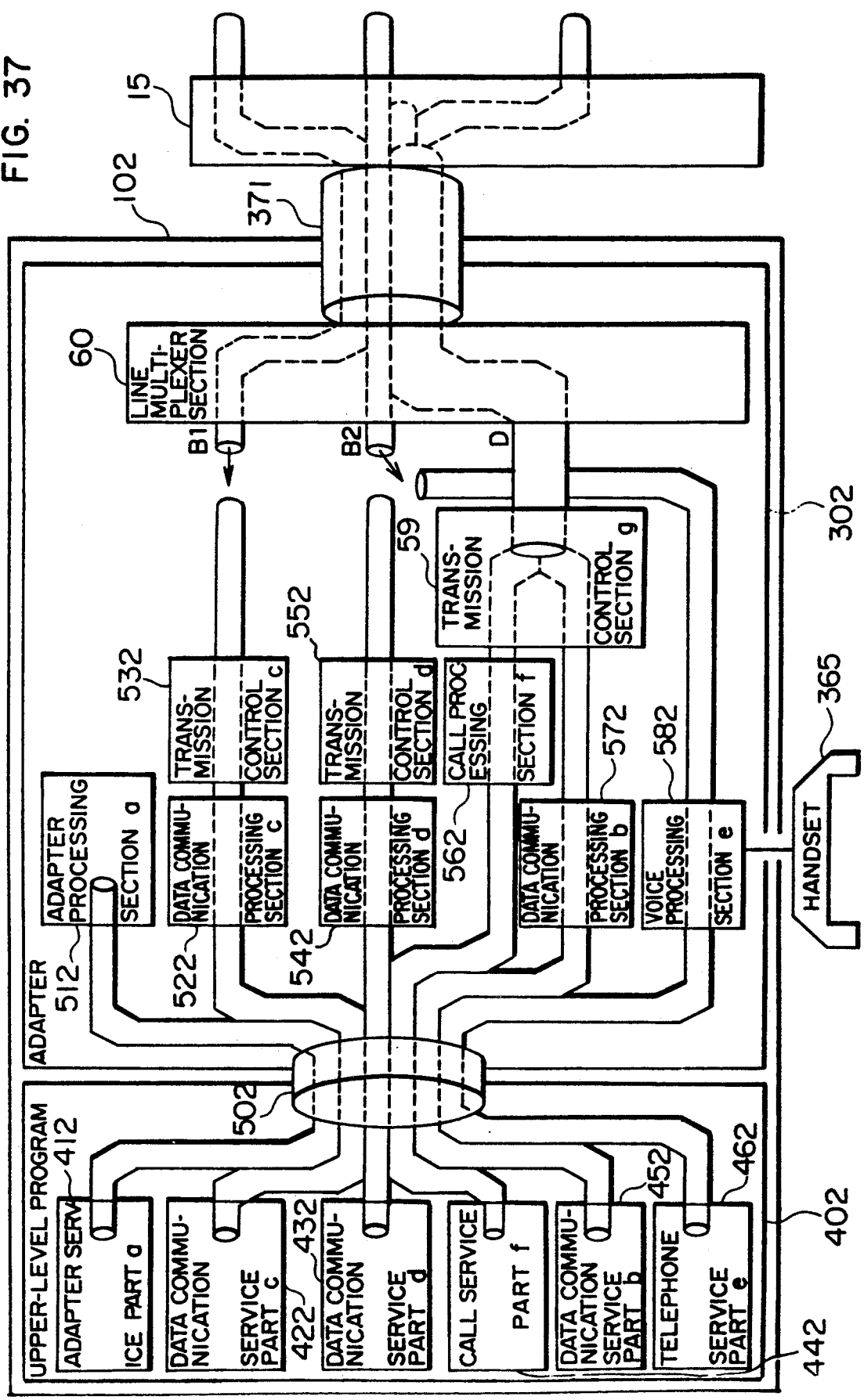
FIG. 37 is a block diagram showing the configuration of a workstation as a sixth embodiment according to the present invention.

FIG. 37 is a block diagram showing a sixth embodiment of a multi-circuit communication control system employing the present invention. This configuration includes a workstation body 102 disposed with a communication adapter 302 installed therein like in the case of FIG. 25. The adapter 302 is controlled by an upper-level program 402. The communication adapter 302 and the upper-level program 402 controlling the adapter 302 are logically connected to each other by connection path or route 502. The upper-level program 402 is of the same configuration as the example of FIG. 25. Namely, the program 402 is constituted with an adapter service part a 412, a data communication service part c 422, a data communication service part d 432, a call service part f 442, a data communication service part b 452, and a telephone service part e 462. The communication adapter 302 is also constituted in the same way as for the system of FIG. 25. That is, the adapter 302 includes an adapter processing section a 512, a data communication processing section c 522, a transmission control section c 532, a data communication processing section d 542, a transmission control section d 552, a call processing section f 562, a data communication processing section b 572, a voice processing section e 582, a transmission control section g 59, and a line multiplexer section 60. The different point of the constitution of this embodiment is the part by which the call service part f 442 is directly connected to the call processing section f 562. As a result, the commands related to calls are discriminated from the other commands by use of an identifier. In consequence, the commands to be handled in the service parts of the upper-level program 402 and in the processing sections of the communication adapter 302 are simplified, thereby preventing errors from taking place. In addition, for example, when a call termination occurs, during a telephone communication with the handset 365, from another partner; unlike to the case of FIG. 25, since the call processing section f is directly connected to the call service part f, the call termination can be easily recognized. FIGS. 34 and 35 show the initiation and report command formats, which are the same as those of the example of FIG. 33. The request identifier is used by the call service part f 442 to designate, when a call setup request is issued to the communication adapter 302, a data communication processing section and a voice processing section as objects of the call setup processing. The response identifier is employed by the call processing section f 562 to denote, when a call termination takes place in the call processing section f 562, a data communication service part and a voice service part as objects of the call termination so as to report the call termination to the call service part f 442.

FIG. 38 shows an example of relationships between the initiation and report command kinds and codes and the service parts and the processing sections in which the commands can be used. The contents differ from those of FIG. 29 in that the commands related to calls including "Call", "Called", "Call Req", "Call Cnf", "Kill", "Killed", "Kill Req", and "Kill Cnf" are to be processed in the call service part a 442 and the adapter processing section a 562. The other relationships are kept unchanged. In consequence, the processing procedures are not changed excepting that in the sequence charts of FIGS. 31 and 32, only the identifier is changed to f for the commands "Call", "Called", "Call Req", "Call Cnf", "Kill", "Killed", "Kill Req", and "Kill Cnf".

While particular embodiments of the invention have been shown and described, it will be obvious to those skilled in the art that various changes and modifications may be made without departing from the present invention in its broader aspects.

We claim:

1. A multi-channel communication controller for use with a main computer utilizing a plurality of channels, the controller comprising:

a plurality of subprocessor sections, each subprocessor section disposed for an associated channel of the plurality of channels to conduct communication processing, each said subprocessor section including a subprocessor CPU, a subprocessor RAM, a subprocessor serial controller connected to the associated channel, a subprocessor local bus for establishing connections in each said subprocessor between said subprocessor CPU, said subprocessor RAM, and said subprocessor serial controller, and a subprocessor controller connected to said subprocessor local bus;

a main processor section for controlling said subprocessor sections, said main processor section including a main CPU, a main ROM, a main RAM, a main local bus for establishing connections between said main CPU, said main ROM, and said main RAM, and a main controller connected to said main local bus;

an upper-level local bus connected to said main controller and each of the subprocessor controllers; and, a memory sharing section connected to said upper-level local bus and to a system bus of a system processor section for supervising control of the main computer, said memory sharing section including a shared controller connected to said upper-level local bus and said system bus and a shared RAM connected to said shared controller, wherein each said subprocessor controller includes an address translating section for accomplishing an address translation on an address supplied from said main processor section via said upper-level local bus so as to transfer an address after the address translation to said RAM associated thereto.

2. The multi-channel communication controller according to claim 1, wherein:
   said shared RAM includes means for storing therein a plurality of communication programs; and
   said main processor section includes means for selectively transferring the plurality of communication programs from said shared memory to said subprocessor RAMs.

3. The multi-channel communication controller according to claim 2, wherein said plurality of communication programs include means for executing different communication protocols.

4. The multi-channel communication controller according to claim 1, wherein each said subprocessor controller includes an initiation flag for causing an interruption to its own subprocessor section in response to an initiation from other of processor sections and a report flag for causing another interruption from its own subprocessor section to the other said processor sections.

5. The multi-channel communication controller according to claim 1, wherein at least one of said subprocessor controllers and said main controller includes tables of an identical format containing at least one of an initiation command kind from said system processor section, a sequence of the command, an identifier of a command object, a pointer denoting a related area in said shared memory, and a data length thereof.

6. The multi-channel communication controller according to claim 1, wherein said multi-channel communication controller is fabricated in a communication adapter board.

7. The multi-channel communication controller according to claim 1, wherein each said subprocessor controller includes means for directly writing received communication data in a predetermined reception buffer area of said shared memory.

8. The multi-channel communication controller according to claim 1, wherein in each said subprocessor section, at least said subprocessor CPU, said subprocessor serial controller, said subprocessor local bus, and said subprocessor controller are fabricated in a one-chip microcomputer.

9. The multi-channel communication controller according to claim 8, wherein each said subprocessor section is fabricated in an identical one-chip microcomputer and the address translating section in said subprocessor controller includes means for responding to a setting of a control signal from an external device to set an address translation value thereof to a value different from values of other subprocessors.

10. The multi-channel communication controller according to claim 1, further comprising a speed matching section connected to said serial controllers in said subprocessor sections and said main processor section for changing, under control of said main processor section, transmission speed in a communication between each said subprocessor section and an external device.

11. A multi-channel communication controller for use with a main computer utilizing a plurality of channels, the controller comprising:
   a plurality of subprocessor sections, each subprocessor section disposed for an associated channel of the plurality of channels to conduct communication processing, each said subprocessor section including a subprocessor CPU, a subprocessor serial controller, a subprocessor local bus for establishing connections between said subprocessor CPU and said subprocessor serial controller, and a subprocessor controller connected to said local bus;
   a main processor section for controlling said subprocessor sections, said main processor section including a main CPU, a main ROM, a main RAM, a main local bus for establishing connections between said main CPU, said main ROM, and said main RAM, and a main controller connected to said main local bus;
   an upper-level local bus connected to said main controller and each of the subprocessor controllers; and,
   a memory sharing section connected to said upper-level local bus and to a system bus of a system processor section for supervising control of the main computer, said memory sharing section including a shared controller connected to said upper-level local bus and said system bus and a shared RAM connected to said shared controller,
   wherein each said subprocessor controller includes an address translating section for accomplishing an address translation on an address outputted from said CPU of said subprocessor section so as to transfer an address after the translation to said upper-level local bus.

12. The multi-channel communication controller according to claim 11, wherein:
   said shared RAM includes means for storing therein a plurality of communication programs; and
   each of said main processor and subprocessor sections includes means for selectively accessing the plurality of communication programs in said shared memory to execute the plurality of communication programs.

13. The multi-channel communication controller according to claim 12, wherein said plurality of communication programs include means for executing different communication protocols.

14. The multi-channel communication controller according to claim 11, wherein each said subprocessor controller includes an initiation flag for causing an interruption to its own subprocessor section in response to an initiation from other processor processors sections and a report flag for causing another interruption from its own subprocessor section to the other processor sections.

15. The multi-channel communication controller according to claim 11, wherein said multi-channel communication controller is fabricated in a communication adapter board.

16. The multi-channel communication controller according to claim 11, wherein each said subprocessor controller includes means for directly writing received communication data in a predetermined reception buffer area of said shared memory.

17. The multi-channel communication controller according to claim 11, wherein in each said subprocessor section, at least said subprocessor CPU, said subprocessor serial controller, said subprocessor local bus, and said subprocessor controller are constituted in a one-chip microcomputer.

18. The multi-channel communication controller according to claim 17, wherein said each subprocessor section is configured in an identical one-chip microcomputer and the address translation section in said subprocessor controller includes means for responding to a setting of a control signal from an external device to set an address translation value thereof to a value different from values of other subprocessors.

19. The multi-channel communication controller according to claim 11, further comprising a speed matching section connected to said serial controllers in said subprocessor sections and said main processor section for changing, under control of said main processor section, transmission speed in a communication between each said subprocessor section and an external device.

20. A multi-channel communication controller according to claim 11, wherein each said controller includes a table of an identical format containing at least one of a kind of an initiation command from said system processor section, a sequence of the command, an identifier of a command object, a pointer denoting a related area in said shared memory, and a data length thereof.

21. An ISDN communication controller for use in a main computer, the controller comprising:
- a first subprocessor section for achieving communication processing on B channels, said first subprocessor section including a first CPU, a first RAM, a first serial controller connected to the B channels, a first local bus for establishing connections between said first CPU, said first RAM, and said first serial controller, and a first controller connected to said first local bus;
- a second subprocessor section for achieving communication processing on the B channels, said second subprocessor section including a second CPU, a second RAM, a second serial controller connected to the B channels, a second local bus for establishing connections between said second CPU, said second RAM, and said second serial controller, and a second controller connected to said second local bus;
- an LAPD processing section for achieving communication processing on a D channel, said LAPD processing section including a third CPU, a first ROM, a third serial controller connected to the D channel, a third local bus for establishing connections between said third CPU, said first ROM, and said third serial controller, and a third controller connected to said third local bus;
- a main processor section for controlling said first and second subprocessor sections and said LAPD processing section, said main processor section including a fourth CPU, a second ROM, a third RAM, a fourth local bus for establishing connections between said fourth CPU, said second ROM, said third RAM, and said fourth local bus, and a fourth controller connected to said fourth local bus;
- an upper-level local bus connected to said first, second, and fourth controllers;
- a line driver for multiplexing an ISDN line into the D and B channels, said D channel being connected to said third serial controller;
- a channel control section connected to said line driver, said first and second subprocessor sections, and said fourth local bus for operating under control of said main processor to connect said B channels to said first and second serial controllers such that said B channels can be changed over between said first and second controllers; and
- a memory sharing section connected to said upper-level local bus and to a system bus of a system processor section for supervising control of said main computer, said memory sharing section including a controller connected to said upper-level local bus and said system bus and a shared RAM connected to said controller, wherein:
- said first controller includes a first address translating section for achieving a first address translation on a first address supplied from said main processor section via said upper-level local bus to transfer a first translated address after the first address translation to said first RAM; and
- said second controller includes a second address translating section for achieving a second address translation on a second address supplied from said main processor section via said upper-level local bus to transfer a second translated address after the second address translation to said second RAM.

22. The ISDN communication controller according to claim 21, wherein:
- said shared RAM includes means for storing therein a plurality of communication programs; and,
- said main processor section including means for selectively transferring the plurality of communication programs to said RAMs of said subprocessor sections.

23. The ISDN communication controller according to claim 22, wherein said plurality of communication programs include means for executing different communication protocols.

24. The ISDN communication controller according to claim 21, wherein each said controller in said subprocessor sections includes an initiation flag for causing an interruption in its own subprocessor section in response to an initiation from other processor sections and a report flag for causing another interruption from its own subprocessor section to the other processor sections.

25. The ISDN communication controller according to claim 21, wherein each of said controllers includes a table of an identical format containing at least one of an initiation command kind from said system processor section, a sequence of the command, an identifier of a command object, a pointer denoting a related area in said shared memory, and a data length thereof.

26. The ISDN communication controller according to claim 21, wherein said multi-channel communication controller is fabricated in a communication adapter board.

27. The ISDN communication controller according to claim 21, wherein each said controller in said subprocessor sections includes means for directly writing received communication data in a predetermined reception buffer area of said shared memory.

28. The ISDN communication controller according to claim 21, wherein in each said subprocessor section, at least said CPU, said serial controller, said local bus, and said controller are constituted in a one-chip microcomputer.

29. The ISDN communication controller according to claim 28, wherein each said subprocessor section is fabricated in an identical one-chip microcomputer and the address translation section in each said controller includes means for responding to a setting of a control signal from an external device to set an address translation value thereof to a value different from values of other subprocessor.

30. The ISDN communication controller according to claim 21, further comprising a speed matching section connected to said serial controllers in said subprocessor sections and said main processor section for changing, under control of said main processor section, transmission speed in a communication between each said subprocessor section and an external device.

31. An ISDN communication controller for use in a main computer, the controller comprising:
   a first subprocessor section for achieving communication processing on B channels, said first subprocessor section including a first CPU, a first serial controller connected to the B channels, a first local bus for establishing connections between said first CPU and said first serial controller, and a first controller connected to said first local bus;
   a second subprocessor section for achieving communication processing on the B channels, said second subprocessor section including a second CPU, a second serial controller connected to the B channels, a second local bus for establishing connections between said second CPU and said second serial controller, and a second controller connected to said second local bus;
   an LAPD processing section for achieving communication processing on a D channel, said LAPD processing section including a third CPU, a first ROM, a third serial controller connected to the D channel, a third local bus for establishing connections between said third CPU, said first ROM, and said third serial controller, and a third controller connected to said third local bus;
   a main processor section for controlling said first and second subprocessor sections and said LAPD processing section, said main processor section including a fourth CPU, a second ROM, an RAM, a fourth local bus for establishing connections between said fourth CPU, said second ROM, said RAM, and said fourth local bus, and a fourth controller connected to said fourth local bus;
   an upper-level local bus connected to said first, second, and fourth controllers;
   a line driver for multiplexing an ISDN line into the D and B channels, said D channel being connected to said third serial controller;
   a channel control section connected to said line driver, said first and second subprocessor sections, and said fourth local bus for operating under control of said main processor to connect said B channels to said first and second serial controllers such that said B channels can be changed over between said first and second controllers; and
   a memory sharing section connected to said upper-level local bus and to a system bus of a system processor section for supervising control of said main computer, said memory sharing section including a controller connected to said upper-level local bus and said system bus and a shared RAM connected to said controller, wherein:
   said first controller includes a first address translating section for achieving a first address translation on a first address supplied from said first CPU via said upper-level local bus to transfer a first translated address after the first translation to said shared RAM; and
   said second controller includes a second address translating section for achieving a second address translation on a second address supplied from said second CPU via said upper-level local bus to transfer a second translated address after the second translation to said shared RAM.

32. The ISDN communication controller according to claim 31, wherein:
   said shared RAM includes means for storing therein a plurality of communication programs; and
   each of said main processor and subprocessor sections includes means for selectively accessing the plurality of communication programs in said shared memory to execute the plurality of communication programs.

33. The ISDN communication controller according to claim 32, wherein said plurality of communication programs includes means for executing different communication protocols.

34. The ISDN communication controller according to claim 31, wherein each said controller in said subprocessor sections includes an initiation flag for causing an interruption in its own subprocessor section in response to an initiation from other processor sections and a report flag for causing another interruption from its own subprocessor section into the other processor sections.

35. The ISDN communication controller according to claim 31, wherein each of said controllers includes a table of an identical format containing at least one of an initiation command kind from said system processor section, a sequence of the command, an identifier of a command object, a pointer denoting a related area in said shared memory, and a data length thereof.

36. The ISDN communication controller according to claim 31, wherein said ISDN communication controller is fabricated in a communication adapter board.

37. The ISDN communication controller according to claim 31, wherein each said controller in said subprocessor sections includes means for directly writing received communication data in a predetermined reception buffer area of said shared memory.

38. The ISDN communication controller according to claim 31, wherein in each said subprocessor section, at least said CPU, said serial controller, said local bus, and said controller are constituted in a one-chip microcomputer.

39. The ISDN communication controller according to claim 38, wherein said each subprocessor section is fabricated in an identical one-chip microcomputer and the address translating section in each said controller includes means for responding to a setting of a control signal from an external device to set an address translation value thereof to a value different from values of other subprocessors.

40. The ISDN communication controller according to claim 31, further comprising a speed matching section connected to said serial controllers in said subprocessor sections and said main processor section for changing, under control of said main processor section, transmission speed in a communication between each said subprocessor section and an external device.

* * * * *

UNITED STATES PATENT AND TRADEMARK OFFICE
CERTIFICATE OF CORRECTION

PATENT NO. : 5,204,949
DATED : April 20, 1993
INVENTOR(S) : Toshikazu Yasue, et al.

It is certified that error appears in the above-identified patent and that said Letters Patent is hereby corrected as shown below:

Claim 14, column 38, line 61, delete "processors".

Signed and Sealed this

Seventh Day of December, 1993

*Attest:*

BRUCE LEHMAN

*Attesting Officer*     *Commissioner of Patents and Trademarks*